(12) United States Patent
Henle et al.

(10) Patent No.: US 8,321,144 B2
(45) Date of Patent: Nov. 27, 2012

(54) NON-CONTIGUOUS REGIONS PROCESSING

(75) Inventors: Ernst S. Henle, Issaquah, WA (US); Brandon T. Hunt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 506 days.

(21) Appl. No.: 12/421,562

(22) Filed: Apr. 9, 2009

(65) Prior Publication Data

US 2010/0106460 A1 Apr. 29, 2010

Related U.S. Application Data

(60) Provisional application No. 61/107,988, filed on Oct. 23, 2008.

(51) Int. Cl.
*G01N 33/50* (2006.01)
*G01N 33/48* (2006.01)

(52) U.S. Cl. .................................. 702/19; 702/20

(58) Field of Classification Search ................ None
See application file for complete search history.

(56) References Cited

U.S. PATENT DOCUMENTS

| | | |
|---|---|---|
| 6,165,734 A | 12/2000 | Garini et al. |
| 6,181,811 B1 | 1/2001 | Kuan et al. |
| 8,116,551 B2 | 2/2012 | Gallagher et al. |
| 2004/0108452 A1 | 6/2004 | Graber et al. |
| 2004/0156854 A1 | 8/2004 | Mulligan et al. |
| 2010/0104153 A1 | 4/2010 | Hunt et al. |
| 2010/0106426 A1 | 4/2010 | Hunt et al. |

FOREIGN PATENT DOCUMENTS

| | | |
|---|---|---|
| EP | 1 577 823 A1 | 9/2005 |
| GB | 2 403 342 A | 12/2004 |
| WO | WO 01/33573 A1 | 5/2001 |
| WO | WO 01/45046 A1 | 6/2001 |
| WO | WO 2007/059117 A2 | 5/2007 |

OTHER PUBLICATIONS

Label-Free Detection of Differential Protein Expression by LC/MALDI Mass Spectrometry, Web Published on Apr. 16, 2008, Journal of Proteome Research, 2008, Vo. 7, pp. 2270-2279.*
European Search Report dated Apr. 12, 2010, for Application Serial No. EP 09 17 3923.5, 10 pages.
European Search Report dated Apr. 7, 2010, for Application Serial No. EP 09 17 3924.3, 9 pages.
Reichenbach, et al., "Image background removal in comprehensive two-dimensional gas chromatography," Journal of Chromatography A, 985:47-56 (2003).

* cited by examiner

*Primary Examiner* — Jason Sims
(74) *Attorney, Agent, or Firm* — Klarquist Sparkman, LLP

(57) ABSTRACT

Non-contiguous regions of interest as well as contiguous regions of interest are similarly processed. After an isotope peak detector has identified isotope peaks on LC/MS images, a microaligner microaligns bounding areas of identified isotope peaks and redefines the bounding areas to help subsequent scoring process. Forms of isotope peaks influence formation of a peak association matrix and a mass/charge association map which creates association in the mass/charge dimension. A correlation scorer produces reproducibility scores as well as quality scores to help aid scientists to discover biological features of interest.

17 Claims, 67 Drawing Sheets

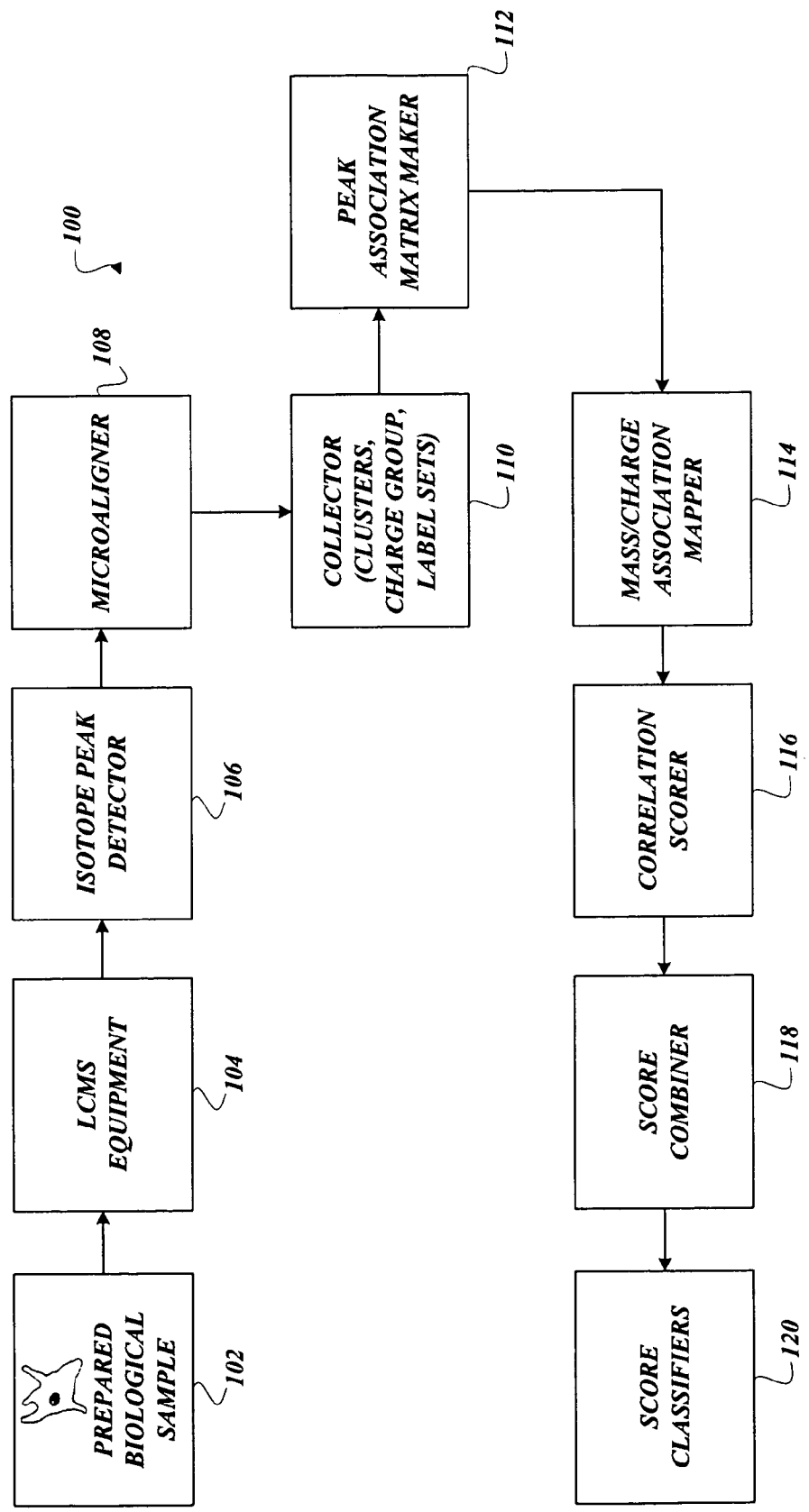

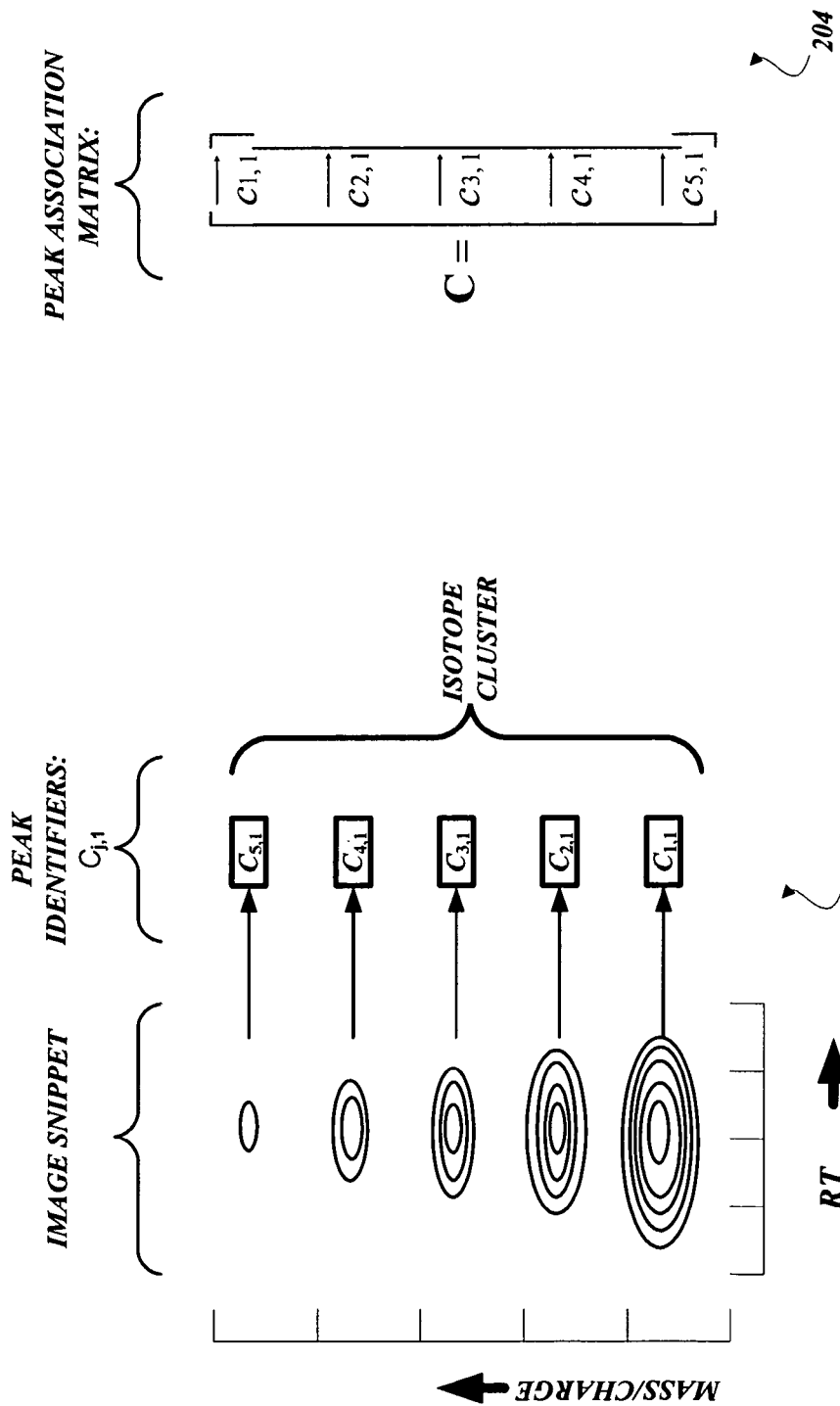

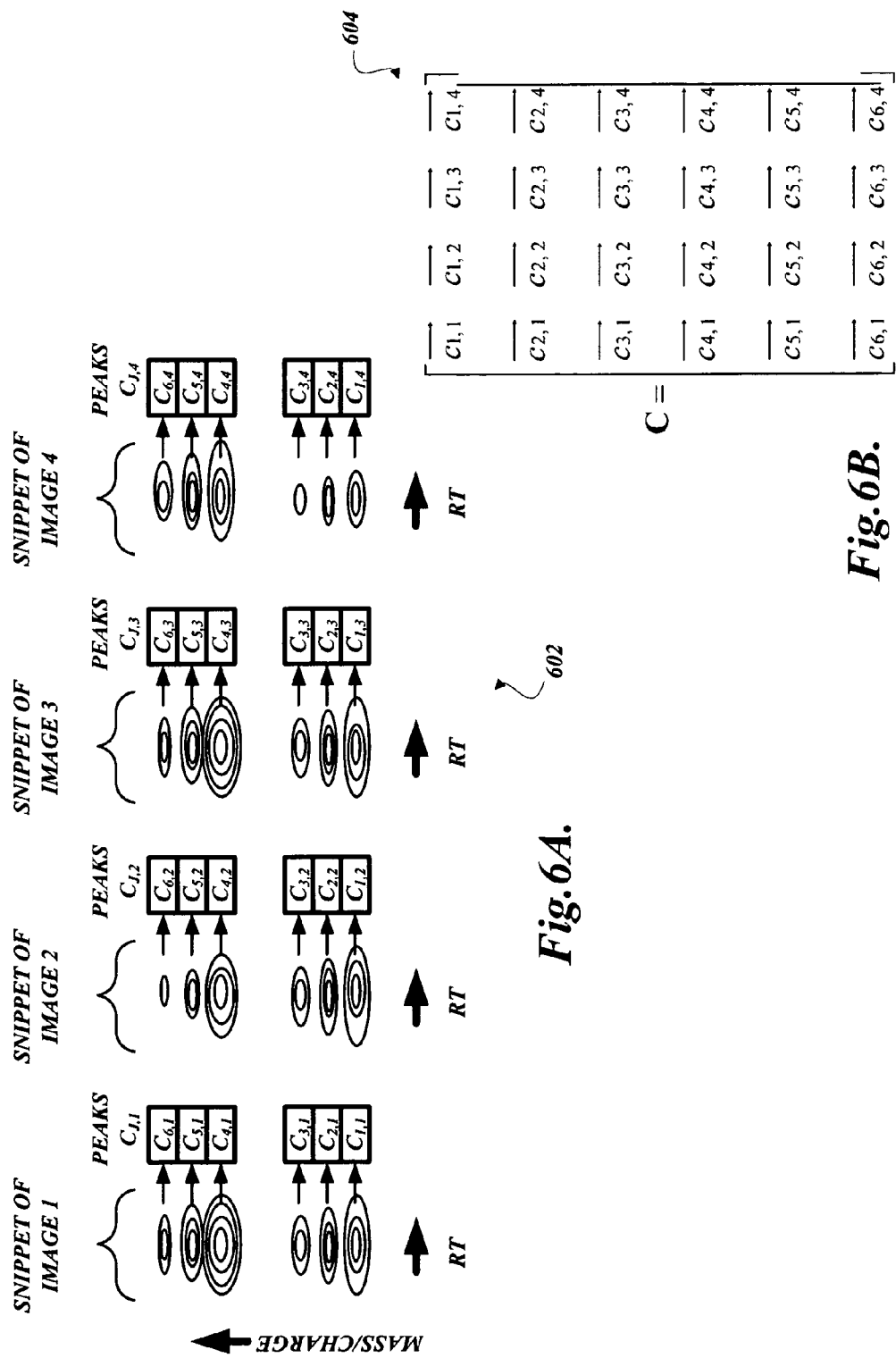

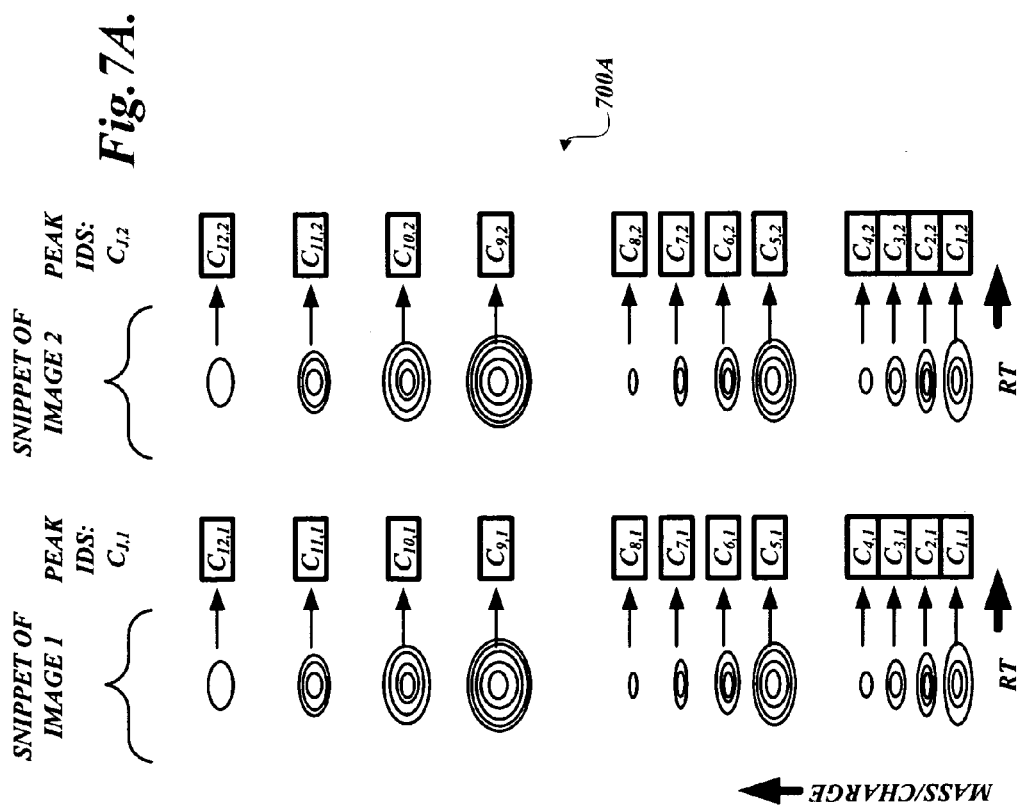

$$1200A \qquad \vec{b} = \begin{bmatrix} \overline{c_{1,1}} & \overline{c_{1,2}} & \overline{c_{1,3}} \\ \overline{c_{2,1}} & \overline{c_{2,2}} & \overline{c_{2,3}} \\ \overline{c_{3,1}} & \overline{c_{3,2}} & \overline{c_{3,3}} \\ \overline{c_{4,1}} & \overline{c_{4,2}} & \overline{c_{4,3}} \\ \overline{c_{5,1}} & \overline{c_{5,2}} & \overline{c_{5,3}} \end{bmatrix}$$

Fig.12A.

$$b = \begin{bmatrix} 1 & 1 & 1 & 1 & 1 \end{bmatrix} \begin{bmatrix} \overline{c_{1,1}} & \overline{c_{1,2}} & \overline{c_{1,3}} \\ \overline{c_{2,1}} & \overline{c_{2,2}} & \overline{c_{2,3}} \\ \overline{c_{3,1}} & \overline{c_{3,2}} & \overline{c_{3,3}} \\ \overline{c_{4,1}} & \overline{c_{4,2}} & \overline{c_{4,3}} \\ \overline{c_{5,1}} & \overline{c_{5,2}} & \overline{c_{5,3}} \end{bmatrix} \begin{matrix} 1200B \end{matrix}$$

Fig.12B.

$$\mathbf{X} = \overline{x_{jk}} = \begin{bmatrix} \overline{x_{1,1}} & \overline{x_{1,2}} & \overline{x_{1,3}} \\ \overline{x_{2,1}} & \overline{x_{2,2}} & \overline{x_{2,3}} \\ \overline{x_{3,1}} & \overline{x_{3,2}} & \overline{x_{3,3}} \\ \overline{x_{4,1}} & \overline{x_{4,2}} & \overline{x_{4,3}} \\ \overline{x_{5,1}} & \overline{x_{5,2}} & \overline{x_{5,3}} \end{bmatrix} = \begin{bmatrix} \overline{sc_{1,1}+d} & \overline{sc_{1,2}+d} & \overline{sc_{1,3}+d} \\ \overline{sc_{2,1}+d} & \overline{sc_{2,2}+d} & \overline{sc_{2,3}+d} \\ \overline{sc_{3,1}+d} & \overline{sc_{3,2}+d} & \overline{sc_{3,3}+d} \\ \overline{sc_{4,1}+d} & \overline{sc_{4,2}+d} & \overline{sc_{4,3}+d} \\ \overline{sc_{5,1}+d} & \overline{sc_{5,2}+d} & \overline{sc_{5,3}+d} \end{bmatrix}$$

$$G = C \begin{bmatrix} 1 \\ 1 \\ 1 \end{bmatrix} = \begin{bmatrix} \vec{g_1} & \vec{g_2} & \vec{g_3} & \vec{g_4} & \vec{g_5} \end{bmatrix}$$

$$\mathbf{X} = \overrightarrow{x_{jk}} = \begin{bmatrix} \vec{x_{1,1}} & \vec{x_{1,2}} & \vec{x_{1,3}} \\ \vec{x_{2,1}} & \vec{x_{2,2}} & \vec{x_{2,3}} \\ \vec{x_{3,1}} & \vec{x_{3,2}} & \vec{x_{3,3}} \\ \vec{x_{4,1}} & \vec{x_{4,2}} & \vec{x_{4,3}} \\ \vec{x_{5,1}} & \vec{x_{5,2}} & \vec{x_{5,3}} \end{bmatrix} = \begin{bmatrix} \overrightarrow{s_1c_{1,1}+d_1} & \overrightarrow{s_1c_{1,2}+d_1} & \overrightarrow{s_1c_{1,3}+d_1} \\ \overrightarrow{s_2c_{2,1}+d_2} & \overrightarrow{s_2c_{2,2}+d_2} & \overrightarrow{s_2c_{2,3}+d_2} \\ \overrightarrow{s_3c_{3,1}+d_3} & \overrightarrow{s_3c_{3,2}+d_3} & \overrightarrow{s_3c_{3,3}+d_3} \\ \overrightarrow{s_4c_{4,1}+d_4} & \overrightarrow{s_4c_{4,2}+d_4} & \overrightarrow{s_4c_{4,3}+d_4} \\ \overrightarrow{s_5c_{5,1}+d_5} & \overrightarrow{s_5c_{5,2}+d_5} & \overrightarrow{s_5c_{5,3}+d_5} \end{bmatrix}$$

$$\begin{bmatrix} \vec{c_{1,1}} & \vec{c_{1,2}} & \vec{c_{1,3}} \\ \vec{c_{2,1}} & \vec{c_{2,2}} & \vec{c_{2,3}} \\ \vec{c_{3,1}} & \vec{c_{3,2}} & \vec{c_{3,3}} \\ \vec{c_{4,1}} & \vec{c_{4,2}} & \vec{c_{4,3}} \\ \vec{c_{5,1}} & \vec{c_{5,2}} & \vec{c_{5,3}} \end{bmatrix} \begin{matrix} \uparrow \vec{g_1} \\ \uparrow \vec{g_2} \\ \uparrow \vec{g_3} \\ \uparrow \vec{g_4} \\ \uparrow \vec{g_5} \end{matrix} \Bigg\}$$

EACH OF THESE VECTORS IS THE AVERAGE VECTOR FROM A ROW IN THE MATRIX

$$\mathbf{F} = \begin{bmatrix} 1 & 1 & 1 & 1 & 1 \end{bmatrix} \begin{bmatrix} \overrightarrow{c_{1,1}} & \overrightarrow{c_{1,2}} & \overrightarrow{c_{1,3}} \\ \overrightarrow{c_{2,1}} & \overrightarrow{c_{2,2}} & \overrightarrow{c_{2,3}} \\ \overrightarrow{c_{3,1}} & \overrightarrow{c_{3,2}} & \overrightarrow{c_{3,3}} \\ \overrightarrow{c_{4,1}} & \overrightarrow{c_{4,2}} & \overrightarrow{c_{4,3}} \\ \overrightarrow{c_{5,1}} & \overrightarrow{c_{5,2}} & \overrightarrow{c_{5,3}} \end{bmatrix} = \begin{bmatrix} \overrightarrow{f^1} & \overrightarrow{f^2} & \overrightarrow{f^3} \end{bmatrix}$$

$$\begin{bmatrix} \overrightarrow{c_{1,1}} & \overrightarrow{c_{1,2}} & \overrightarrow{c_{1,3}} \\ \overrightarrow{c_{2,1}} & \overrightarrow{c_{2,2}} & \overrightarrow{c_{2,3}} \\ \overrightarrow{c_{3,1}} & \overrightarrow{c_{3,2}} & \overrightarrow{c_{3,3}} \\ \overrightarrow{c_{4,1}} & \overrightarrow{c_{4,2}} & \overrightarrow{c_{4,3}} \\ \overrightarrow{c_{5,1}} & \overrightarrow{c_{5,2}} & \overrightarrow{c_{5,3}} \end{bmatrix} \rightarrow \overrightarrow{f_1}, \overrightarrow{f_2}, \overrightarrow{f_3}$$

EACH OF THESE VECTORS IS THE AVERAGE VECTOR FROM A COLUMN IN THE MATRIX

1400A

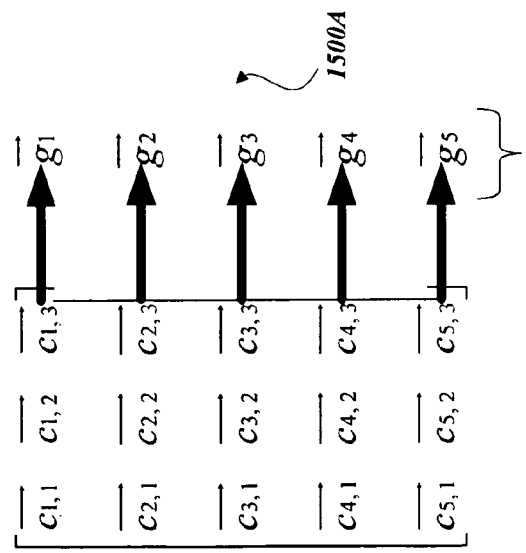

*Fig.19.*
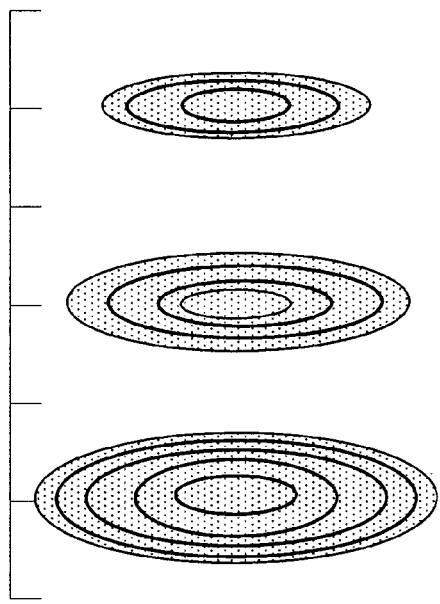
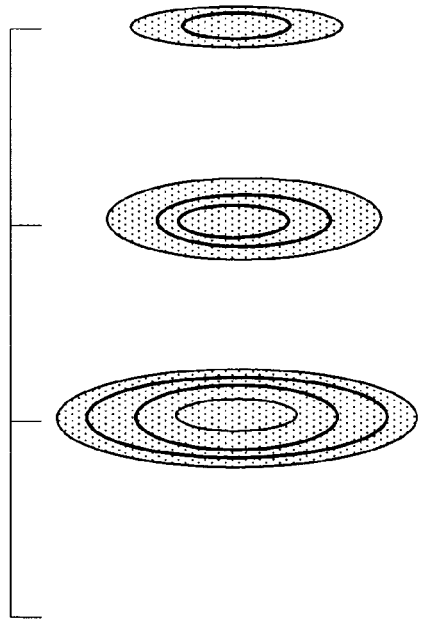

NON-CONTIGUOUS REGIONS PROCESSING

CROSS-REFERENCE TO RELATED APPLICATION

This application claims the benefit of Provisional Application No. 61/107,988, filed Oct. 23, 2008, which is incorporated herein by reference.

BACKGROUND

The adage "a picture is worth a thousand words" is revivified in today's processing of computer images that capture results of scientific experiments. Prepared biological samples, which have undergone a scientific experiment, are submitted to equipment connected with liquid chromatography and mass spectrometry. One or more images are produced on which pictorial evidence (such as isotope peaks) of biological activities is captured. The pictorial evidence may number in the thousands of isotope peaks, which may hinder explanation to help scientists better understand the results of scientific experiments. This may help to explain why the above adage was refreshed by the computer scientist, John McCarthy, who said: "1001 words are worth more than a picture."

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a block diagram illustrating components of computing machinery to process prepared biological samples to support scientific discovery by researchers;

FIGS. 2A-2B are pictorial diagrams illustrating an isotope cluster and its matrix mathematical representation, in accordance with one embodiment of the subject matter;

FIGS. 6A-6B are pictorial diagrams of isotope clusters among snippets of images and their matrix mathematical representation, in accordance with one embodiment of the present subject matter;

FIGS. 7A-7B are pictorial diagrams illustrating isotope clusters among snippets of images and their matrix mathematical representation, in accordance with one embodiment of the present subject matter;

FIGS. 12A-12C are pictorial diagrams illustrating matrix mathematical representation of isotope clusters and their processing to produce correlation scores, in accordance with one embodiment of the present subject matter;

FIGS. 13A-13C are pictorial diagrams illustrating matrix mathematical representations of isotope clusters and their processing to produce correlation scores, in accordance with one embodiment of the present subject matter;

FIGS. 14A-14B are pictorial diagrams illustrating matrix mathematical representation of isotope clusters and their processing to produce correlation scores, in accordance with one embodiment of the present subject matter;

FIGS. 15A-15C are pictorial diagrams illustrating matrix mathematical representation of isotope clusters and their processing to produce correlation scores, in accordance with one embodiment of the present subject matter;

FIG. 19 is a pictorial diagram illustrating isotope clusters and a listing of their mass-charge values including a charge group map, in accordance with one embodiment of the present subject matter;

DETAILED DESCRIPTION

Figures 3A, 3B:
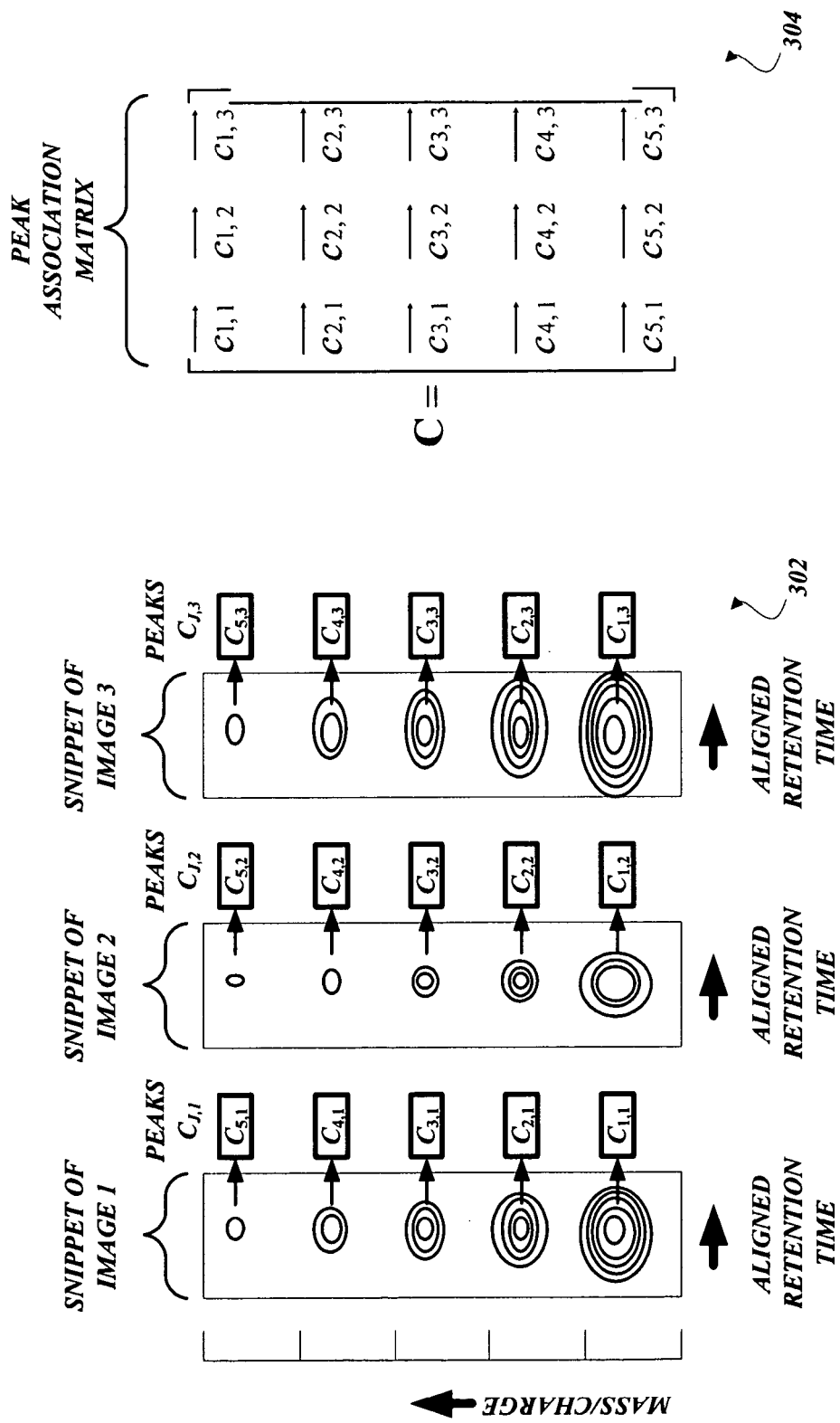
FIGS. 3A-3B are pictorial diagrams illustrating isotope clusters among various snippets of images and their matrix mathematical representation, in accordance with one embodiment of the subject matter.

A region of interest can be defined as any masked portion of an LC/MS image whose mass/charge and retention time coordinates can be used to define other regions of interest on other LC/MS images produced from the same run of prepared biological samples. Various embodiments of the present subject matter describe hardware components of computing machinery and methods executing on these computing machinery for representing physical prepared biological samples and transformation in the form of scoring various gatherings of associated isotope peaks, such as isotope clusters, label sets, and charge groups, to aid discovery of biological features of interest to researchers.

A region of interest may be assumed to be a contiguous region on an LC/MS image in which the boundaries of each portion of the contiguous region are touchingly adjacent to the boundaries of one or more portions of the contiguous region. It should also be equally valid to assume that a region of interest also includes a non-contiguous region on an LC/MS image in which the boundaries of a portion of the non-contiguous region may not be touchingly adjacent to the boundaries of one or more portions of the non-contiguous region. One example of non-contiguous regions of interest includes an association of isotope peaks in an isotope cluster in which each isotope peak is not touchingly adjacent to another isotope peak.

Another example of non-contiguous regions of interest includes an association of isotope clusters of a number of isotope peaks in a charge group in which each isotope cluster is not touchingly adjacent to another isotope cluster, and each isotope peak is not touchingly adjacent to another isotope peak. These associations are made possible by various defined relationships among portions of the same LC/MS image at different mass/charge values or of different LC/MS images at similar mass/charge values. As indicated before, such associations include an association of isotope peaks within an isotope cluster; another association includes an association of isotope clusters within a charge group; a further association includes an association of isotope clusters within a label set. These defined relationships used to associate portions of one or more LC/MS images can be analyzed to score isotope clusters, charge groups, and label sets within an image and across multiple images. Typically, portions of one or more LC/MS images are associated at different mass/charge values but have similar (aligned) retention times.

FIG. 1 illustrates a system 100 that comprises hardware components of computing machinery or software components executing on the computing machinery. The system 100 receives a prepared biological sample 102, which is processed by pieces of LC/MS equipment 104 (liquid chromatography and mass spectrometry equipment) to produce one or more LC/MS images. The LC/MS images are processed by an isotope peak detector 106 to locate isotope peaks on one or more LC/MS images.

An isotope peak is electronic data that appears on a computing display as a topographical peak that represents one or more physical isotopes of approximately similar molecular masses. The effective mass uncertainty of an ion is determined by the resolution of a mass spectrometer, one piece of LCMS equipment 104 previously described. The most common uncertainty of molecular mass is taken to be larger than the mass defect of the ion and less than 0.5 Daltons. An isotope peak appears on an LC/MS image as a contiguous masked region in which portions of the region are touchingly adjacent to other portions of the region. See FIG. 8.

Atoms of a single, physical chemical element may have different masses due to differing numbers of neutrons and due to the nuclear mass defect. The different atoms of the same element are termed isotopes. Consequently, a molecule that is composed of elements with multiple isotopes may have one of many masses that depend on the constituent isotopes. Since the isotope mass difference is approximately 1 Dalton and the difference in mass defect is 200 fold less, the differences in molecular mass are either less than 0.01 Dalton or approximately 1, 2, 3 . . . Daltons.

The mass of each separate isotopic composition can be considered as the mass of an isotope peak, or an uncertainty can be tolerated that groups together similar masses when the mass of an isotope peak is determined. As mentioned above, the uncertainty is usually large enough that the mass difference between the apexes of isotope peaks are quantized by approximately 1, 2, 3, . . . Daltons. When the resolution (uncertainty) does not allow separation of isotope peaks that are separated by 1 Dalton, then the isotope cluster collapses into a single peak. In this case the isotope cluster has one isotope peak.

Since the mass spectrometer measures mass/charge, the mass of a given measured ion includes the mass of the charged adduct that made a chemical species an ion. The effective mass value of the charged adduct (A) may be positive or negative. For instance, the removal of a proton may charge a molecule. The adduct mass for the removal of a proton from a neutral molecule is negative (−1). In other words, the adduct mass is defined as the difference in mass between the neutral compound and the ion that is detected by mass spectrometry. In many cases it can be presumed that the molecular mass of the charged adduct is 1 (or −1) Dalton, since a proton or the lack of a proton is a common modification in aqueous systems.

If alignment is necessary, a microaligner 108 is used. The microaligner 108 provides regional redefinition to the detected isotope peaks to enhance subsequent processing by the system 100. For example the microaligner 108 attempts to cause a reconciliation, which is a process by which a single chemical species is identified as one entity, notwithstanding the fact that it may elute on multiple LC/MS images. The microaligner 108 also attempts to align bounding areas containing the chemical species eluting over multiple LC/MS images. The microaligner 108 further redefines the bounding area for each isotope peak across multiple LC/MS images to achieve a desired quantification for each isotope peak.

Subsequently, a collector 110 gathers noncontiguous isotope peaks that logically associate to one another depending on various relationships, such as isotope clusters, charge groups, and label sets. One typical association is made (where a mask defining pixels of interest among portions of one or more LC/MS images occupy similar mass/charge locations and aligned retention time locations) among different LC/MS images. However, an association can also be made on the same LC/MS image among isotope peaks within isotope clusters, label sets, and charge groups depending on various types of relationships. The masks of these isotope peaks in the latter association are at the same retention times, but their mass/charge locations are different. Associated isotope peaks are expected to have similar isotope peak shapes. The relative expression levels among isotope peaks within associated isotope clusters, label sets, and charge groups are expected to be similar. These similarities may be expressed as a score. The score can be used by the researcher to interpret the data to aid in the discovery of biological features of interest.

Isotope clusters and gatherings of isotope clusters are regions of interest. As discussed before, regions of interest include contiguous portions and non-contiguous portions. Any portions, contiguous or not, whose pixel coordinates can be transferred to corresponding pixel coordinates on other constituent LC/MS images may be considered a region of interest depending on an association defined by a relationship. A region of interest can be defined by its mask. For example, the mask of an isotope cluster may be non-contiguous by including the portions defined by the isotope peaks belonging to the isotope cluster, or the mask may contain a contiguous region that also includes some of the regions surrounding the isotope peaks. See FIGS. 9A-9B. By extension, any gatherings of isotope clusters, such as those that occur in charge groups or label sets, may also be regions of interest. Such regions of interest may be correlated with corresponding gatherings of isotope clusters on other LC/MS images. See FIG. 10.

Associations of isotope peaks and their collective forms create a basis for correlation scoring. The technique of association allows different regions of interest at a similar aligned retention time within a single LC/MS image to correspond to each other. Each portion of a region of interest can be associated or mapped to a corresponding portion on a corresponding region of interest. Associations, which have a similar mass/charge value (within tolerance) and aligned retention time and are on separate LC/MS images, are possible. Further associations, which are at different mass/charge values and on the same LC/MS image at similar retention times, are also possible. For instance, isotope peaks within an isotope cluster are associated with each other by considering isotopic differences.

There are many forms that isotope peaks may take, including the six forms discussed hereinafter. The first form includes a single isotope cluster on one LC/MS image or a collection of isotope clusters on one LC/MS image. See FIG. 2A. The peak association matrix maker 112 represents the first form as a matrix with one column (p=1). This column contains the n isotope peaks of the isotope cluster or the collection of isotope clusters. See FIG. 2B. The isotope peaks are at similar retention time.

The second form includes a single isotope cluster or a collection of isotope clusters per LC/MS image on multiple LC/MS images. See FIG. 3A. The peak association matrix maker 112 represents the second form as a matrix which has one column per LC/MS image for 1 to p images. See FIG. 3B. All n isotope peaks of a column are from the same isotope cluster or collection of isotope clusters. All isotope peaks of a row are at a similar aligned retention time and similar mass/charge.

The third form includes multiple isotope clusters in a single label set that is on one LC/MS image. See FIG. 4A. The peak association matrix maker 112 represents the third form as a matrix which has one column for each of the p labels in the label set. See FIG. 4B. All n isotope peaks of a column are from the same isotope cluster, carry the same isotopic label, and are at a similar retention time. All isotope peaks of a row are at a similar retention time. All isotope peaks of a row have the same isotopic composition except for the differences in the isotopic label.

The fourth form includes multiple isotope clusters in a single charge group that is on one LC/MS image. See FIG. 5A. The peak association matrix maker 112 represents the fourth form as a matrix which has one column for each of the p charge states in the charge group. See FIG. 5B. All n isotope peaks of a column are from the same isotope cluster, have the same charge state, and are at a similar retention time. All isotope peaks of a row are at a similar retention time. All isotope peaks of a row have the same isotopic composition except for the differences due to charge adducts.

The fifth form includes multiple isotope clusters per label set and one label set per image on multiple LC/MS images. See FIG. 6A. q labels were used in the experiment. The peak association matrix maker 112 represents the fifth form as a matrix which has one column for each of the p images. See FIG. 6B. All n isotope peaks of a column are from the same label set. Each label set has q isotope clusters. Each isotope cluster has r isotope peaks (n=qr). q and r are any integer greater than zero. All isotope peaks of a row are at the same aligned retention time and the same mass/charge.

The sixth form includes multiple isotope clusters per charge group and one charge group per LC/MS image on multiple LC/MS images. See FIG. 7A. q charge states are considered in this correlation. The peak association matrix maker 112 represents the sixth form as a matrix which has one column for each of the p LC/MS images. See FIG. 7B. All isotope peaks of a column are from the same charge group. Each charge group has q isotope clusters. Each isotope cluster has r isotope peaks (n=qr). q and r are any integer greater than zero. All isotope peaks of a row are at a similar aligned retention time and the same mass/charge.

A peak association matrix maker 112 analyzes the results of the collector 110 and mathematically organizes the various isotope peaks and their representations in a peak association matrix of one or more dimensions. The peak association matrix forms a basis for the input to a correlation evaluator, which is a part of the correlation scorer 116. The peak association matrix has n rows and p columns where each cell represents an isotope peak. Isotope peaks within a matrix row are associated with each other. Isotope peaks within a matrix column are associated with each other. The isotope peaks in a column may be sorted by ascending mass/charge values.

Given the possibilities for associations as detected by the collector 110, there are many forms of peak association matrices. A set of associated isotope clusters determines the form of the peak association matrix. If the isotope clusters are from a single label set or charge group on one image, then each column of the peak association matrix contains one isotope cluster from the label set or charge group. If the isotope clusters are from more than one image, then each column of the peak association matrix contains isotope peaks from one image. The isotope peaks in a column may be from a single isotope cluster, or from a label set that contains multiple isotope clusters, or from a charge group that contains multiple isotope clusters. Each column will have similar corresponding groups of isotope peaks, label sets, or charge groups. The matrix configuration depends on the association forms detected by the collector 110. At least six forms of isotope peak associations in an n×p peak association matrix can be made given the above considerations. See FIGS. 22A-22Q.

In various embodiments of the present subject matter, the peak association matrix maker 112 creates the peak association matrix as follows. Given n isotope peaks in an isotope cluster and p isotope clusters or collections of isotope clusters, it can be deduced that there are n×p peaks that can be associated and then correlated with each other. Each isotope peak is represented by a vector. Vector $\vec{c}_{jk}$ represents the $j^{th}$ isotope peak in an isotope cluster set k where j=1, ..., n; k=1, ..., p; n is the number of isotope peaks per isotope cluster set; p is the number of isotope cluster sets.

$\vec{c}_{jk}$ is an ordered vector of m intensities that describe the isotope peak. The m intensity values may include a chromatogram, a spectrum, or a serialized version of the pixel intensities. A single isotope cluster or a set of isotope clusters on one image with n isotope peaks is described by a series of isotope peaks. The $k^{th}$ isotope cluster or set of isotope clusters on one image ($c_k$) is mathematically represented as follows:

$$c_k = \begin{bmatrix} \vec{c}_{1k} \\ \vec{c}_{2k} \\ \vec{c}_{3k} \\ \vdots \\ \vec{c}_{nk} \end{bmatrix}$$

Isotope clusters or collection of isotope clusters can be gathered on one LC/MS image ($c_k$) with n isotope peaks into a matrix C of size n×p:

$$C = [\vec{c_1} \ \vec{c_2} \ \vec{c_3} \ \ldots \ \vec{c_p}] = \begin{bmatrix} \vec{c_{11}} & \vec{c_{12}} & \vec{c_{13}} & \ldots & \vec{c_{1p}} \\ \vec{c_{21}} & & & & \vec{c_{2p}} \\ \vec{c_{31}} & & \ddots & & \vec{c_{3p}} \\ \vdots & & & & \vdots \\ \vec{c_{n1}} & \vec{c_{n2}} & \vec{c_{n3}} & \ldots & \vec{c_{np}} \end{bmatrix};$$

A mass/charge association mapper 114 produces a mass/charge association map that identifies unique mass/charge values where each mass/charge value is associated with a mapping value.

After the peak association matrix is created, the system 100 maps the mass/charge values of corresponding isotope peaks to determine corresponding chromatograms, spectra, or serialized pixel intensities that will be used to represent each isotope peak in the correlation evaluator as a component of a correlation scorer 116. The peak association matrix determines which mass/charge associations are made among the isotope peaks. See FIGS. 10 and 11. Corresponding isotope peaks on different LC/MS images have the same mass/charge values, and the mapping is trivial. The mass/charge values of isotope peaks on the same LC/MS image within an isotope cluster, label set, or charge group are suitably mapped according to the method described hereinbelow.

Associations between mass/charge values on the same LC/MS image are registered in a mass/charge association map. The map suitably includes a table containing two columns like those illustrated in FIGS. 18 and 19. There exists an ordered list of unique mass/charge values. The isotope cluster maps 1, 2 contain mapping numbers. Different mass/charge values that share the same mapping number are associated with each other.

Mass/charge associations can be made with isotope clusters, label sets, and charge groups. See FIGS. 22R, 22U-22X, and 22AO-22AR. Since the expected $$\Delta\left(\frac{m}{z}\right)$$

is smallest within an isotope cluster, larger for label sets, and largest for charge groups, the primary association is within isotope clusters, and the secondary association is within each label set or charge group. The mass/charge associations of the isotope peaks within each isotope cluster are determined based on the principles described hereinbelow. See FIGS. 22U-22X. The mass/charge associations due to labeling of isotope peaks are determined based on the principles described hereinbelow. See FIGS. 22AB-AF. The mass/charge associations due to differences in charge state are determined hereinbelow. See FIGS. 22AG-AJ. The mass/charge associations are compounded as described below. See FIGS. 21 and 22AK-22AO.

Mass/charge values that share the same mapping value are associated with each other in an analogous manner as aligned retention times are associated with each other. See FIGS. 18 and 19. An isotope peak may be associated with isotope peaks that are on the same image and have the same retention time but have different mass/charge values. These different mass/charge values are mapped to each other in a one-dimensional association. This same isotope peak may also be associated with other isotope peaks on other images at a similar aligned retention time and similar mass/charge value. The result is a two-dimensional association where the first dimension is the mass/charge mapping, and the second dimension is from one image to the next. The following discusses associations among different mass/charge values in greater detail.

First, a focus is made on the associations of isotope peaks within an isotope cluster. Among many reasons, associating isotope peaks within an isotope cluster allows comparison of corresponding portions of different isotope peaks in the same isotope cluster. The quantitative outcome is a score which aids in an analysis of whether the isotope cluster is well formed. A poorly formed isotope cluster indicates, among many things, that a researcher should not base conclusions on poorly formed isotope clusters or their member isotope peaks, and certain member isotope peaks should be a part of a different isotope cluster such that the different isotope cluster is better formed.

As discussed hereinbefore, an isotope cluster is a set of 1 to n isotope peaks. See FIG. 8. This set may be a single region of interest containing multiple isotope peaks or multiple regions of interest where the each region of interest is an individual isotope peak. The isotope cluster may be represented on an LC/MS image as a set of masked isotope peaks that are derived from the same chemical species but with different mass due to different isotopic compositions. This set of masked isotope peaks may or may not form a contiguous region on the LC/MS image. See FIGS. 9A-9B.

To better understand the logic behind the physical structure of an isotope cluster, its origin is discussed herein. A chemical compound may have various similar molecular masses due to varying isotopic compositions. These molecular masses will usually cluster in groups that are separated by a quantum number of Daltons (mathematically, integer values). Consequently, a series of related isotope peaks can be physically observed when the mass spectrometer signal is monitored for a single ionized chemical. This series or set of isotope peaks is an isotope cluster. The isotope peaks within an isotope cluster are the same ion but have different molecular masses due to different isotopic compositions.

Exploring further into the structure of an isotope cluster, typically there is one isotope peak at a given mass/charge but there are 1 to n isotope peaks at a given retention time with masses $m_i$. The masses of these ions are determined by the variations in isotopic compositions and the mass of the charge adducts: $m_i = m_1, m_2, m_3, \ldots$. The relative intensities of the isotope peaks in an isotope cluster depend on the isotopic composition of the ion whose mass/charge value is measured. This is the intensity distribution of an isotope cluster. Usually, the mass difference between two proximate isotope peaks is approximately a quantum number of Daltons. Therefore, an isotope cluster contains isotope peaks, whose masses differ by integer amounts. Given a molecular mass of $m_o$, for the isotopic composition with the lowest mass in an isotope cluster of a singly charged ion that contains n isotopes is approximately: $m_i = m_o, m_o+1, m_o+2, m_o+3, \ldots, m_o+n$.

These isotope peaks are aligned in the retention time dimension because liquid chromatography elution times are usually not distinguishable for isotopic variations. Mass spectrometers measure the mass/charge, therefore the mass/charge spacing $$\Delta\left(\frac{m}{z}\right)$$

between isotopes in an isotope cluster is inversely proportional to the charge state z. Each isotope cluster has one charge state.

In the case where the isotope peak mass uncertainty is larger than the mass defect, the isotope peaks are equally spaced in the mass/charge dimension. For these cases, at charge state 1, the spacing in units of Daltons per charge is 1/1; at charge state 2 the spacing is 1/2; and so on, as shown:

$$\Delta\left(\frac{m}{z}\right) = \frac{\Delta m}{z}$$

$$\Delta m \approx \ldots 1, 2, 3, \ldots$$

$$z = 1, 2, 3, \ldots$$

To generalize these relationships, it is unlikely that $\Delta m$ is approximated using the uncertainty of an isotope peak. Instead, $\Delta m$ would be determined considering the variations in isotopic masses, including mass defect.

The mass/charge association mapper 114 associates mass/charge values within an isotope cluster as follows. See FIGS. 22U-22X. Associations are made considering the anatomy (structure) of an isotope cluster as previously explored. Isotope peaks from the same cluster are on the same image, and their corresponding portions have similar (aligned) retention times but their masses differ. Therefore, pixels within an isotope cluster are associated if they have a similar retention time but are from different isotope peaks and are separated by $\Delta m$. The association step size is $$\frac{\Delta m}{z}.$$

A mass/charge value is chosen that is masked in the isotope cluster. This mass/charge value acts as the seed mass/charge of a group of associated mass/charge values. The mass/charge is increased and decreased by steps of $$\frac{\Delta m}{z}$$

and such mass/charge values can be associated even if they are in un-masked portions. The increase and decrease of mass/charge proceeds until the step exceeds the mass/charge boundaries of the isotope cluster. The mass/charge boundaries are determined by a process described in FIGS. 22Z, 22AA. The association is noted in the mass/charge association map as a mapping value that is shared by all mass/charge values that are associated with each other. When the association of this set of mass/charge values is completed, the association method proceeds to the next non-associated mass/charge value that is masked in the isotope cluster and the method repeats this process for a new set of associated mass/charge values. The method is completed when all the masked mass/charge values in the isotope cluster have been associated. Associated pixels have similar (aligned) retention times and share the same mapping values.

Focusing now on multiple of isotope clusters instead of a single isotope cluster, multiple isotope clusters can be formed in a variety of ways. These forms include multiple isotope clusters from the same ion but appearing on multiple LC/MS images; multiple isotope clusters within a charge group that appear on one LC/MS image (see FIG. 8); and multiple isotope clusters within a label set that appear on one LC/MS image (see FIG. 8). These three basic forms of isotope cluster collections may be compounded. For instance, a charge group containing multiple isotope clusters may be compared to (or associated with) corresponding charge groups on multiple images.

Prior to associating among different LC/MS images, a number of initialization steps are performed. One such step is alignment in the retention time dimension. Suitably, isotope clusters are aligned in this dimension. The isotope clusters that are singletons (one isotope cluster on one LC/MS image) or are within a single label set and/or a single charge group are already aligned to each other in the retention time dimension because they are on the same LC/MS image. See FIGS. 2A, 2B, 4A, 4B, 5A, and 5B.

If these isotope clusters were to appear on different LC/MS images, then they are first aligned in the retention time dimension using the microaligner 108. See FIGS. 1, 3A, 3B, 6A, 6B, 7A, and 7B. As described previously, the isotope clusters may be micro-aligned and regionally redefined. When aligning or regionally redefining regions of interest, masked pixels are typically used. In the case of isotope clusters, label sets, and charge groups, the mask contains one or more isotope peaks and the mask may or may not define contiguous regions of interest. A set of isotope clusters on one LC/MS image may be compared to the corresponding sets of isotope clusters on other LC/MS images. The corresponding sets of isotope clusters are defined by a region-of-interest mask.

Regarding associations of isotope peaks within a label set, corresponding portions from different isotope peaks in different isotope clusters that are in the same label set can be compared. The quantitative outcome is a score which indicates whether the label set is well formed. A poorly formed label set flags that a researcher should refrain from basing conclusions on the label set or its member isotope peaks. The member isotope peaks and isotope clusters of a poorly formed label set can be re-grouped so as to form a different label set, which is better formed.

A label set includes a collection of 1 to p isotope clusters on the same LC/MS image and their corresponding portions have a similar retention time and charge state. See FIG. 8. Each isotope cluster within a label set has a different isotopic label. The isotope clusters have corresponding isotope peaks that have nearly the same isotopic composition except for the label. Corresponding regions within a label set are separated by the difference in mass of the labels. ICAT, GIST, iTRAQ and SILAC are some of the established techniques that use isotope labeling to distinguish between two or more samples in one LC/MS run. In these cases, multiple isotope clusters are separated by the mass difference of the various isotope labels.

To better under the structure of a label set, its origin is explored. Isotopic labeling allows two or more biological samples to be analyzed in a single LC/MS run. Because the samples are from the same LC/MS run, the biological samples will be aligned in the retention time dimension. The samples are distinguished from each other by their differing masses that are due to the different isotopic composition of their labels. Due to labeling, the isotope cluster of an ion with one label may be separated from the isotope cluster of the same ion by a different label. The separation occurs in the mass/charge dimension. This collection of differently-labeled isotope clusters is a label set. Common labeling strategies in proteomics include ICAT, GIST, iTrac or SILAC or labeling amino acids with isotopes ($^{13}C$, $^{15}N$, $^2H$).

Focusing now on a physical structure of a label set, the mass/charge of one isotope peak is associated to the mass/charge of another isotope peak in another isotope cluster at the same charge state. The difference in mass that is used for association is the difference of their label masses. For instance, an ion may have been subject to two different labels that have masses $l_1$ and $l_2$ respectively. The first labeling changed the mass of some ions by $\Delta l_1$ and the second labeling changed the mass of other ions by $\Delta l_2$. Ions labeled by $l_1$ may actually be the un-labeled state such that $\Delta l_1=0$.

Each ion labeled with two different labels will give rise to two isotope clusters at a given charge state. As a consequence, one isotope cluster is labeled with $l_1$ and another isotope cluster is labeled with $l_2$. Their respective masses, $m(l_1)$ and $m(l_2)$, are: $m(l_1)=m_r+\Delta l_1$ and $m(l_2)=m_r+\Delta l_2$.

When $\Delta l_1$ is sufficiently different from $\Delta l_2$ so that the signal from the isotope cluster labeled by $l_1$ does not overlap significantly with the signal from the isotope cluster by $l_2$, then there are two isotope clusters whose corresponding isotope peak apexes are separated by $\Delta l$: $\Delta l=\Delta l_2 - \Delta l_1$; the difference in mass/charge of the corresponding isotope peaks in these two labeled isotope clusters is:

$$\Delta\left(\frac{l}{z}\right) = \frac{\Delta l}{z}.$$

Within a label set there may be only one charge state (z) and the allowable values for the charge state (z) are: z=1, 2, 3, . . . . This relationship $$\left(\frac{\Delta l}{z}\right)$$

is used to associate an isotope peak with its corresponding isotope peak that is in another isotope cluster within the same label set.

As the discussion above briefly shows, it is possible to associate mass/charge values within a label set. See FIGS. 22 AC-AF. Associations are made by considering the physical structure of a label set. Isotope peaks whose mass differ due to different labels are on the same image, and their corresponding regions have the same (aligned) retention time but their masses differ. Therefore, pixels within a label set are associated if they have the same retention time but are from different isotope clusters and are separated by $\Delta l$. The association step size is $$\frac{\Delta l}{z}.$$

A mass/charge value is chosen that is masked in the isotope cluster. This mass/charge value acts as the seed mass/charge of a group of associated mass/charge values. By increasing and decreasing mass/charge by steps of $$\frac{\Delta l}{z},$$

it is possible to associate all such mass/charge values even if these values are in non-masked regions. The increase and decrease of mass/charge proceeds until the expiry of the mass/charge boundaries of the label set. The mass/charge boundaries are determined by a process described in FIGS. 22Z-22AA. The association is noted in the mass/charge association map as a mapping value that is shared by all the mass/charge values that are associated with each other. When the association of this set of mass/charge values is completed, the process proceeds to the next non-associated mass/charge value that is masked in the label set and this process is repeated for a new set of associated mass/charge values. The process is completed when all the masked mass/charge values in the label set have been associated. Associated pixels have similar (aligned) retention times and the same mapping values.

Associations within a charge group allow comparison of corresponding portions of different isotope peaks in different isotope clusters that are in the same charge group. The quantitative outcome is a score which reveals whether the charge group is well formed. A poorly formed charge group informs a researcher that he should not base his conclusions on the charge group or its member isotope peaks. Furthermore, the member isotope peaks and isotope clusters connected with the poorly formed charge group can be re-grouped to form a different charge group that results in better form.

A charge group is a collection of 1 to p isotope clusters on the same LC/MS image, and their portions have a similar retention time. See FIG. 8. Each isotope cluster within a charge group has a different charge state. The isotope clusters have corresponding isotope peaks that have nearly the same mass and isotopic composition. Minor changes in mass are due to the change in the number of charge adducts. The mass/charge values in the member isotope peaks of an isotope cluster can be associated with isotope peaks from a different isotope cluster within the charge group by charge state.

Focusing now on the origin of a charge group to better understand its physical structure, a chemical species, detected by mass spectrometry, must be ionized (i.e., charged). A mass spectrometer measures the ratio of mass to charge. The ionized chemical species can have one or more different charge states due to the addition of one or more charged adducts. The charged adduct, along with its mass, was discussed hereinbefore. If the chemical species has multiple charge states, then the mass spectrometer will register this species at multiple mass to charge ratios.

Looking now at a structure of a charge group, it includes multiple isotope clusters. Each isotope cluster within the charge group has a different charge state. Each isotope cluster has the same isotopes as the other isotope clusters within the charge group. The same isotopes with differing charges have approximately the same mass, and their mass/charge values are separated by a computable relationship. Mass/charge $$\left(\frac{m}{z}\right)$$

values from one isotope peak are associated with mass/charge values of another isotope peak within the same isotope cluster, label set, or charge group.

Associations of mass/charge values due to changes in charge state are computable. Given a selected mass/charge value ($y_s$) in an isotope peak with a known charge state ($z_s$), there are computable associated mass/charge values ($y_a$) in other isotope peaks within the same charge group. $y_a$ and $y_s$ are defined by:

$$y_s = \left(\frac{m_s}{z_s}\right)$$

and $$y_a = \left(\frac{m_a}{z_a}\right).$$

$m_s$ and $z_s$ are the mass and charge at one location (like a pixel) on one isotope peak. $m_a$ and $z_a$ are the mass and charge of the corresponding location on another isotope peak. The charge states occur in integer increments:

$Z_a = 1, 2, 3, \ldots$
$z_s = 1, 2, 3, \ldots$

As explained for isotope clusters, the mass values $m_i$ of the n singly charged isotope peaks within an isotope cluster are: $m_i = m_o, m_o+1, m_o+2, m_o+3, \ldots, m_o+n$. For this formula, the mass uncertainty of $m_o$ is greater than 0.01 Dalton but less than 0.5 Dalton. For the singly charged ion $m_o$ is defined as follows: $m_o = m+A$, where m is the neutral mass of the ion.

If the isotope cluster has only one isotope peak, the score of a charge group or multiple charge groups may be determined without mass/charge mapping of isotope peaks within an isotope cluster. This option is suitable when the resolution of the mass spectrometer is insufficient to resolve an isotope cluster into isotope peaks.

$m_s$ differs from $m_a$ due to the number and mass of the charged adducts (A) on the ion. Specifically, $m_s$ and $m_a$ are defined as the mass values within isotope peaks. For a given neutral mass (m) we can define $m_s$ and $m_a$:

$$m_a = m + z_a A$$

$$m_s = m + z_s A$$

Therefore, given a mass/charge value ($y_s$) within an isotope cluster the associated mass/charge values ($y_a$) are determined by the following formula:

$$y_a = \frac{z_s y_s + A(z_a - z_s)}{z_a}$$

As mentioned hereinbefore, associating isotope peaks within a charge group is a computable process. See FIGS. 22AG-22AJ. Pixels defining isotopic portions may be associated by charge state if they have a similar retention time and are in isotope peaks from different isotope clusters within the same charge group. To construct an association map for pixels, a mass/charge map is determined that associates mass/charge values by charge state. A mass/charge value is chosen if it is masked in the charge group. The mass/charge value ($y_s$) acts as the seed mass/charge of a group of associated mass/charge values. The charge state ($z_s$) in the seed isotope cluster is determined by measuring the spacing between the apexes of the isotope peaks in the isotope cluster. Given the mass/charge value ($y_s$) and charge state ($z_s$) of the pixel along with the mass of the charge adduct (A), the mass/charge value ($y_a$) of the associated pixels in other isotope clusters of the same charge group is determined. By increasing and decreasing $z_a$ by steps of 1, it is possible to associate all such mass/charge values even if these values are in un-masked regions. The increase and decrease of $z_a$ proceeds until the charge state of the charge group is exceeded. The association is noted in the mass/charge association map as a mapping value that is common to all the mass/charge values that are associated with each other. When the association of this set of mass/charge values is completed, the next non-associated mass/charge value that is masked in the charge group is used as the seed mass/charge value for a new group of associated mass/charge values. The process of association is repeated for a new set of associated mass/charge values. The process is completed when all the masked mass/charge values in the charge group have been associated. Associated pixels have a similar (aligned) retention time and the same mapping values.

As an example in associating portions of a charge group, assume, for instance, that four peaks exist in one isotope cluster whose mass/charge apexes are:

$$\left(\frac{m_i}{z}\right) \approx 400, 400.333, 400.667, 401; z = 3.$$

The charge state (z) was determined to be 3 based on the mass/charge separation $$\left(\frac{\Delta m}{z}\right)$$

between the isotope peak apexes which are ⅓. These four peaks are isotope peaks whose mass/charge values $$\left(\frac{m_i}{z}\right)$$

are described as follows:

$$\left(\frac{m_i}{z}\right) = \left(\frac{m+i}{z}\right),$$

where $m = m_o + zA$, and where $i = 0, 1, 2, \ldots$, and further where $m_o$ is the neutral mass of the ion and A is the adduct mass, which in this case is approximately 1 (that is, a proton adduct).

The respective corresponding peaks at charge state 1 have apexes at mass/charge values:

$$\left(\frac{m_i}{z}\right) \approx 1198, 1199, 1200, 1201.$$

The respective corresponding peaks at charge state 2 have apexes at mass/charge values:

$$\left(\frac{m_i}{z}\right) \approx 599.5, 600, 600.5, 601.$$

So far, this example specified the apexes of isotope peaks. The same rules for association apply to all the pixels of an isotope peak. An association of regions from one charge state to another involves expanding or compressing the mass/charge peak width. If comparison of an isotope peak at 400 mass/charge with tolerance of plus or minus 0.01 is desired, which isotope peak has charge state 3 with a corresponding isotope peak at charge state 1. This example peak has a mass/charge width of 0.02 (Dalton/charge). The corresponding isotope peak at charge state 1 will be centered around 1198 mass/charge and the mass/charge width will be plus or minus 0.03 (Dalton/charge), and this example peak has a mass/charge width of 0.06 (Dalton/charge). Therefore, the above example suitably is repeated for every pixel in an isotope peak, not just the apex.

A correlation scorer 116 uses the peak association matrix produced by the peak association matrix maker 112 and the map produced by the mass-charge association mapper 114 to create one or more correlation scores. However, the correlation scorer 116 may in certain embodiments produce correlation scores without the peak association matrix produced by the peak association matrix maker 112 and the map produced by the mass-charge association mapper 114. In these embodiments, there is no need to associate portions with different mass/charge values. Isotope clusters and collections of isotope clusters can be processed as regions of interest without associations among different mass/charge values. This means that isotope clusters, charge groups, and label sets are regarded as regions of interest that are processed by microalignment, regional redefinition, and correlation scoring. These regions of interest may or may not be contiguous as described above. See FIGS. 9A, 9B.

Multiple correlation scores are combined by a score combiner 118. These are multiple correlation scores from individual isotope peaks, as described previously, that are within an isotope cluster, label set, or charge group, and can be combined to generate a single score. The score combiner 118 need not require mass/charge associations because portions with the same mass/charge values are compared with each other. The correlation score (R) is a combination of a number of correlation scores (each numerically between zero and one), and any subset of these correlation scores can be combined to form a new score in accordance with the following process:

$$R = \prod_{h}^{l} R_h$$

where $R_h$ is the $h^{th}$ score in a collection of l scores and R is the combined score.

Examples where a combined score may be used include scores from corresponding isotope clusters on different images that may be combined to present an image-selection-wide score for this isotope cluster; scores from the different isotope clusters within a charge group or a label set can be combined to generate a different kind of charge group or label set score than is generated by considering the charge group or label set as a whole; and scores, like $R_{3,1}$ and $R_{3,4}$ (discussed hereinbelow) that are from a two-dimensional method may be combined to derive a score that reflects both isotope cluster quality and reproducibility.

Subsequently, a score classifier 120 classifies the scores to aid a researcher to determine biological features of interest.

The score classifier 120 helps the researcher to evaluate the usage of scores. Isotope clusters, label sets and charge groups with higher scores are likely to be more reliable. The score may reveal whether an isotope cluster, label set, or charge group is well-formed and/or whether it is reproducible. A poorly formed or poorly reproduced isotope peak collection is also revealing, such as that the researcher should not base conclusions on a collection of isotope clusters, or that the member isotope peaks and clusters may have to be re-grouped to form different isotope clusters and isotope cluster collections, and so on.

As discussed, scoring may be helpful in reconstructing isotope gatherings to which an isotope peak belongs (deconvolution). If there are multiple possibilities for constructing an isotope cluster, label set, or charge group, then the method may favor the choice that has the highest correlation score. This means that these scores can aid in the deconvolution of isotope clusters (deisotoping), label sets, and charge groups. The method can group different, mutually exclusive combinations of isotope peaks in an isotope cluster, and further can group different isotope clusters into collections of isotope clusters. Each isotope cluster and isotope cluster collection is scored. These scores help to determine which grouping of isotope peaks into isotope clusters and into isotope cluster collections is better than others.

The proposed gathering of isotope peaks may, however, be erroneous. One purpose of scoring these gatherings of isotope peaks is to evaluate whether a gathering of isotope peaks was well formed. If a score is too low, one answer is that the gathering of isotope peaks was not well formed. The system may then choose to form an alternate gathering of isotope peaks, using some or all of these isotope peaks along with other isotope peaks. The process may be repeated until the score is high.

A number of deconvolution example scenarios are possible. In an isotope cluster, the method identifies the isotope peak that has the lowest correlation score. The method may remove the isotope peak from the isotope cluster if the removal will improve the isotope cluster score. Often the method encounters a situation where an isotope peak can be grouped into one of two isotope groups. The method's actions may have two possible outcomes. The method can calculate the combined scores of these two isotope clusters for either outcome. The outcome with the higher combined score is favored. Deisotoping an isotope cluster can leverage the multiple charge states of a charge group. An isotope cluster that can be corroborated by an isotope cluster from a different charge state should be given a higher score. This can be accomplished by allowing the isotope clusters to inherit the score of their charge group. In a charge group that has q isotope clusters, the method can compare the isotope clusters among a set of LC/MS images. This results in q scores per charge group. Comparison of these q scores may allow exclusion of an isotope cluster from this charge group and thus aid in deconvolution of the charge group.

An observation is made regarding intensity distributions due to isotopic composition. Often, the intensity distribution of an isotope cluster cannot be readily predicted. Instead of choosing an intensity distribution that fits an a priori distribution, the method can choose the most consistent or reproducible distribution. The method looks for reproducibility and/or quality of isotope clusters, among replicates, within charge groups, and/or within label sets.

A number of figures share visual elements that are similar. For the sake of brevity, some of these shared visual elements are discussed here to help ease and aid understanding of the various figures. FIGS. 2A, 3A, 4A, 5A, 6A, 8, 9A, 10, 11, 16A, 16B, 17, 18, 19, 20, and 21 show concentric circles that are contour lines. Analogous to a topographic map, a contour line represents an isoline for one intensity where the gradient is perpendicular to the contour line. Multiple concentric contour lines indicate increasing intensity toward the more central contour line. The horizontal dimension depicts the retention time dimension and the vertical dimension depicts the mass/charge dimension.

FIGS. 2B, 3B, 4B, 5B, 6B, 7B, 12A, 12B, 12C, 13A, 13B, 13C, 14A, 14B, 15A, 15B, and 15C mathematically represent each isotope peak as if it has a unique designation that indicates its isotope cluster and its position within its isotope cluster or collection of isotope clusters on one image. The isotope peak designations form a matrix. Each matrix column represents an isotope cluster or collection of isotope clusters, and the matrix row represents the position within the (collection of) isotope clusters. Each peak may be represented by a series of intensities. This series of intensities may be either a chromatogram, mass spectrum, or a serialization of the pixel intensities. This series of intensities constitutes a vector. For this reason, the system 100 represents each isotope peak as a vector ($\overrightarrow{c_{1,1}}$ and so on) in the peak association matrix.

FIG. 2A illustrates a diagram 202 that shows an image snippet, which comprises five isotope peaks. These five isotope peaks can be logically assembled as an isotope cluster. Each isotope peak within an isotope cluster is generally within the same retention time period, but is spaced apart from others in the mass-charge dimension by being separated by a unit of measurement called the Dalton. Each isotope peak is identified by the nomenclature $C_{J,1}$, where the J represents the row or the location along the mass-charge dimension of a particular isotope peak, and the number "1" represents the column, or a location along the retention time dimension in which all isotope peaks within an isotope cluster reside. For example, the identifiers $C_{1,1}$; $C_{2,1}$; $C_{3,1}$; $C_{4,1}$; and $C_{5,1}$ all represent the various isotope peaks within the isotope cluster shown by the diagram 202.

FIG. 2A illustrates an example of correlating an isotope cluster on one LC/MS image. If individual isotope clusters are selected for scoring, an appropriate peak association matrix may be constructed to score such an isotope cluster. In this case a single isotope cluster with five isotope peaks is selected for scoring (see image snippet). The first dimension of the peak association matrix reflects the number of masked isotope peaks in the isotope cluster. As such, the first dimension is the sequence of the five isotope peaks within the cluster. This dimension is the same as the sequence of mass/charge of the isotope peak apexes. Since one isotope cluster or set of isotope clusters is considered, there is one column and the second dimension of this peak association matrix is trivial.

FIG. 2B illustrates a peak association matrix 204, which is a mathematical representation of the isotope peaks within the isotope cluster illustrated by FIG. 2A. The identifier of each isotope peak is reused by the peak association matrix 204 to uniquely identify the various isotope peaks. The peak association matrix 204 is collectively and mathematically named as C, which is seen to be equated to the matrix of one column and five rows, each row containing the identifier of an isotope peak.

FIG. 3A is similar to FIG. 2A except diagram 302 illustrates two other snippets of various images. Each snippet includes various isotope peaks. For example, the snippet of image 2 includes five isotope peaks identified as $C_{1,2}$; $C_{2,2}$; $C_{3,2}$; $C_{4,2}$; and $C_{5,2}$. The snippet of image 3 includes five isotope peaks identified as $C_{1,3}$; $C_{2,3}$; $C_{3,3}$; $C_{4,3}$; and $C_{5,3}$. FIG. 3A provides an example of correlating isotope clusters across multiple images. If isotope clusters with the same mask but on different LC/MS images are selected for scoring, an appropriate peak association matrix is constructed to score such a collection of isotope clusters. In this case, an isotope cluster with five isotope peaks was detected in a collection of three images (see image snippet). The first dimension of the peak association matrix reflects the number of masked isotope peaks within the isotope cluster that is on each LC/MS image. As such, the first dimension is the sequence of the five isotope peaks within a cluster. This dimension is the same as the sequence of mass/charge of the isotope peak apexes. The second dimension of this peak association matrix is the sequence of LC/MS images.

FIG. 3B illustrates a peak association matrix 304 that mathematically represents various isotope peaks shown by FIG. 3A. The peak association matrix 304 is organized by five rows, each row representing a series of isotope peaks that share a similar mass overcharge location. The peak association matrix 304 further includes three columns, each column representing isotope peaks contained within a snippet. Each cell of the peak association matrix 304 contains an identifier that uniquely identifies an isotope peak illustrated by FIG. 3A.

Figures 4A, 4B:
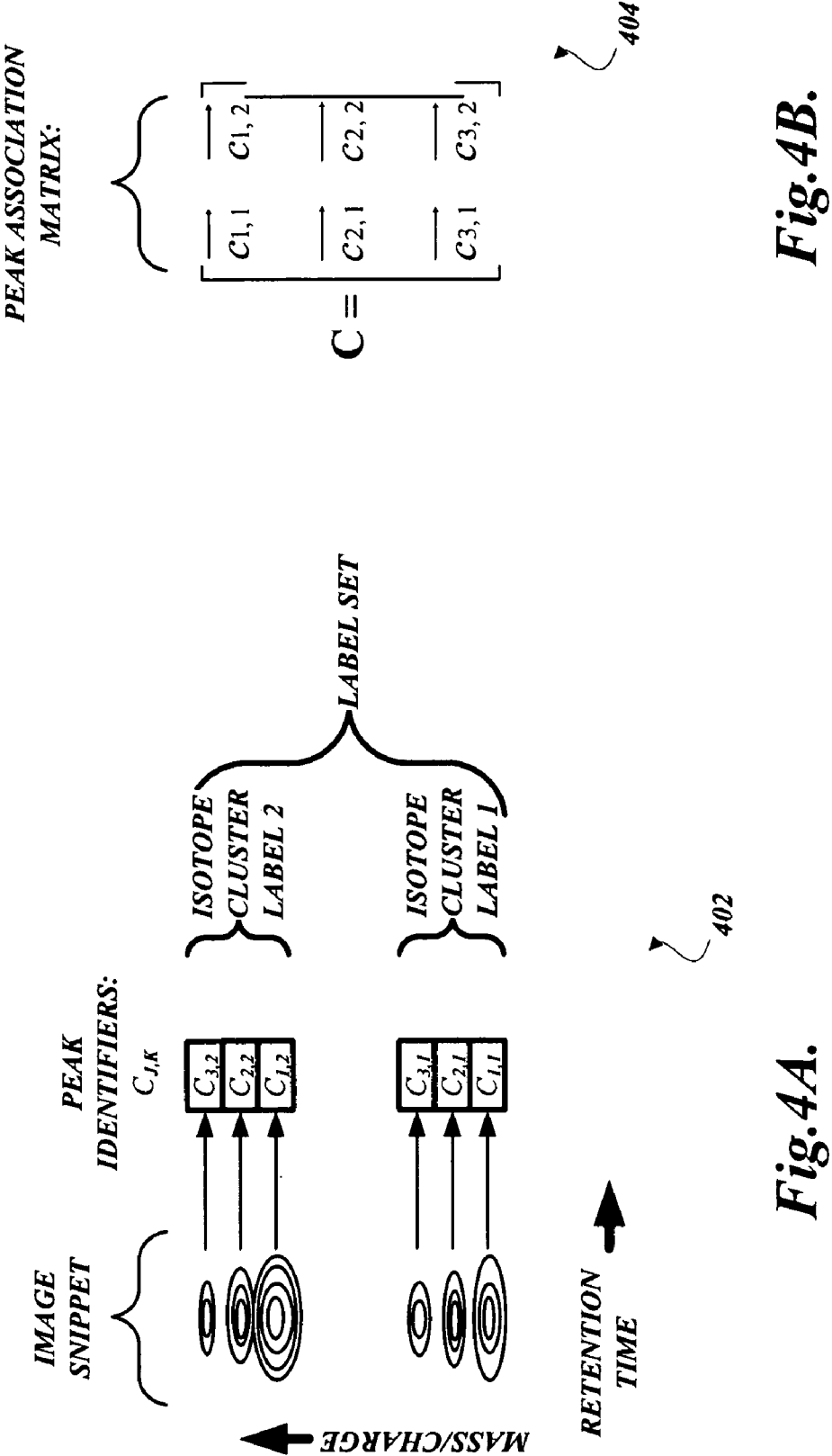
FIGS. 4A-4B are pictorial diagrams illustrating isotope clusters in a label set form and their matrix mathematical representation, in accordance with one embodiment of the subject matter.

FIG. 4A illustrates a diagram 402 which shows an image snippet with two distinct sets of isotope peaks as a result of isotopic labeling. The first set of isotope peaks are identified as $C_{1,1}$; $C_{2,1}$; and $C_{3,1}$. The other set of isotope peaks are identified as $C_{1,2}$; $C_{2,2}$; and $C_{3,2}$. The first set of isotope peaks is an isotope cluster associated with label 1. The second set of isotope peaks is an isotope cluster identified as label 2. Together, these two sets of isotope peaks or two isotope clusters are a label set.

FIG. 4A thus provides an example of correlating isotope clusters within a label set on one image. If individual label sets with one or two isotope clusters are selected for scoring, an appropriate peak association matrix (see FIG. 4B) is constructed to score such a label set. In this case, the data selection contains one LC/MS image. In this example, isotopic labeling was used to distinguish between two samples, representing two conditions such as treatment and control. The label sets contain two isotope clusters (see image snippet) because two samples were used that could be distinguished by their isotopic label. One of the samples may be unlabeled and therefore exhibit the natural isotopic distribution. The first dimension of the peak association matrix reflects the number of masked/associated isotope peaks in each isotope cluster. Since there are three isotope peaks per isotope cluster, there are three rows in this peak association matrix. The second dimension of this peak association matrix reflects the number of labels used in the experiment. Consequently, there are two columns in this peak association matrix.

FIG. 4B illustrates a peak association matrix 404 that mathematically represents the label set illustrated in FIG. 4A. Unlike previous peak association matrices 204, 304, the peak association matrix 404 is in two columns, notwithstanding the fact that only one image snippet is provided, as illustrated at FIG. 4A. The first column of the peak association matrix 404 contains the identifiers of various isotope peaks of the isotope cluster with the label 1. The second column of the peak association matrix 404 contains identifiers of various isotope peaks of the isotope cluster identified as label 2. Each row of the peak association matrix 404 represents an isotope peak at different points in the mass-charge dimension, albeit at a similar location in the retention time dimension.

Figures 5A, 5B:
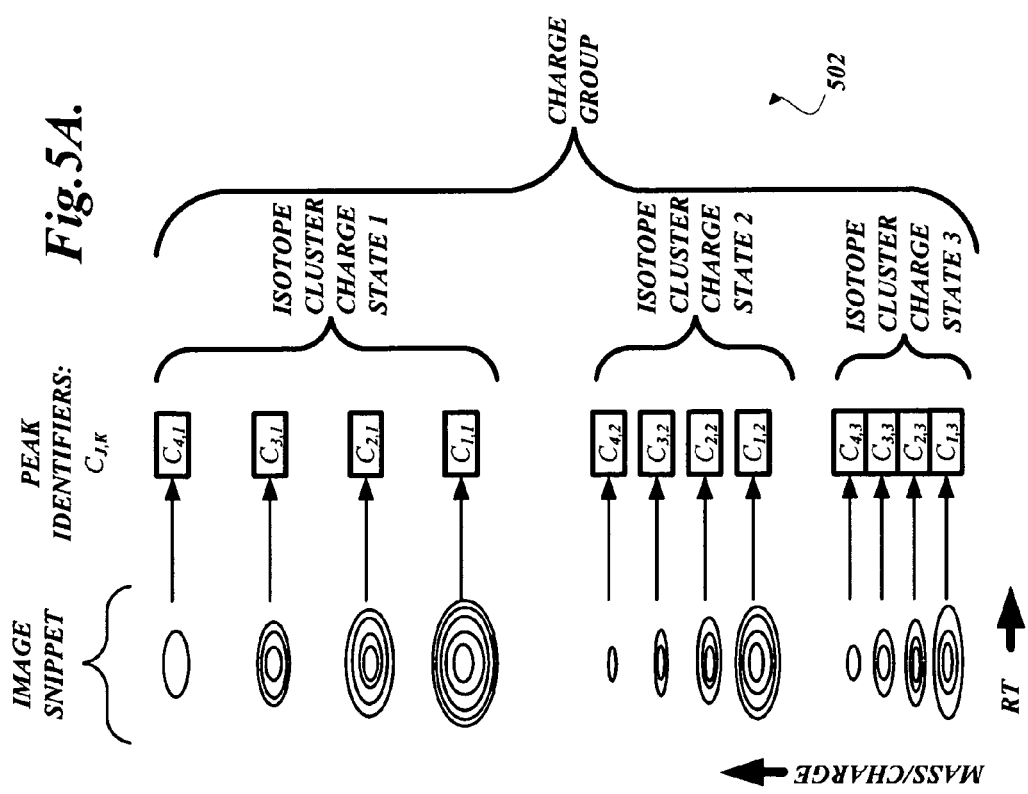
FIGS. 5A-5B are pictorial diagrams illustrating isotope clusters in a charge group form and their matrix mathematical representation, in accordance with one embodiment of the present subject matter.

FIG. 5A illustrates a representation of a charge group 502. The charge group 502 includes several charge states. For charge state 1, an isotope cluster exists that includes various isotope peaks identified as $C_{1,1}$; $C_{2,1}$; $C_{3,1}$; and $C_{4,2}$. Charge state 2 includes another isotope cluster which comprises various isotope clusters identified as $C_{1,2}$; $C_{2,2}$; $C_{3,2}$; and $C_{4,2}$. The charge state 3 includes an isotope cluster that comprises various isotope peaks that are identified as $C_{1,3}$; $C_{2,3}$; $C_{3,3}$; and $C_{4,3}$.

FIG. 5A provides an example of correlating isotope clusters within a charge group on one image. If individual charge groups with one or more isotope clusters are selected for scoring, an appropriate peak association matrix is constructed to score such a charge group. See FIG. 5B. In this case, the data selection contains one LC/MS image. In this example, a charge group was detected that has three isotope clusters (see image snippet). The first dimension of the peak association matrix reflects the number of masked/associated isotope peaks in each isotope cluster. Since there are four isotope peaks per isotope cluster, there are four rows in this peak association matrix. The second dimension of this peak association matrix reflects the number of isotope clusters found in this charge group. Consequently, there are three columns in this peak association matrix.

Like FIG. 4B in which the peak association matrix 404 is in multiple dimensions to represent various labelings of isotope clusters, a peak association matrix 504 mathematically represents the charge group 502 in three columns, each column representing a particular charge state. See FIG. 5B. Each row of the peak association matrix 504 represents the individual isotope peaks found at each charge state of the charge group 502.

FIG. 6A illustrates a diagram 602 that shows isotope clusters from a number of snippets from various images. The snippet of image 1 contains six isotope peaks in two clusters, each isotope peak is identified as $C_{1,1}$; $C_{2,1}$; $C_{3,1}$; $C_{4,1}$; $C_{5,1}$; and $C_{6,1}$. The snippet of image 2 also contains six isotope peaks identified as $C_{1,2}$; $C_{2,2}$; $C_{3,2}$; $C_{4,2}$; $C_{5,2}$; and $C_{6,2}$. The snippet of image 3 further contains six isotope peaks identified as $C_{1,3}$; $C_{2,3}$; $C_{3,3}$; $C_{4,3}$; $C_{5,3}$; and $C_{6,3}$. The snippet of image 4 contains six isotope peaks identified as $C_{1,4}$; $C_{2,4}$; $C_{3,4}$; $C_{4,4}$; $C_{5,4}$; and $C_{6,4}$.

FIG. 6A provides an example of correlating a label set over multiple images. If a collection of corresponding label sets from multiple images, each with one or more isotope clusters, is selected for scoring, then an appropriate peak association matrix is constructed to score such a collection of label sets. See FIG. 6B. In this case, the data selection contains multiple LC/MS images. In this example, the number of images is four, and the label set contains six isotope peaks (see image snippets). The first dimension reflects the number of masked isotope peaks in the label set. In this case, the first dimension is a collection of isotope clusters, not just one isotope cluster. In other words, the first dimension of the peak association matrix is the sequence of isotope peaks in the label set, which means that the first dimension is also the mass/charge of the peak apexes. Since there are six isotope peaks per label set, there are six rows in this peak association matrix. The second dimension of this peak association matrix is the sequence of LC/MS images.

FIG. 6B illustrates a peak association matrix 604 that mathematically represents the isotope peaks found in various snippets of various images illustrated in FIG. 6A. Six rows of the peak association matrix 604 contain each of the isotope peaks and four columns, each column representing each snippet of an image.

FIG. 7A illustrates two snippets of different images 1, 2. Each snippet contains three isotope clusters, each isotope cluster describing four isotope peaks. The isotope peaks of the snippet of image 1 are identified as $C_{1,1}$; $C_{2,1}$; $C_{3,1}$; $C_{4,1}$; $C_{5,1}$; $C_{6,1}$; $C_{7,1}$; $C_{8,1}$; $C_{9,1}$; $C_{10,1}$; $C_{11,1}$; and $C_{12,1}$. The snippet of image 2 includes three distinct isotope clusters, each cluster including four isotope peaks. The isotope peaks of this snippet of image 2 are identified as $C_{1,2}$; $C_{2,2}$; $C_{3,2}$; $C_{4,2}$; $C_{5,2}$; $C_{6,2}$; $C_{7,2}$; $C_{8,2}$; $C_{9,2}$; $C_{10,2}$; $C_{11,2}$; $C_{12,2}$.

FIG. 7A provides an example of correlating a charge group over multiple LC/MS images. If a collection of corresponding charge groups from multiple images, each with one or more isotope clusters, is selected for scoring, an appropriate peak association matrix is constructed to score such a collection of charge groups. In this case, the data selection contains multiple LC/MS images. In this example, the number of images is two, and the charge group contains 12 isotope peaks (see image snippets). The first dimension reflects the number of masked isotope peaks in the charge group. In this case, the first dimension is a collection of isotope clusters, not just one isotope cluster. In other words, the first dimension of the peak association matrix is the sequence of isotope peaks in the charge group, which means that the first dimension is also the mass/charge of the peak apexes. Since there are 12 isotope peaks per charge group, there are 12 rows in this peak association matrix. The second dimension of this peak association matrix is the sequence of LC/MS images.

These isotope peaks are mathematically represented by a peak association matrix 700B. See FIG. 7B. The peak association matrix 700B is organized in 12 rows and two columns, each column representing peak identifiers found from respective snippets of images. For example, Column 1 of the peak association matrix 700B contains peak identifiers from the snippet of image 1. The second column of the peak association matrix 700B includes peak identifiers from the isotope peaks of the snippet of image 2.

Figure 8:
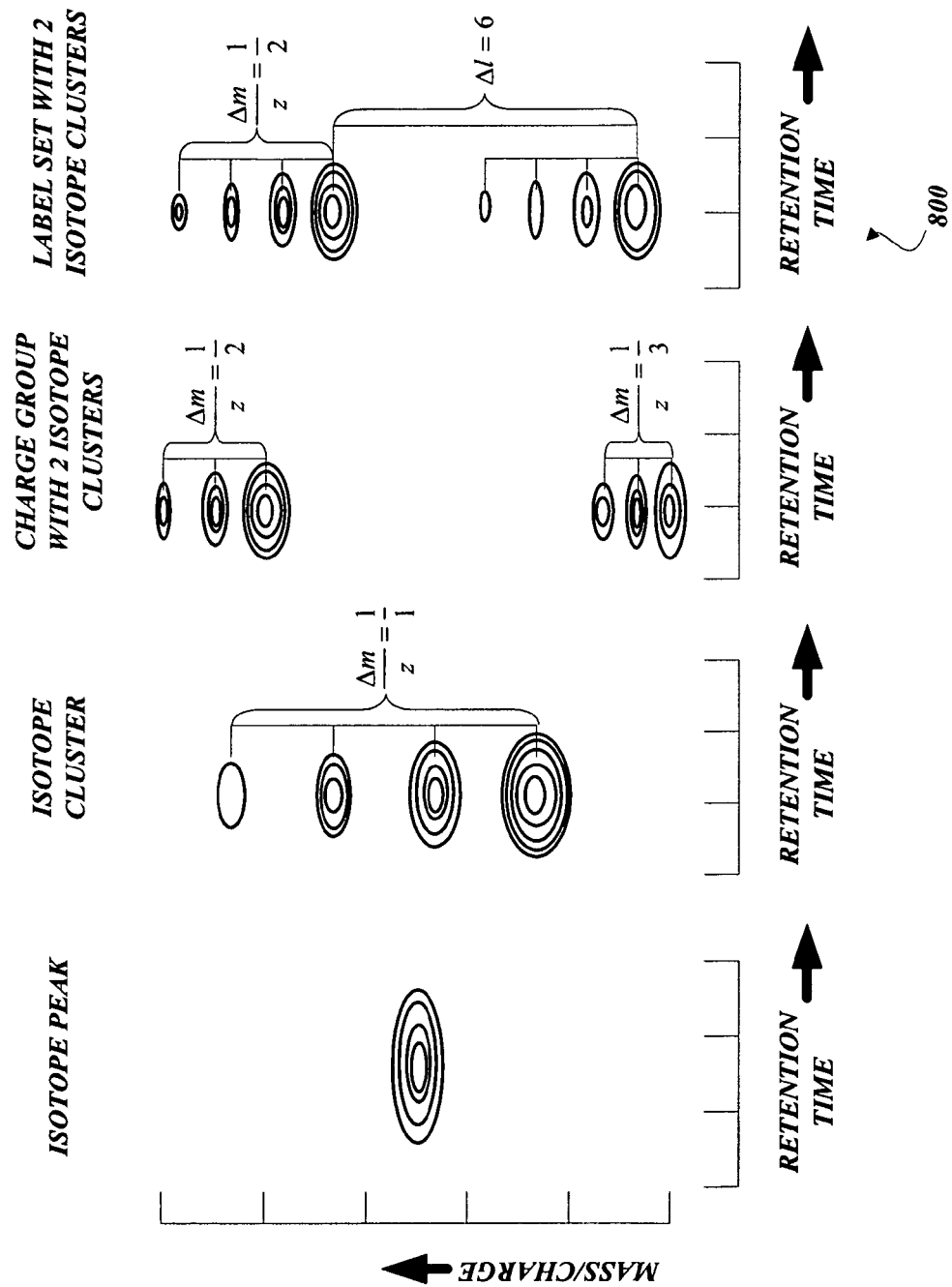
FIG. 8 is a pictorial diagram illustrating isotope peaks, isotope clusters, a charge group, and a label set, in accordance with one embodiment of the present subject matter.

FIG. 8 illustrates a diagram 800 that shows different forms in various panels of isotope information that is processed by various embodiments of the present subject matter. The diagram 800 illustrates an isotope peak in the first panel, which is an area of varying pixel intensity along two dimensions: the retention time dimension and the mass-charge dimension. An isotope cluster in the second panel is another form of isotope information that includes a number of isotope peaks that are conceptually related to one another. Each isotope peak of the isotope cluster, as shown in the diagram 800, has a charge of 1 expressed by the charge variable Z. The diagram 800 also illustrates a charge group with two isotope clusters, each cluster includes three isotope peaks. See the third panel. These isotope clusters are separated by a charge state. In one isotope cluster, the charge state is 3, as represented by the charge variable Z, and the other charge state is 2, as identified by the variable Z. Finally, the diagram 800 illustrates two different isotope clusters being artificially separated by a label in a label set. See the fourth panel. For example, each isotope peak in one isotope cluster is separated from a corresponding isotope peak in the other cluster by a label of 6, as shown in FIG. 8.

In FIG. 8, any of the isotope peaks in these four panels can be processed to yield a spectrum, a chromatogram, and/or a serialized ordering of all the intensity values. The first (left hand) panel is a schematic of an isolated LC/MS isotope peak. There are two possibilities as to why this isotope peak is isolated: the ion may be isotopically pure, and the isotopes of this isotope cluster are not resolvable due to LC/MS machinery limitations. The second panel is a schematic of an isotope cluster that contains four isotope peaks. These isotope peaks are from the same ion and charge state. The molecular mass of the isotope peaks are spaced by approximately 1 Dalton. The isotope peaks are all at the same retention time. Since the spacing of the peak apexes (or centroids) is one mass/charge unit, the charge state of this isotope cluster is 1.

The third panel is a schematic of a charge group that contains two isotope clusters, each with three isotope peaks. The isotope peaks are all at the same retention time. Based on the mass/charge spacing the bottom isotope cluster has a charge state of 3 and the top isotope cluster has a charge state of 2. Since these two isotope groups have different charge states, their corresponding isotope peaks must also have slightly different molecular masses to allow for the different charge states. The fourth panel is a schematic of a label set that contains two isotope clusters, each with four isotope peaks. In a label set, all the isotope clusters have the same charge state. In this example the charge state is 2. The isotope peaks are all at the same retention time. Based on the mass/charge spacing between corresponding peaks among the isotope clusters, the difference in label mass is 6 Daltons.

Figure 9B:
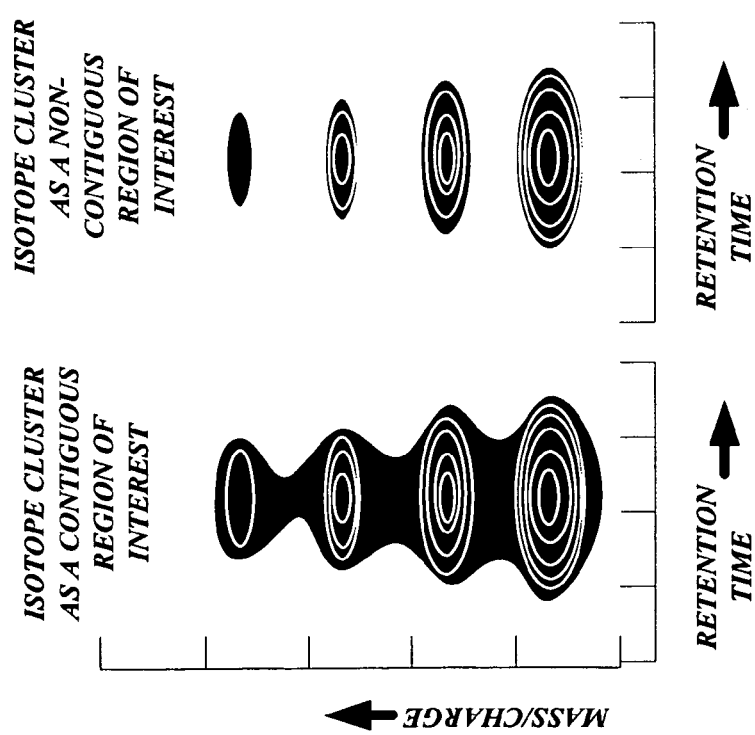
FIGS. 9A-9B are pictorial diagrams illustrating a contiguous region of interest and a non-contiguous region of interest, in accordance with one embodiment of the present subject matter.
Figure 9A:
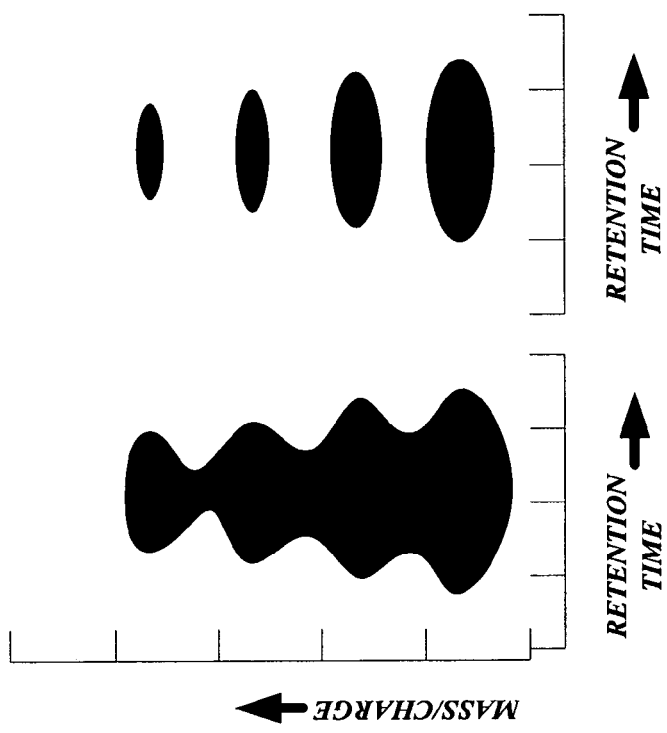

FIG. 9A illustrates a diagram 900A that shows both a contiguous region of interest (left panel) and a non-contiguous region of interest (right panel0. The system 100 of various embodiments of the present subject matter can process both the contiguous region of interest and the non-contiguous region of interest, as shown in diagram 900A. Both the contiguous region of interest and the non-contiguous region of interest capture an isotope cluster with four isotope peaks. In the contiguous region of interest, the system 100 connects the various isotope peaks within the isotope cluster to treat various individual isotope peaks as a singular unit for processing. In contrast, the non-contiguous region of interest includes four distinct regions, each region covering a distinct isotope peak, which is non-contiguous. The system 100 can also process the non-contiguous region of interest as if it were a single entity. Diagram 900B of FIG. 9B illustrates the mask connected with the contiguous region of interest (left panel) as well as the non-contiguous region of interest (right panel) without the topographical rings illustrating varying pixel intensities connected with various isotope peaks.

Left and right panels contain the same image snippet (with the same isotope cluster) in which a region of interest is defined by the masked area. The masked area is the blackout area. The masked area defines portions of the region of interest. In the left panels, the masked area is larger and includes regions surrounding the peaks such that the masked area is contiguous. Since the mask defines the region of interest, the region of interest is contiguous. In the right hand panels, the mask that defines the region of interest is non-contiguous. Only the masked areas are considered for micro-alignment regional redefinition. The mask is suitably consistent from one image to the next. The non-masked area may or may not have intensity variations such as noise and peaks. The masked area is considered for scoring. The non-masked is not considered for scoring since there are no mass/charge associations in this example. These same principles apply to collections of isotope clusters like charge groups and label sets.

Figure 10:
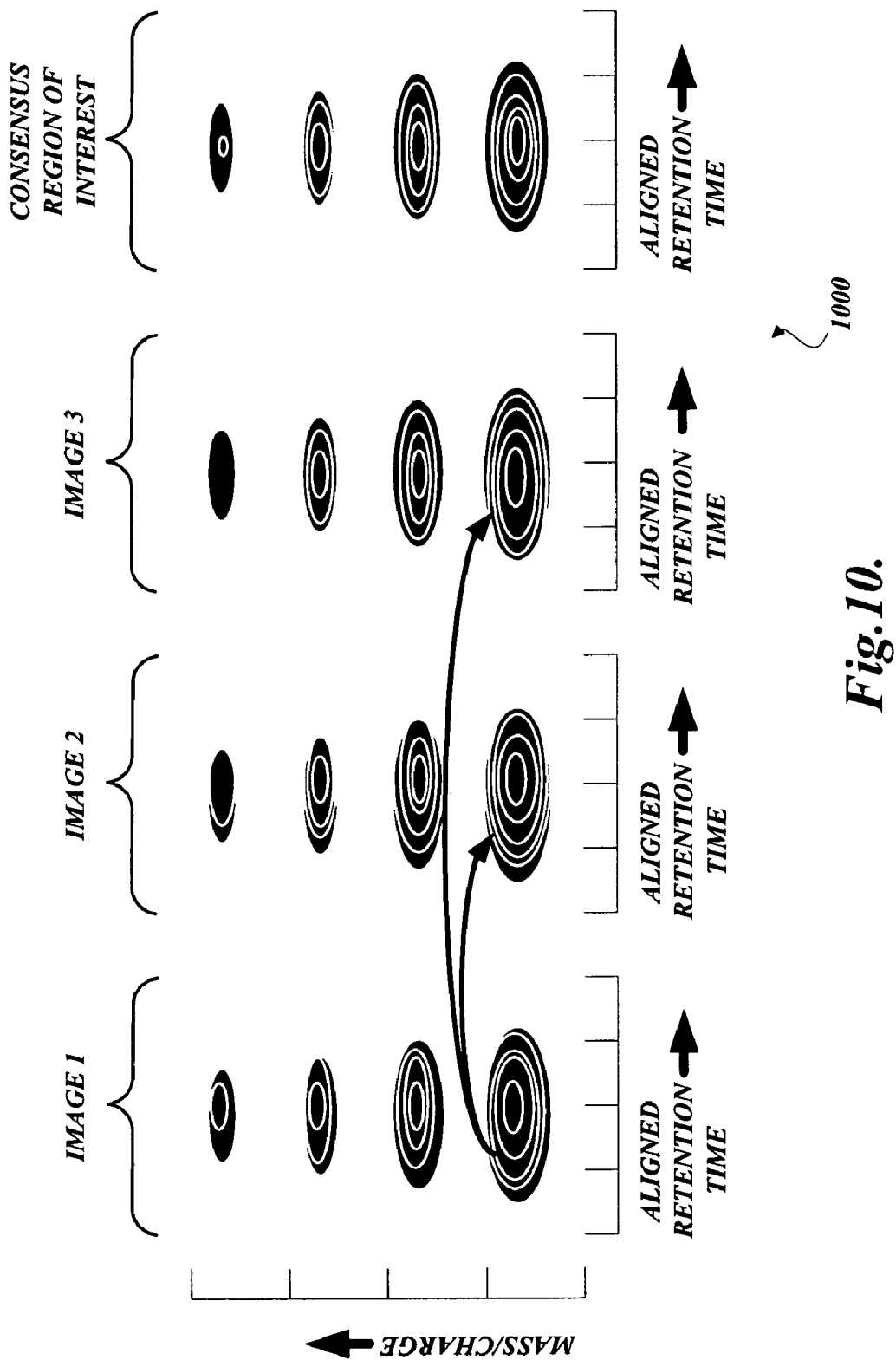
FIG. 10 is a pictorial diagram illustrating association of isotope peaks among images to form a consensus region of interest, in accordance with one embodiment of the present subject matter.

FIG. 10 illustrates a diagram 1000 that shows three LC/MS images 1-3, each including four isotope peaks in a cluster. Each pixel in a non-contiguous region of interest is correlated with corresponding non-contiguous regions of interest in other images to form a consensus region of interest, as shown by the diagram 1000. The correlation to form the consensus region of interest as shown in the diagram 1000 is in one dimension, particularly in the retention time dimension.

An image snippet from each of three LC/MS images contains an isotope cluster. The image snippets and isotope clusters have similar aligned retention time. These three isotope clusters are each defined by the same single mask that is non-contiguous. Each masked region (pixel) from one image can be associated with the corresponding regions on the other two images that have similar mass/charge and aligned retention time. Processing of this non-contiguous region of interest proceeds in the same manner as described hereinabove and hereinbelow. Specifically, a consensus isotope cluster is derived from the isotope clusters of the three image snippets. The consensus isotope cluster is used for assimilation of each of the regions-of-interest.

Figure 11:
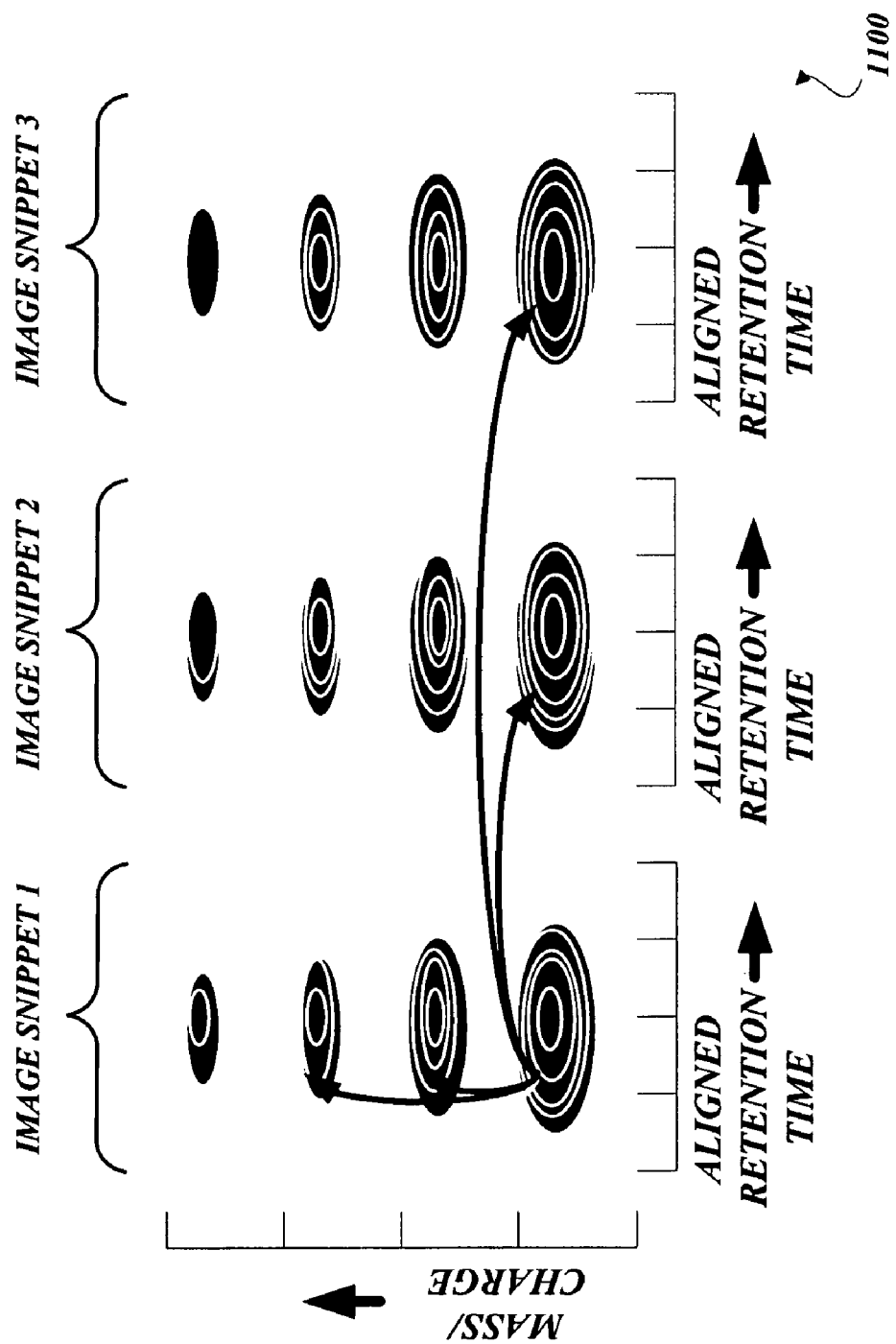
FIG. 11 is a pictorial diagram illustrating association in two dimensions (such as the retention time dimension and the mass-charge dimension) among isotope peaks of isotope clusters and among image snippets, in accordance with one embodiment of the present subject matter.

FIG. 11 illustrates a diagram 1100 where the correlation is being made in two dimensions, particularly in the retention time dimension as well as in the mass-charge dimension. Three image snippets 1-3 are provided by the diagram 1100, each including an image cluster and each image cluster includes four isotope peaks.

An image snippet from each of three LC/MS images contains an isotope cluster. The image snippets and isotope clusters have a similar aligned retention time. Micro-alignment and regional redefinition is executed considering the whole non-contiguous region of interest. Each portion (pixel) within one of the isotope peaks can be associated with corresponding regions within the isotope cluster. The corresponding regions are on the same image, have the same retention time, and the masses differ by an integer number of Daltons. The mass/charge value is the mass difference divided by the charge state. The arrows that point to pixels that are vertically aligned show the associations from one pixel to its corresponding pixels based on a mass/charge association map that considers differences in isotopic masses. Additionally, each portion (pixel) within one of the isotope peaks can be associated with the corresponding portion that has similar mass/charge and aligned retention time on the other two LC/MS images. The arrows that point to pixels that are horizontally aligned show the associations from one pixel to its corresponding pixels based on aligned retention time.

FIGS. 12A-12C and corresponding diagrams 1200A-1200C; FIGS. 13A-13C and corresponding diagrams 1300A-1300C; FIGS. 14A-14B and corresponding diagrams 1400A-1400B; and FIGS. 15A-15C and corresponding diagrams 1500A-1500C are mathematical representations in matrix form of various isotope peaks in various LC/MS images and their processing, in accordance with various embodiments of the present subject matter.

Figure 16A:
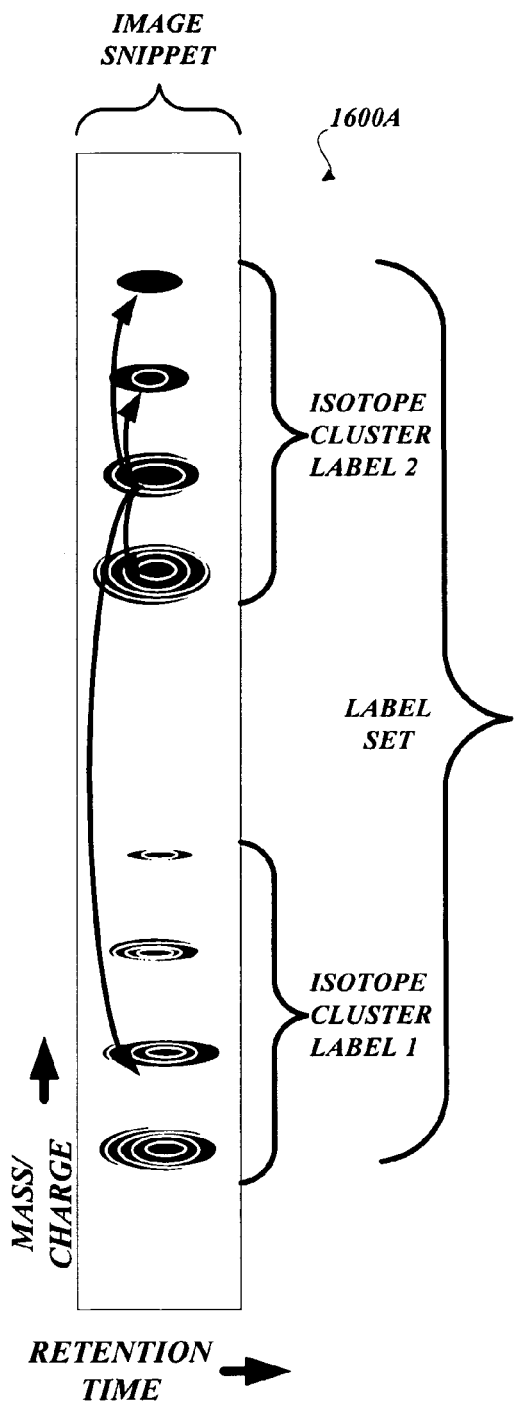
FIGS. 16A-16B are pictorial diagrams illustrating a label set of associated isotope peaks between isotope clusters and a charge group of associated isotope peaks between isotope clusters, in accordance with one embodiment of the present subject matter.

FIG. 16A illustrates a diagram 1600A that shows an image snippet. The image snippet of the diagram 1600A includes two isotope clusters, each formed from a different label. The bottom isotope cluster is formed from label 1. The upper isotope cluster of the diagram 1600A is formed from a label 2. Together, the two labeled isotope clusters form a label set. An image snippet from one LC/MS image contains a label set with two isotope clusters (labels). The isotope clusters have the same retention time. Each masked portion (pixel) within can be associated with corresponding regions within its isotope cluster. The corresponding regions have a similar retention time and their masses differ by an integer number of Daltons. The three shorter arrows indicate the associations from one pixel to its corresponding pixels based on a mass/charge association map that considers differences in isotopic masses. Additionally, each region (pixel) within one of the isotope peaks can be associated with corresponding regions that have the same aligned retention time and whose mass/charge value differs due to differences in isotopic labeling. The longest arrow indicates the association from one pixel to its corresponding pixel based on a mass/charge association map that considers differences in isotopic labeling.

Figure 16B:
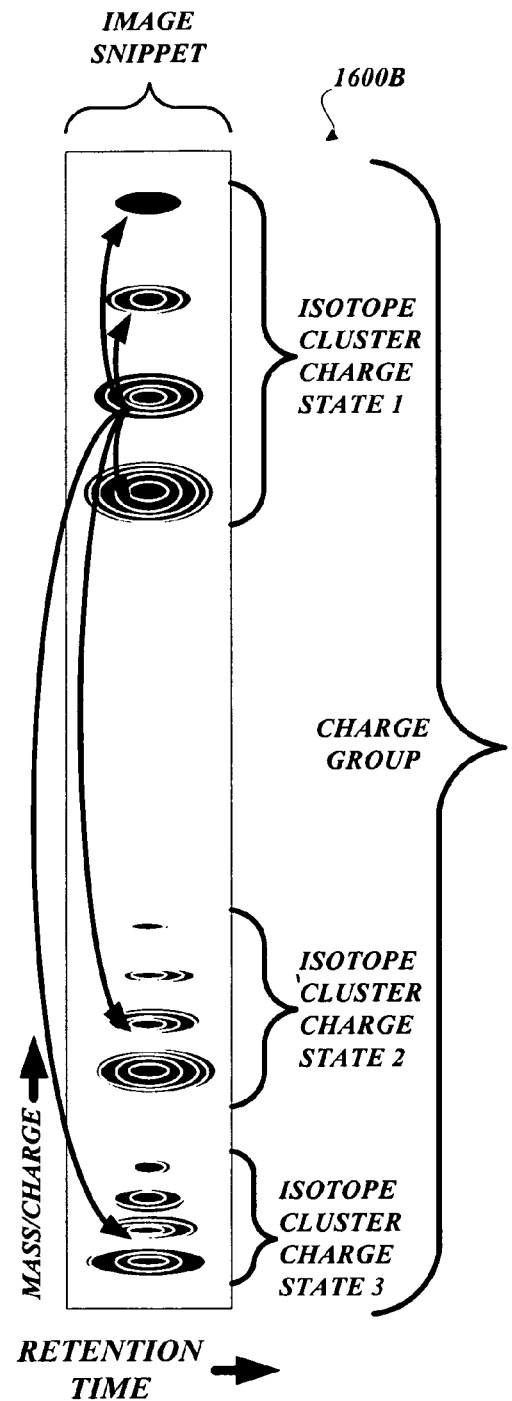

FIG. 16B illustrates a charge group 1600B that comprises three isotope clusters, each in its charged state. The bottom isotope cluster is in charge state 3 with four isotope peaks. The middle isotope cluster of the diagram 1600B is in charge state 2 and comprises four isotope peaks. The upper isotope cluster is in charge state 1 and also comprises four isotope peaks. Arrows emanating from one of the isotope peaks indicate the various locations where a pixel from which the arrows emanate is correlated with corresponding pixels at other isotope peaks, which may occur within the isotope cluster in one charge state, as well as other isotope peaks in other isotope clusters in various other charge states. An image snippet from one LC/MS image contains a charge group with three isotope clusters. The isotope clusters have a similar retention time. Each masked region (pixel) within can be associated with corresponding regions within its isotope cluster. The corresponding regions have the similar retention time, and the masses differ by an integer number of Daltons. The three shorter arrows indicate the associations from one pixel to its corresponding pixels based on a mass/charge association map that considers differences in isotopic masses. Additionally, each region (pixel) within one of the isotope peaks can be associated with corresponding regions that have a similar aligned retention time and whose mass/charge value differs by corrections for the number of charge adducts and charge state. The two longer arrows indicate the associations from one pixel to its corresponding pixels based on a mass/charge association map that considers differences in charge state.

Figure 17:
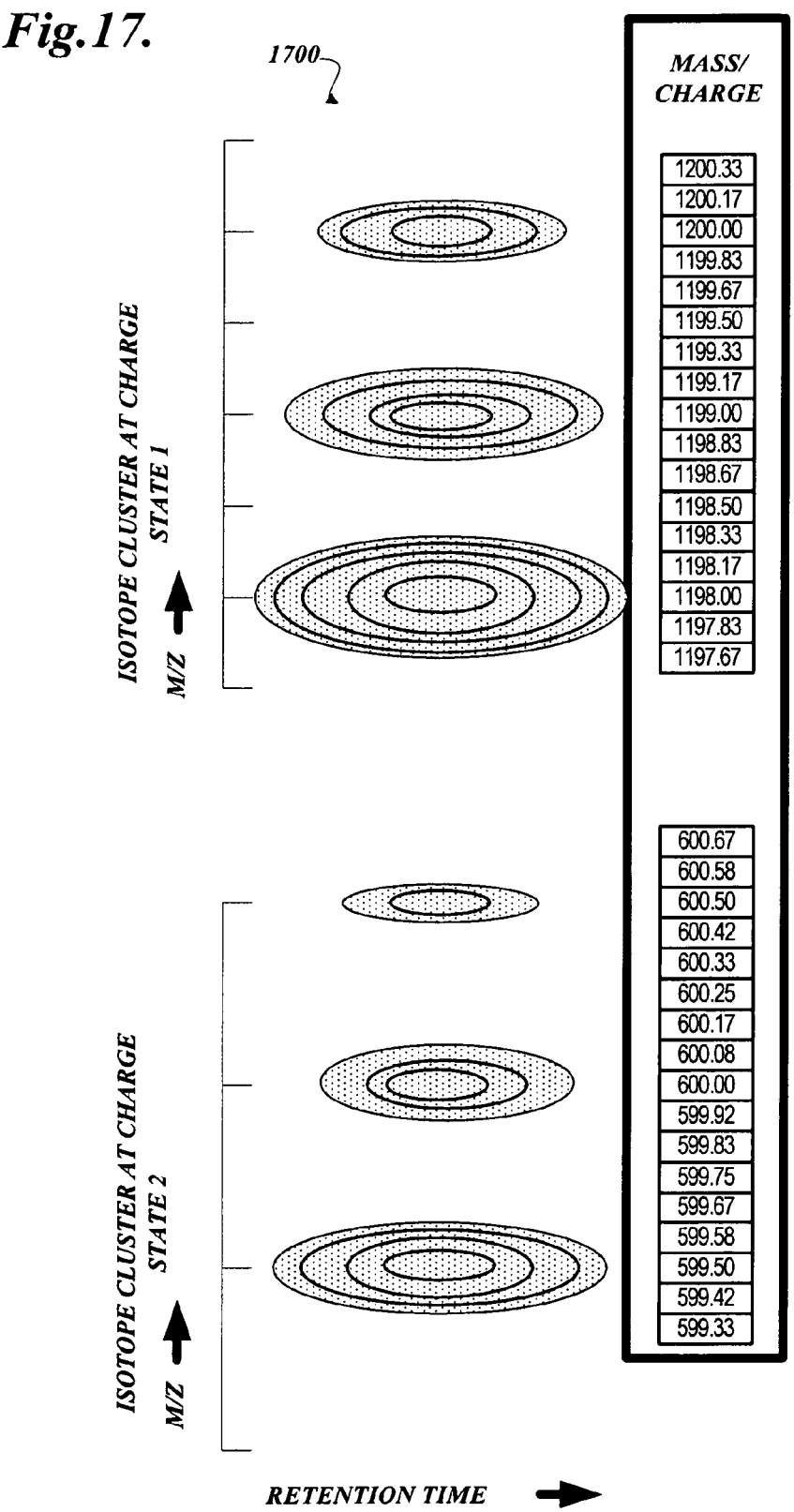
FIG. 17 is a pictorial diagram illustrating isotope clusters and a listing of their mass-charge values, in accordance with one embodiment of the present subject matter.

FIG. 17 illustrates a charge group 1700 that comprises two separate isotope clusters at different charge states 1, 2. Each isotope cluster comprises three isotope peaks. To facilitate processing of a mass/charge association map, there are embodiments of the present subject matter that provide a list of mass/charge values that are connected to the isotope clusters at charge states 1, 2. The list of mass/charge values is in a table visually presented to the right of the charge group 1700. The charge values for the bottom isotope cluster at charge state 2 range from 599.33 to 600.67. The mass/charge values for the upper isotope cluster at charge state 1 range from 1197.67 to 1200.33. The gray areas under the isotope peaks indicate the masked portions.

Figure 18:
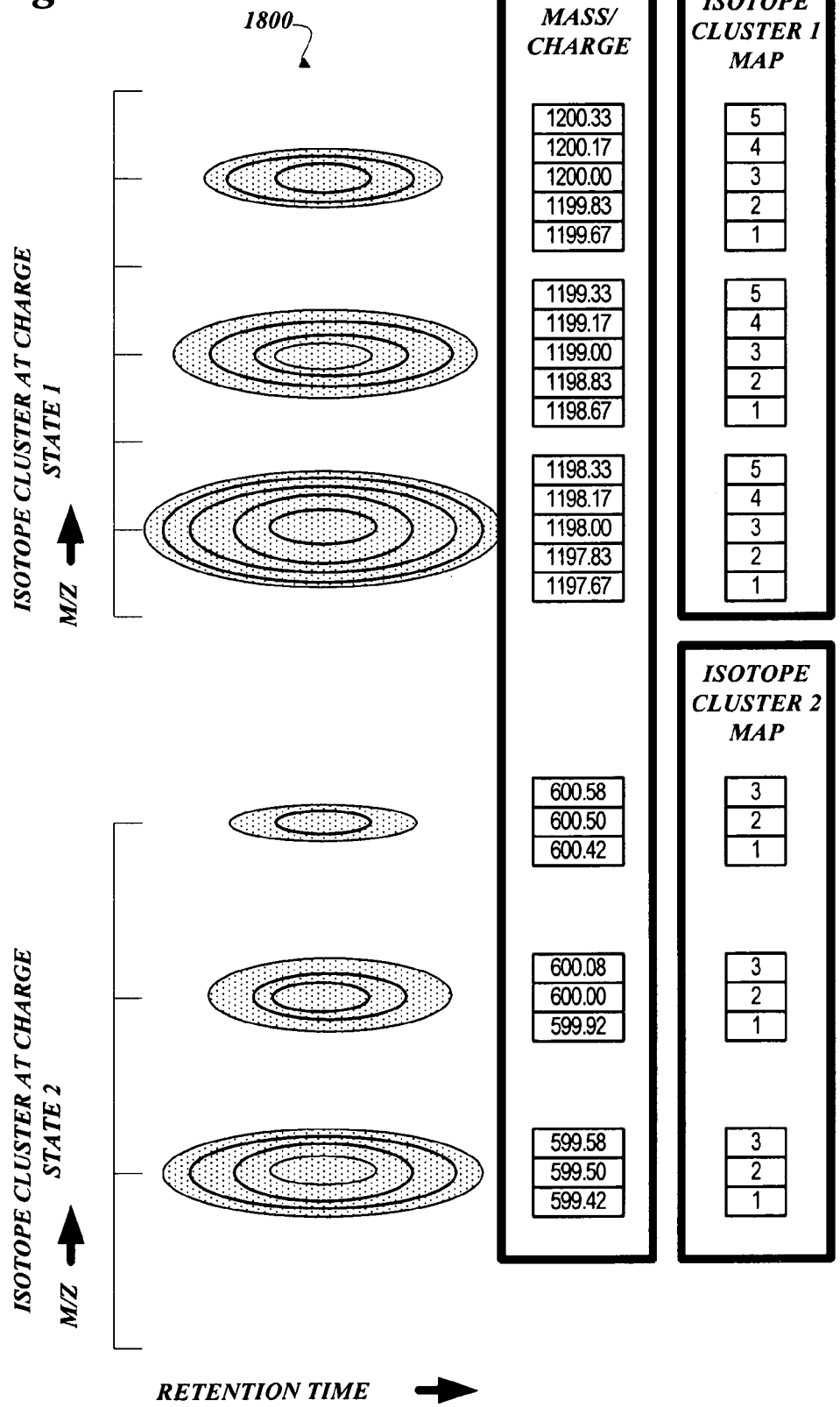
FIG. 18 is a pictorial diagram illustrating isotope clusters and a listing of their mass-charge values including isotope cluster maps, in accordance with one embodiment of the present subject matter.

FIG. 18 illustrates a charge group 1800 that is similar to the charge group 1700 previously discussed in connection with FIG. 17. The list of mass/charge values has been localized to cover the extent of each specific isotope peak within the two isotope clusters at the two charge states 1, 2. For example, the bottom isotope peak of the isotope cluster at charge state 2 ranges over mass/charge values between 599.42 and 599.58. The middle isotope peak of the isotope cluster at charge state 2 ranges between mass/charge values of 599.92 and 600.08. The upper isotope peak of the isotope cluster at charge state 2 ranges between mass/charge values of 600.42 and 600.58. The bottom isotope peak of the isotope cluster at charge state 1 ranges between mass/charge values of 1197.67 and 1198.33. The middle isotope peak of the isotope cluster at charge state 1 ranges between mass/charge values of 1198.67 and 1199.33. The upper isotope peak of the isotope cluster at charge state 1 ranges between mass/charge values of 1199.67 and 1200.33.

To the right of the localized list of mass/charge values are two isotope cluster maps 1, 2. Each isotope cluster map 1, 2 quantizes the localized mass/charge values connected with each isotope peak of the two isotope clusters at charge states 1, 2. For example, in connection with the bottom isotope peak of the isotope cluster at charge state 2, there are three mass/charge values and, therefore, the isotope cluster map 2 for the bottom isotope peak is quantized to include three numerical increments 1, 2, and 3. The logic of quantizing the mass/charge values localized to each isotope peak is repeated for the remaining five isotope peaks of the two isotope clusters at various charge states 1, 2. The two isotope cluster maps do not necessarily correspond to each other. Mapped mass/charge values are contained in the two maps. These two maps associate mass/charge values that differ due to isotopic mass differences within an isotope cluster. As such, each of these maps is an intra-isotope cluster map.

FIG. 19 illustrates a charge group 1900 that is similar to charge groups 1700, 1800 previously discussed. The list of mass/charge values is further tuned to reflect a corresponding relationship between an isotope peak at an isotope cluster in one charge state and a corresponding isotope peak in the other isotope cluster at the other charge state. For example, the bottom isotope peak of the isotope cluster at charge state 2 ranges over five mass/charge values 599.33 to 599.67. Correspondingly, the bottom isotope peak of the isotope cluster at charge state 1 also ranges over five mass/charge values 1197.67 to 1198.33. The middle isotope peak of the isotope cluster at charge state 2 ranges over three mass/charge values 599.92 to 600.08. The outlying mass/charge values for the middle isotope peak have been removed. Correspondingly, the middle isotope peak of the isotope cluster at charge state 1 now also ranges over three mass/charge values 1198.83 to 1199.17. Contrast the three mass/charge values to the five mass/charge values that range over the middle isotope peak of the isotope cluster at charge state 1 in connection with the charge group 1800. See FIG. 18. The upper isotope peak of the isotope cluster at charge state 2 now ranges over three mass/charge values 600.42 to 600.58. Correspondingly, the upper isotope peak of the isotope cluster at charge state 1 now also ranges over three mass/charge values 1199.83 to 1200.17.

To the right of the list of mass/charge values is a charge group map that quantizes the range of increments for each isotope cluster at charge states 1, 2. For example, for the range of mass/charge values connected with the three isotope peaks of the isotope cluster at charge state 2, the charge map reflects quantization that ranges from increment 1 to 11. Similarly, the charge group map for the three isotope peaks of the isotope cluster at charge state 1 is quantized in increments from 1 to 11. This map associates mass/charge values that differ due to charge state among isotope clusters. As such, this map is an inter-isotope cluster map.

Figure 20:
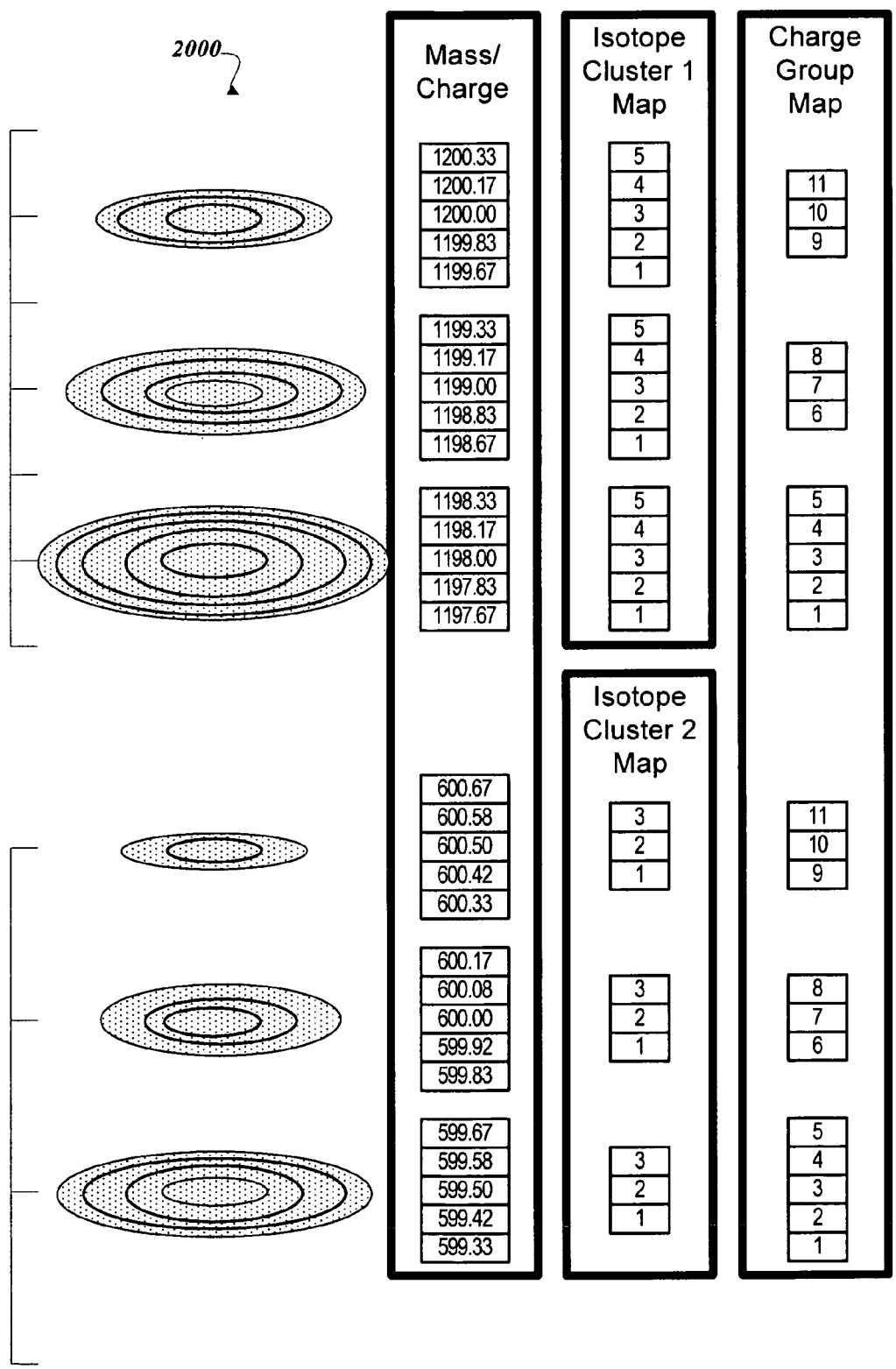
FIG. 20 is a pictorial diagram illustrating isotope clusters and a listing of their mass-charge values including isotope cluster maps and a charge group map, in accordance with one embodiment of the present subject matter.
Figure 21:
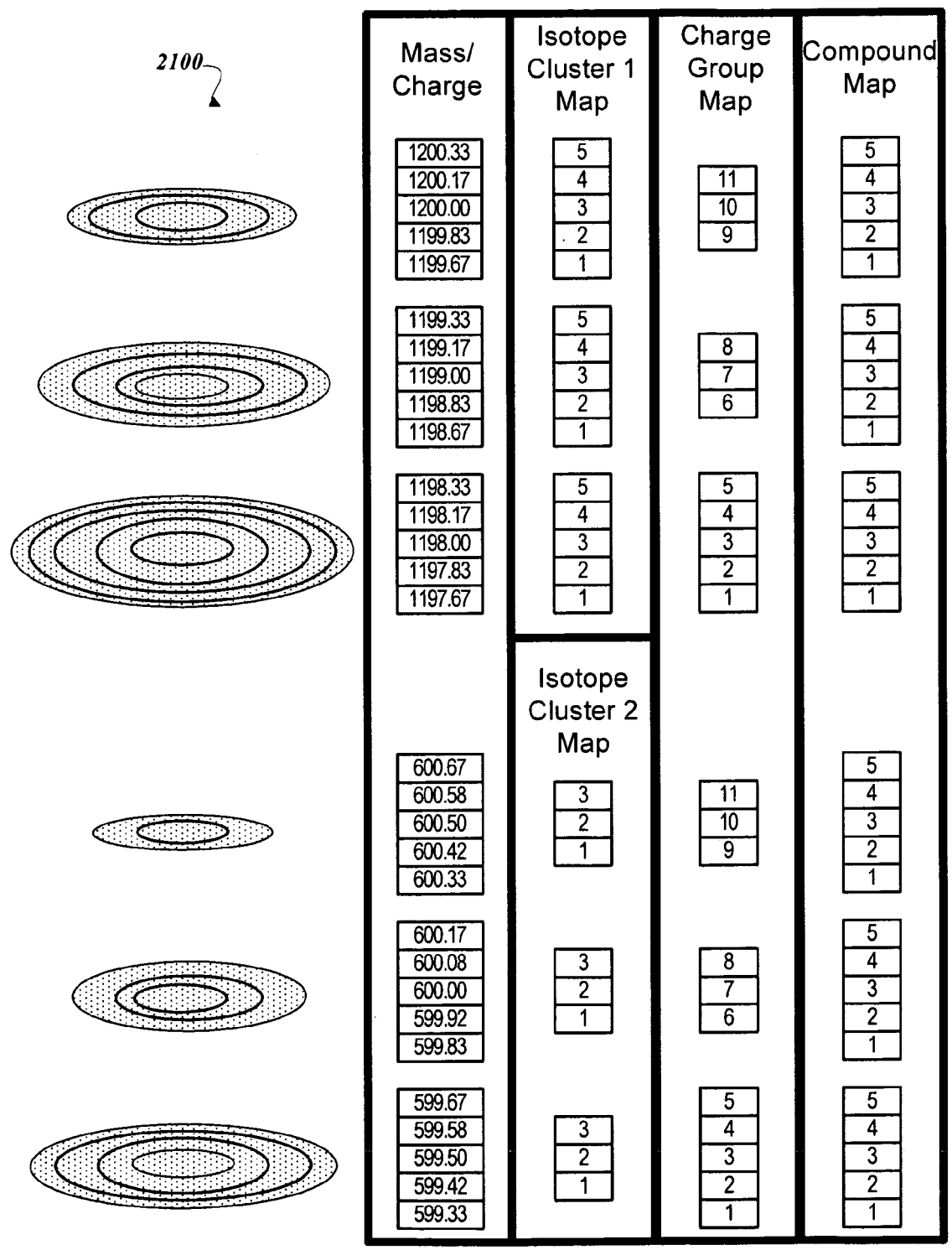
FIG. 21 is a pictorial diagram illustrating isotope clusters and a listing of their mass-charge values including isotope cluster maps and a charge group map as well as a compound map, in accordance with one embodiment of the present subject matter.

FIG. 20 illustrates a charge group 2000 that is similar in many ways to the charge groups 1700-1900 previously discussed. FIG. 21 illustrates a charge group 2100 that is similar to the charge groups 1700-2000 previously discussed. The first and fourth columns constitute a mass/charge association map that is derived from compounding the mass/charge association maps from isotopic mass differences and charge state differences.

Figure 22A:
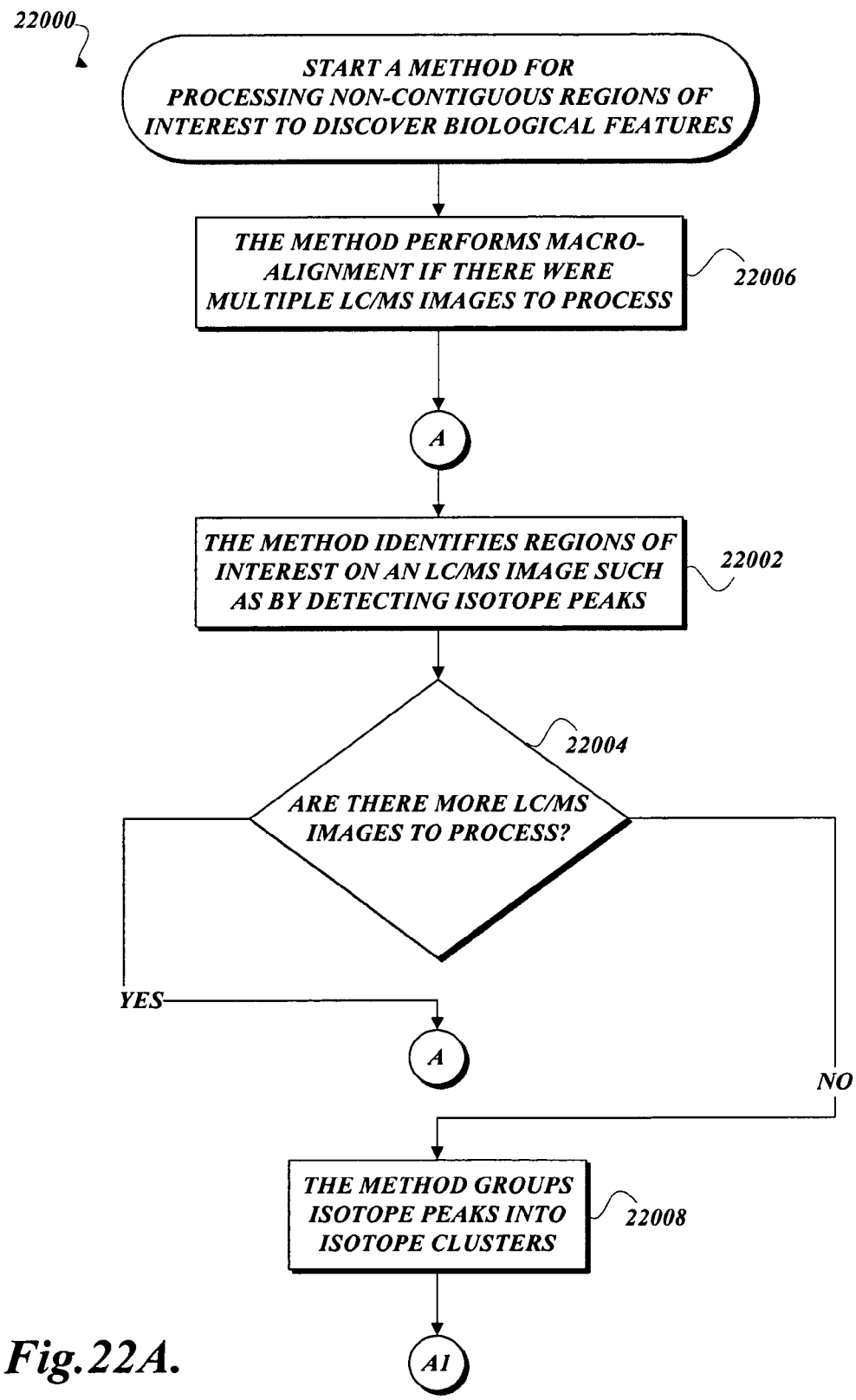
FIGS. 22A-22AU are process diagrams illustrating an exemplary method for processing associated regions of interest (whether they are contiguous or non-contiguous) to discover biological features.
Figure 22B:
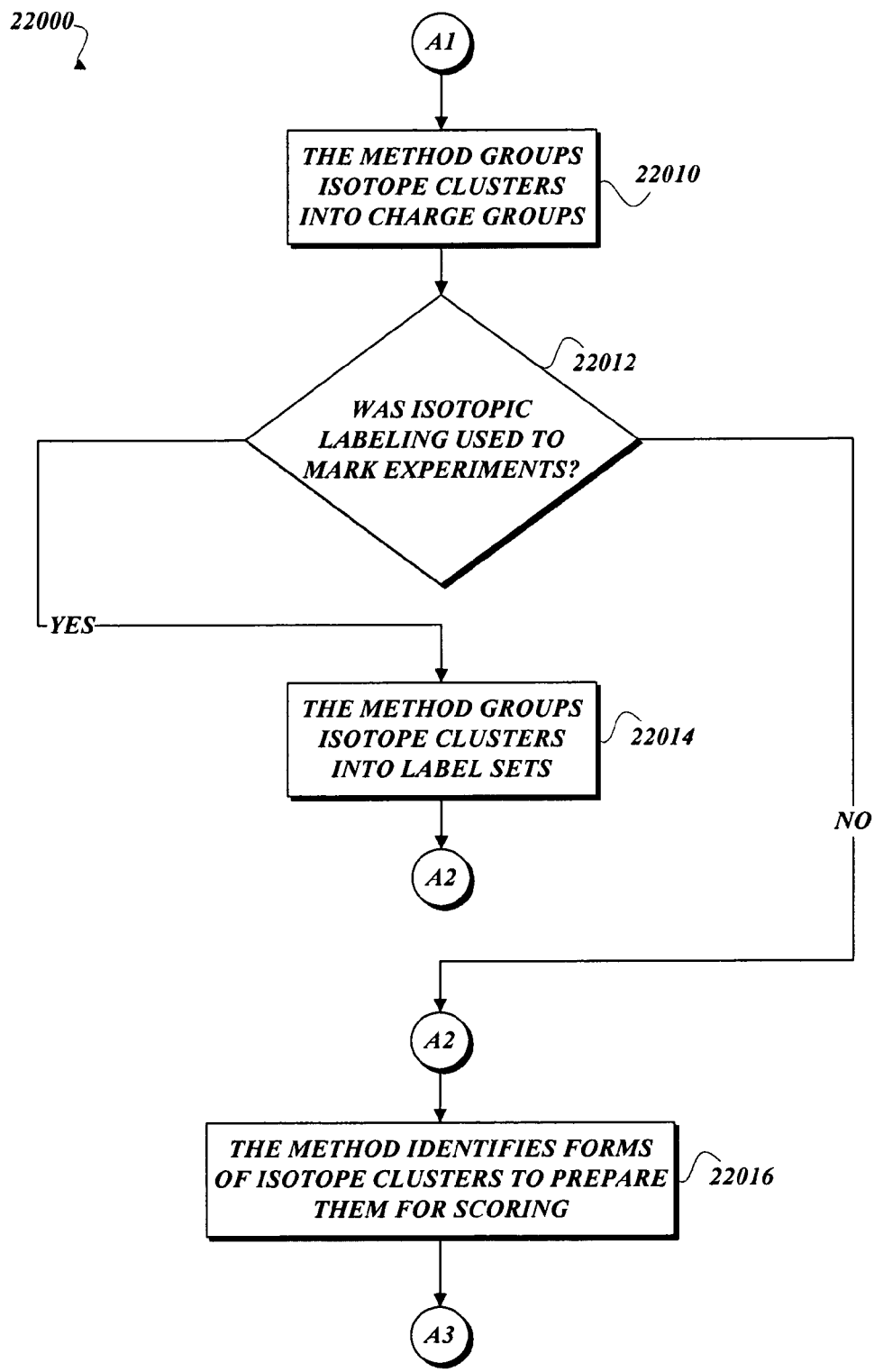
Figure 22C:
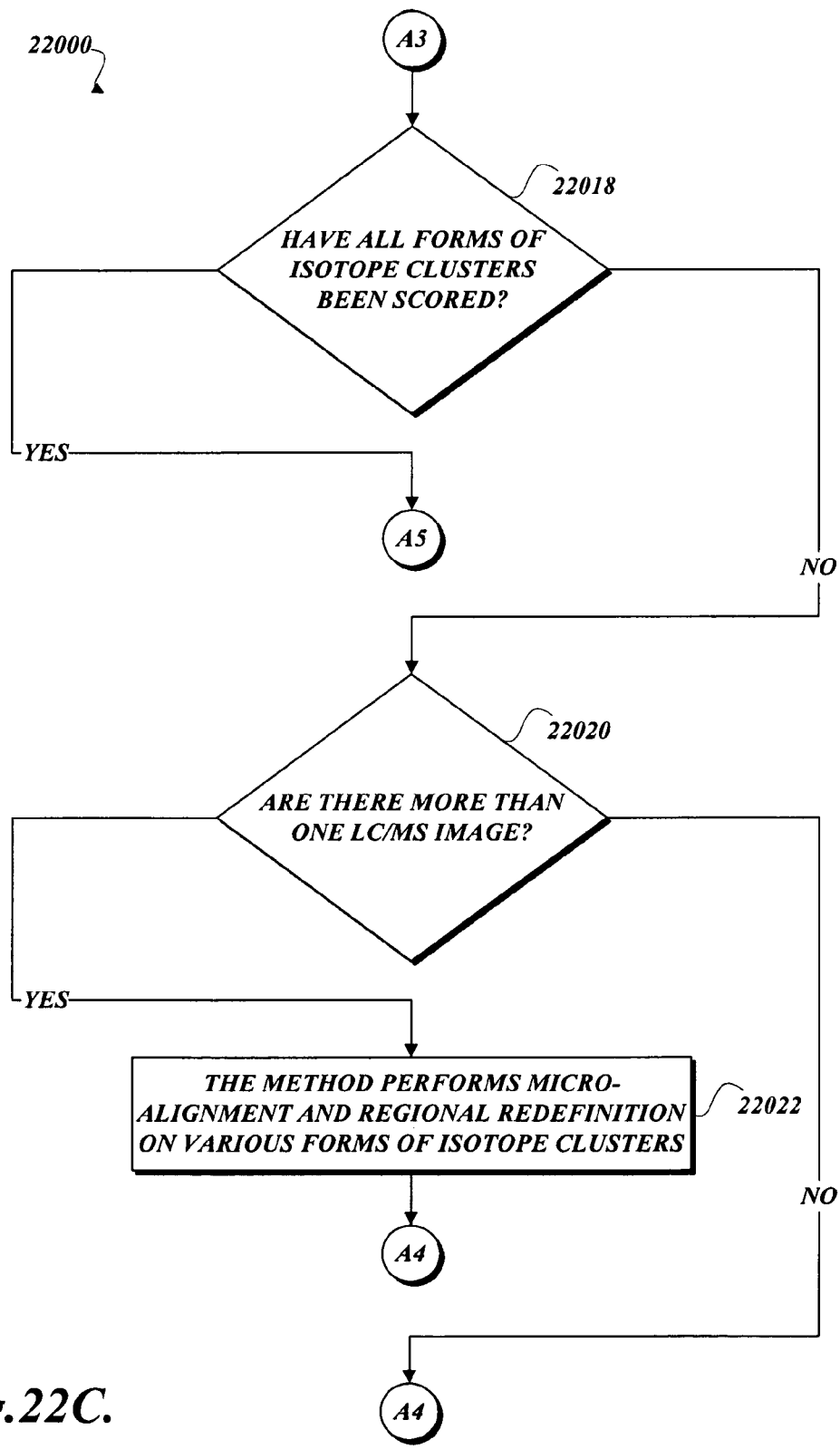
Figure 22D:
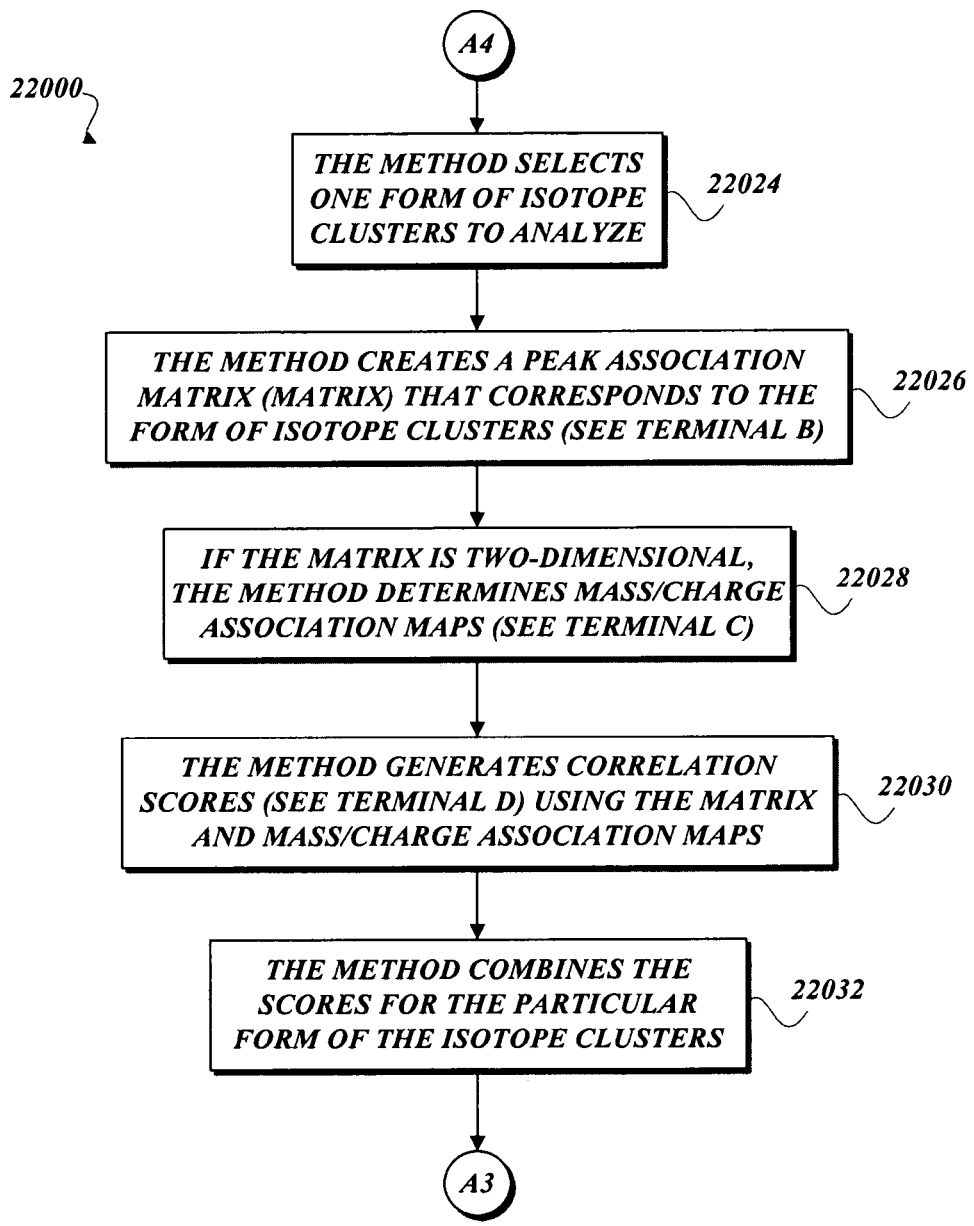
Figure 22E:
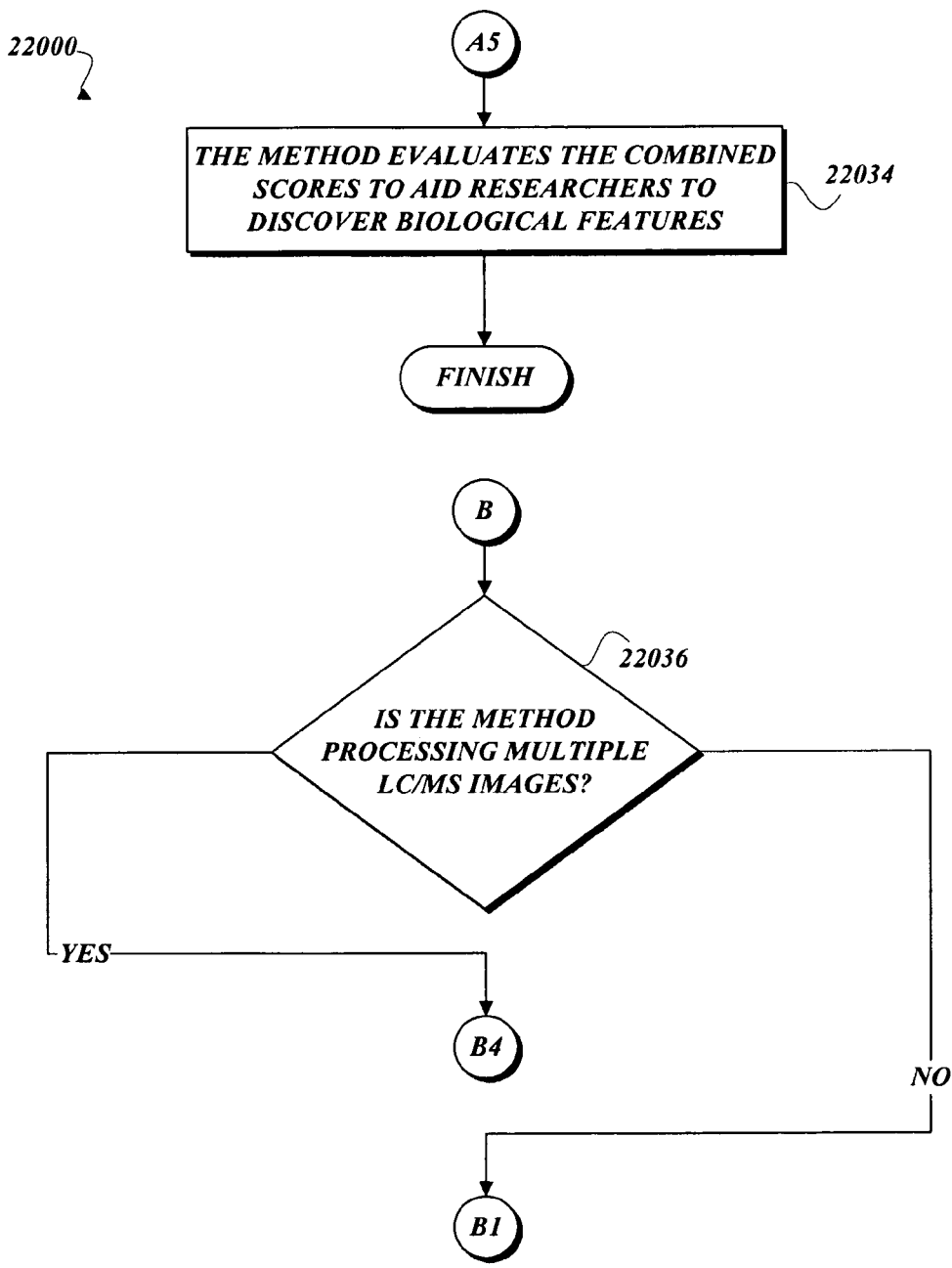
Figure 22F:
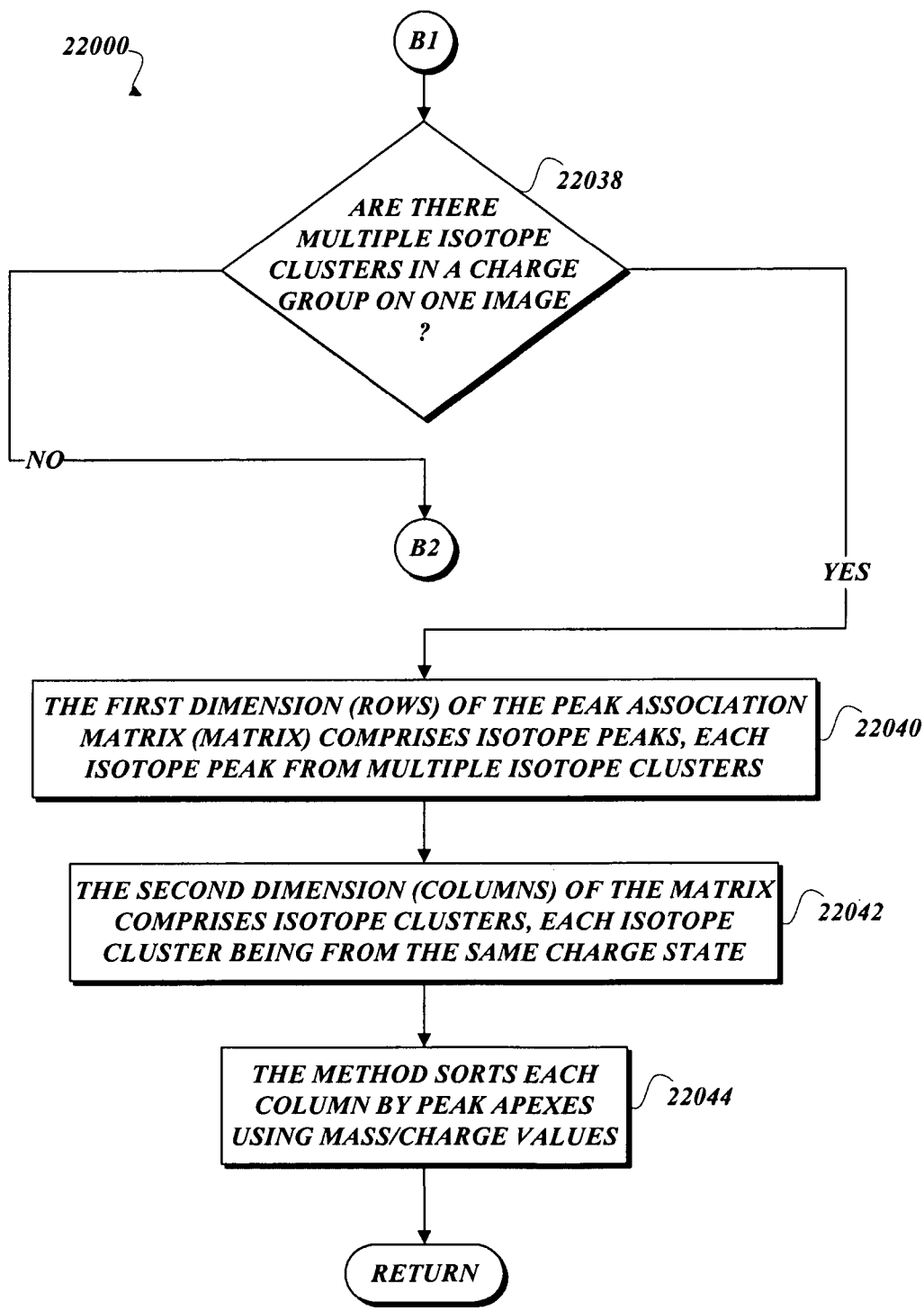
Figure 22G:
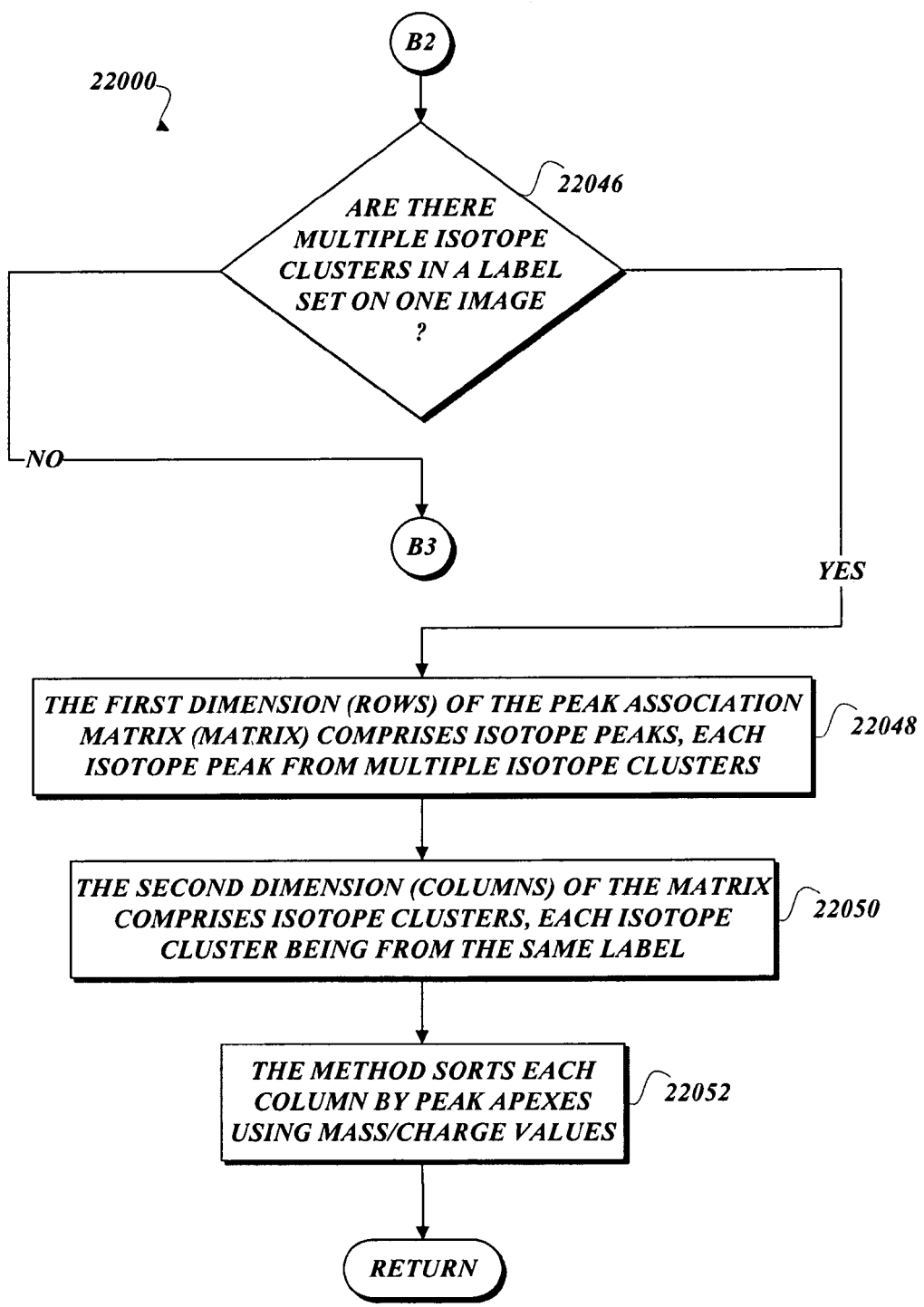
Figure 22H:
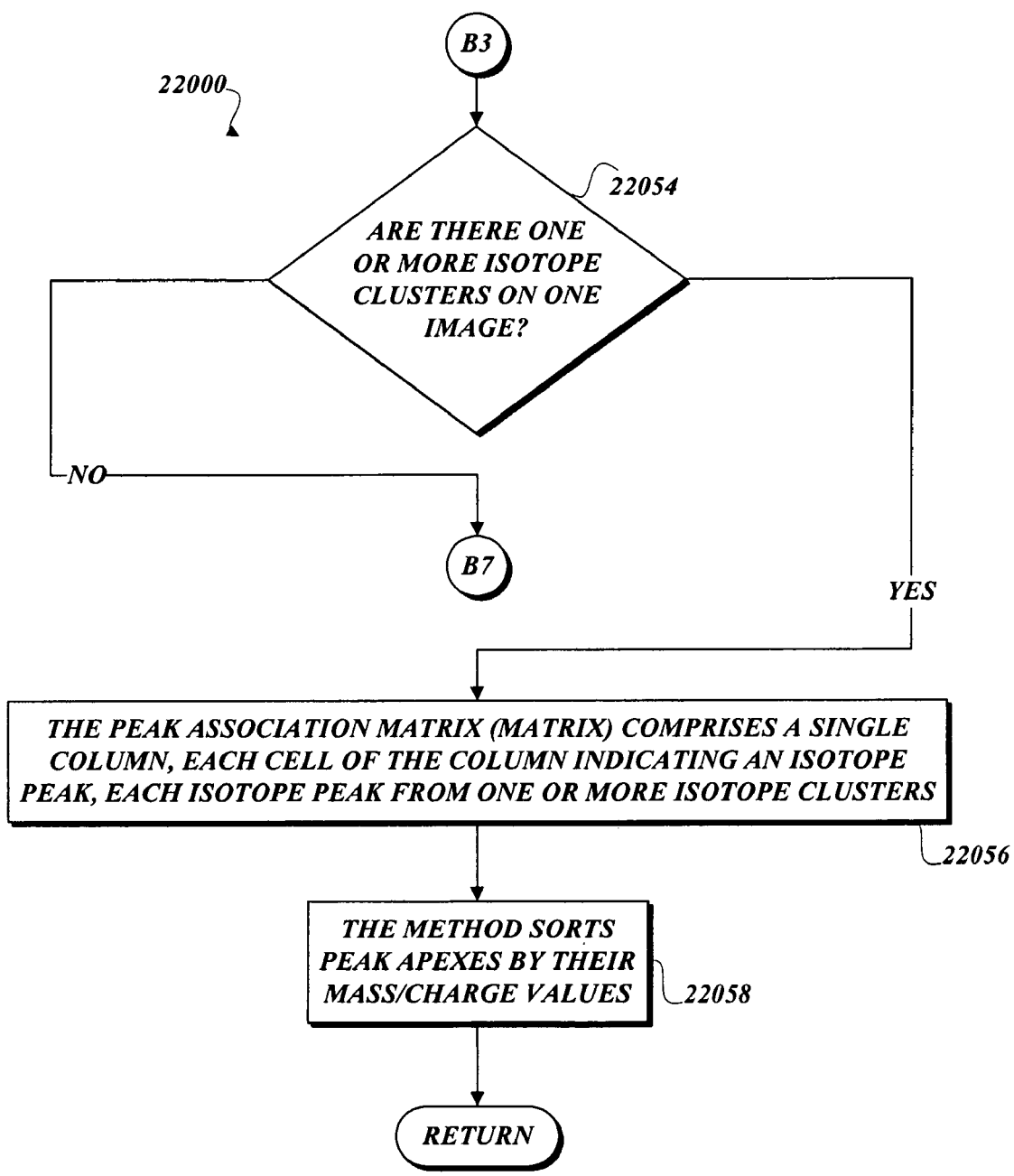
Figure 22I:
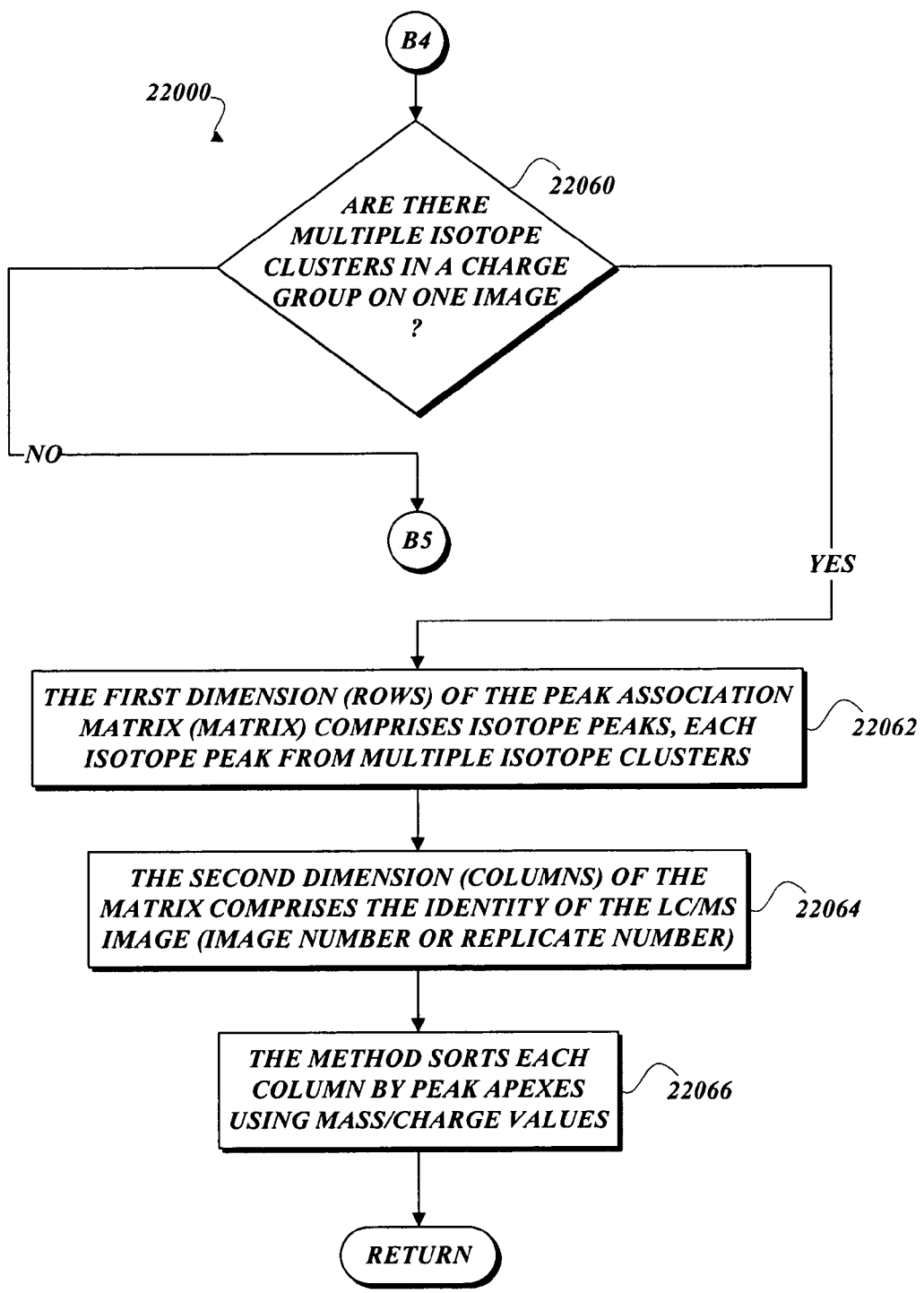
Figure 22J:
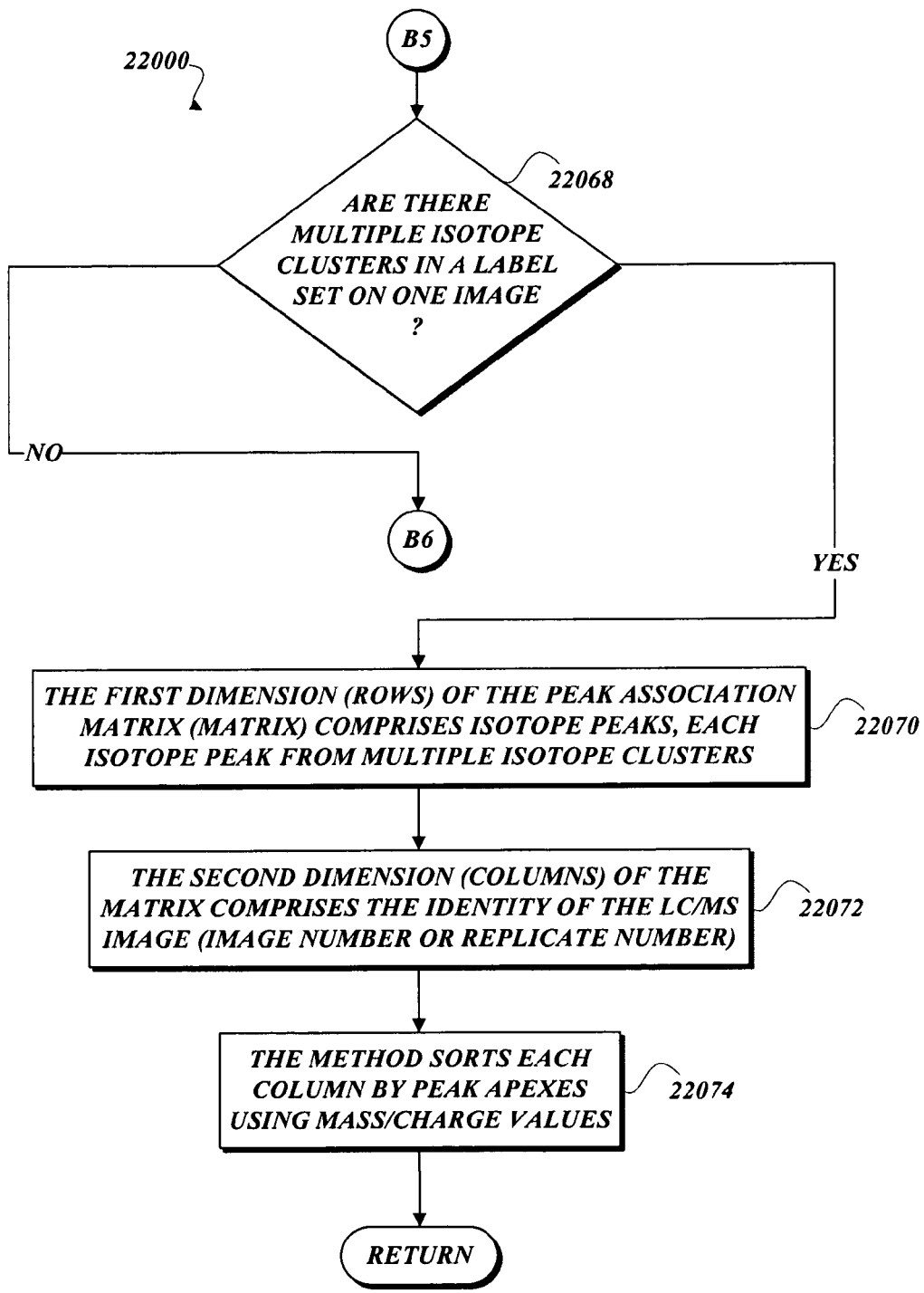
Figure 22K:
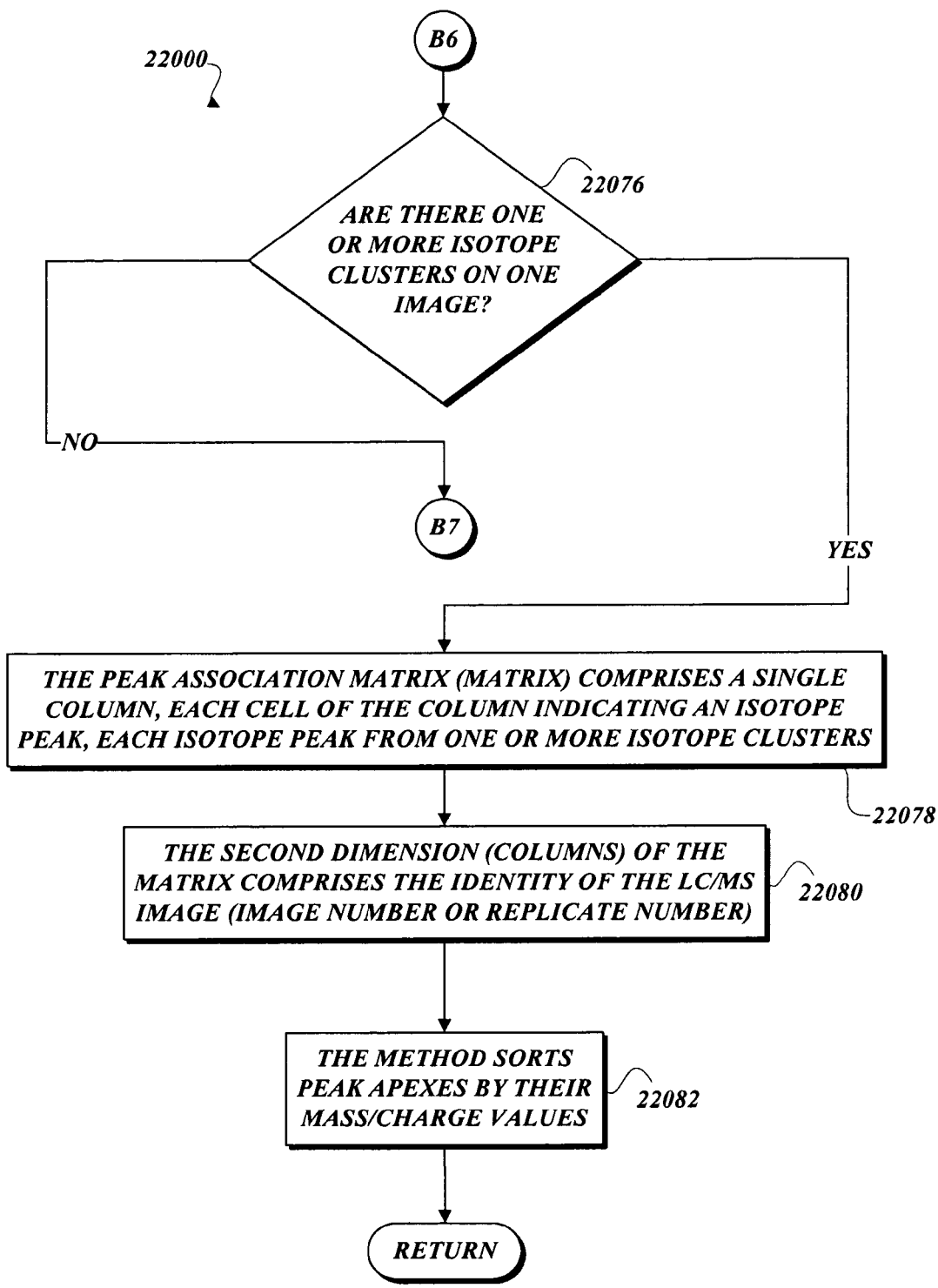
Figure 22L:
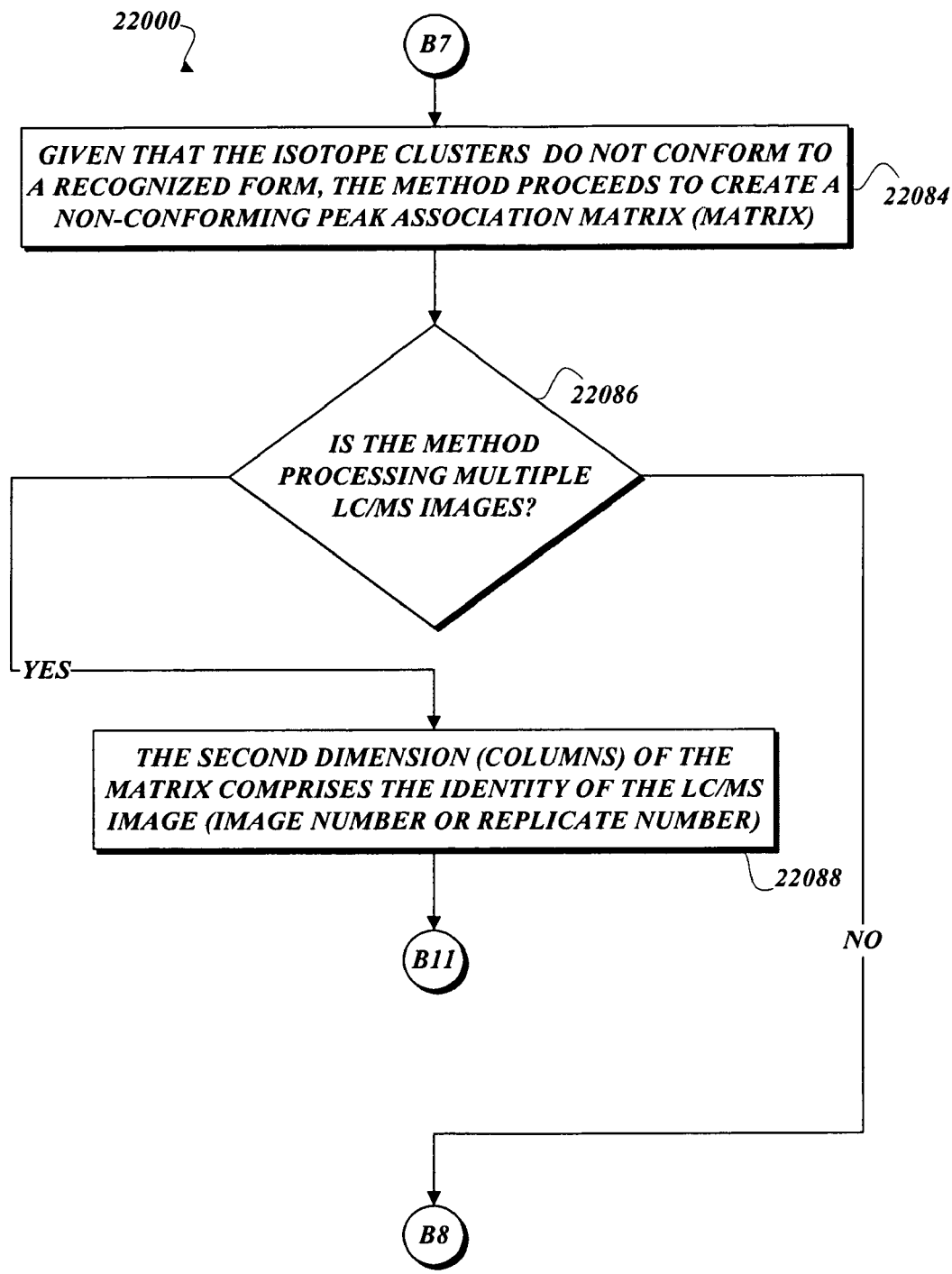
Figure 22M:
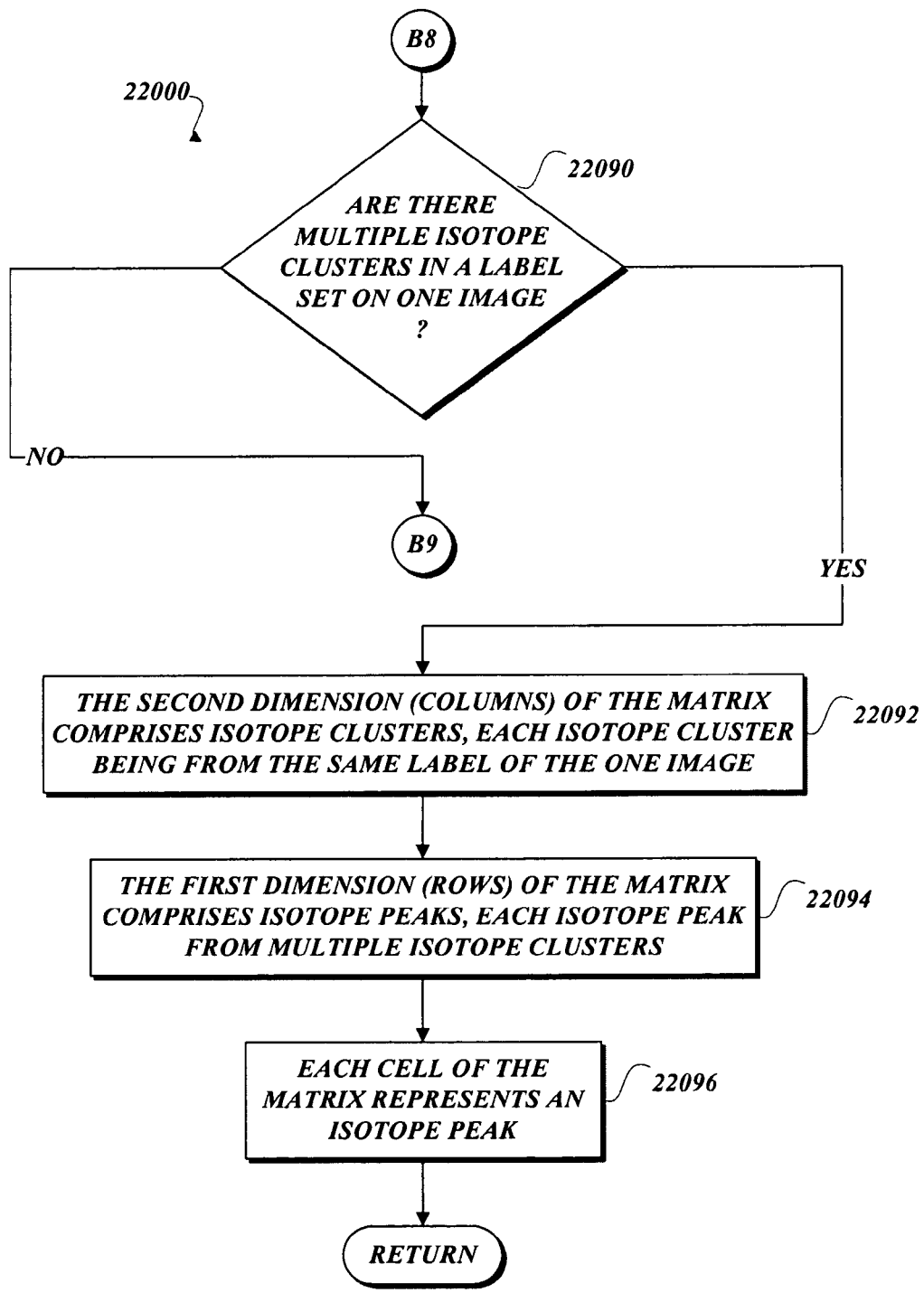
Figure 22N:
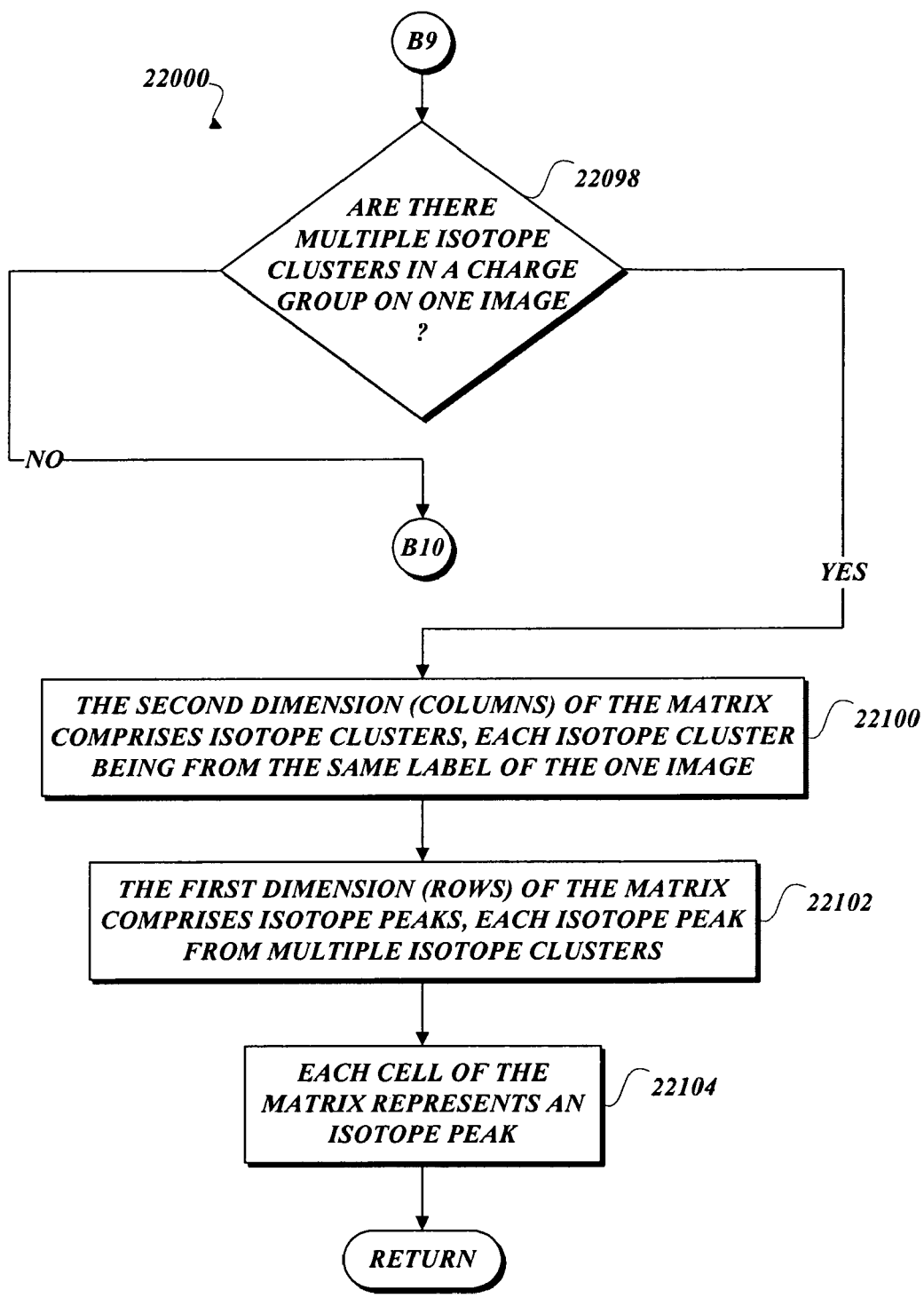
Figure 22O:
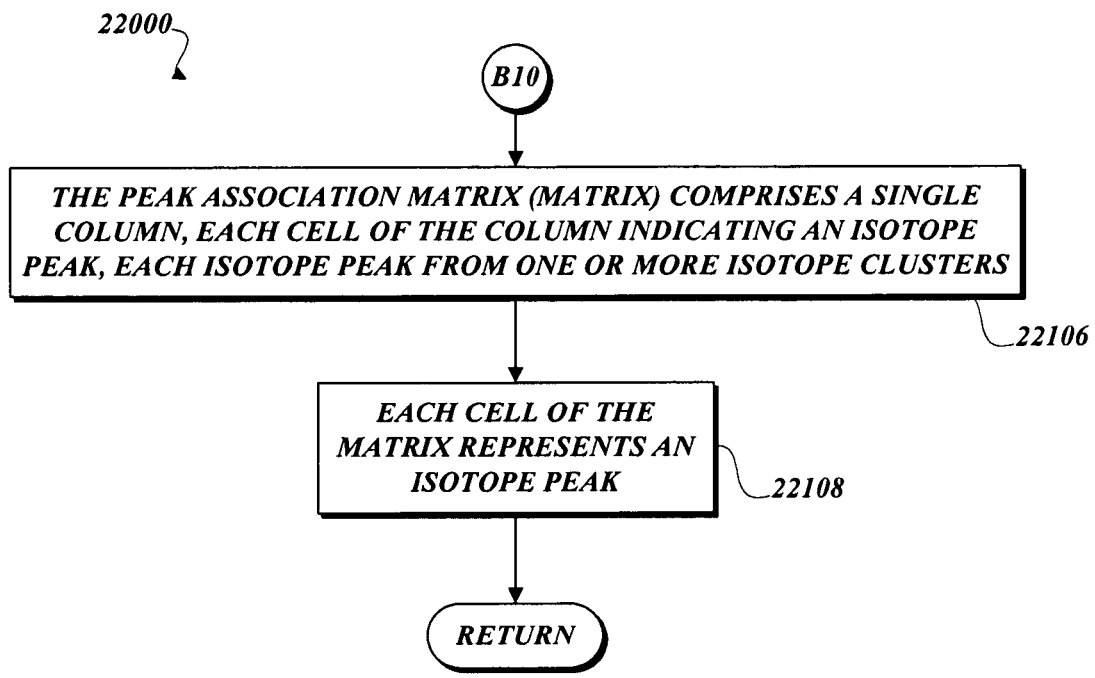
Figure 22P:
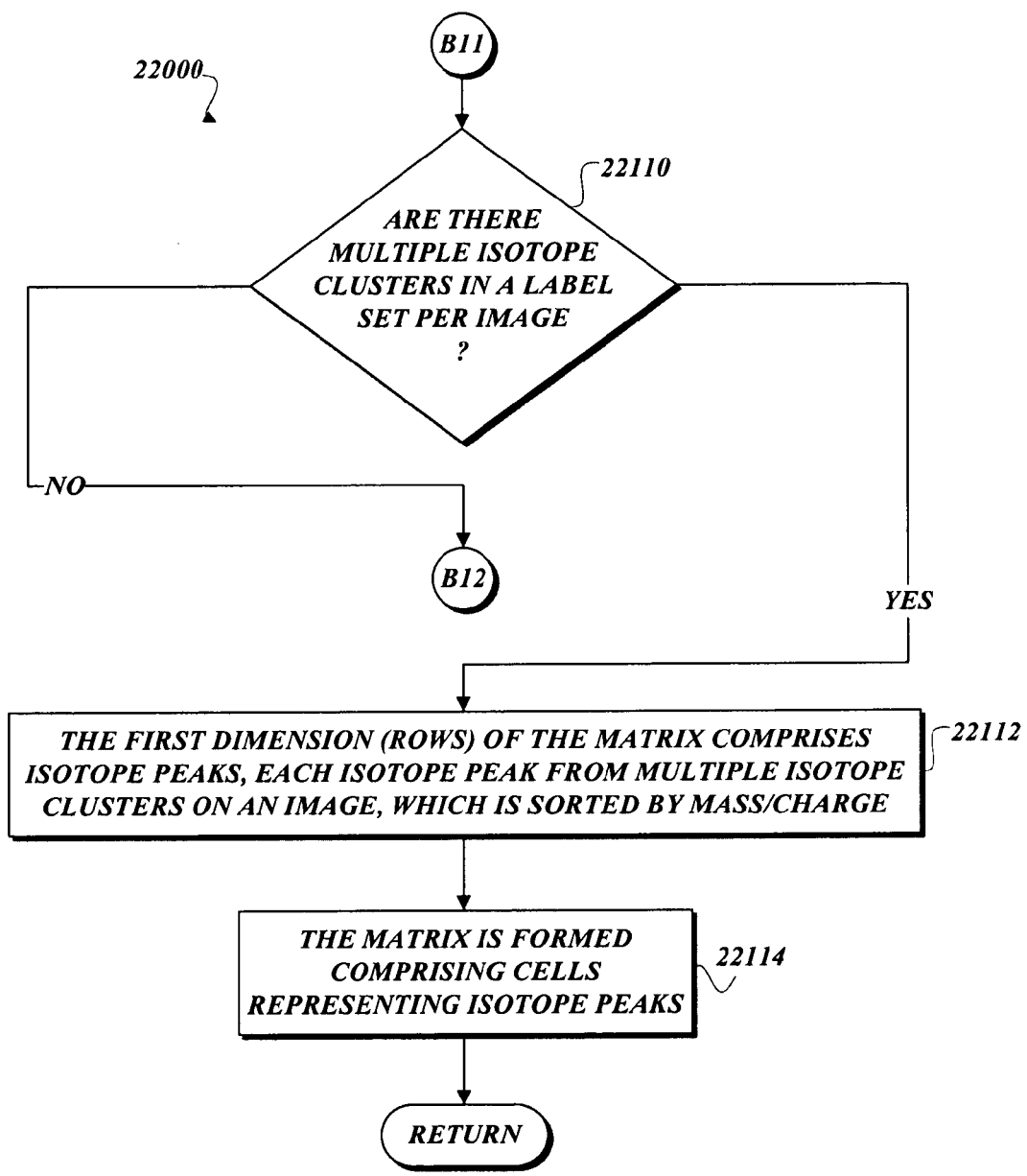
Figure 22Q:
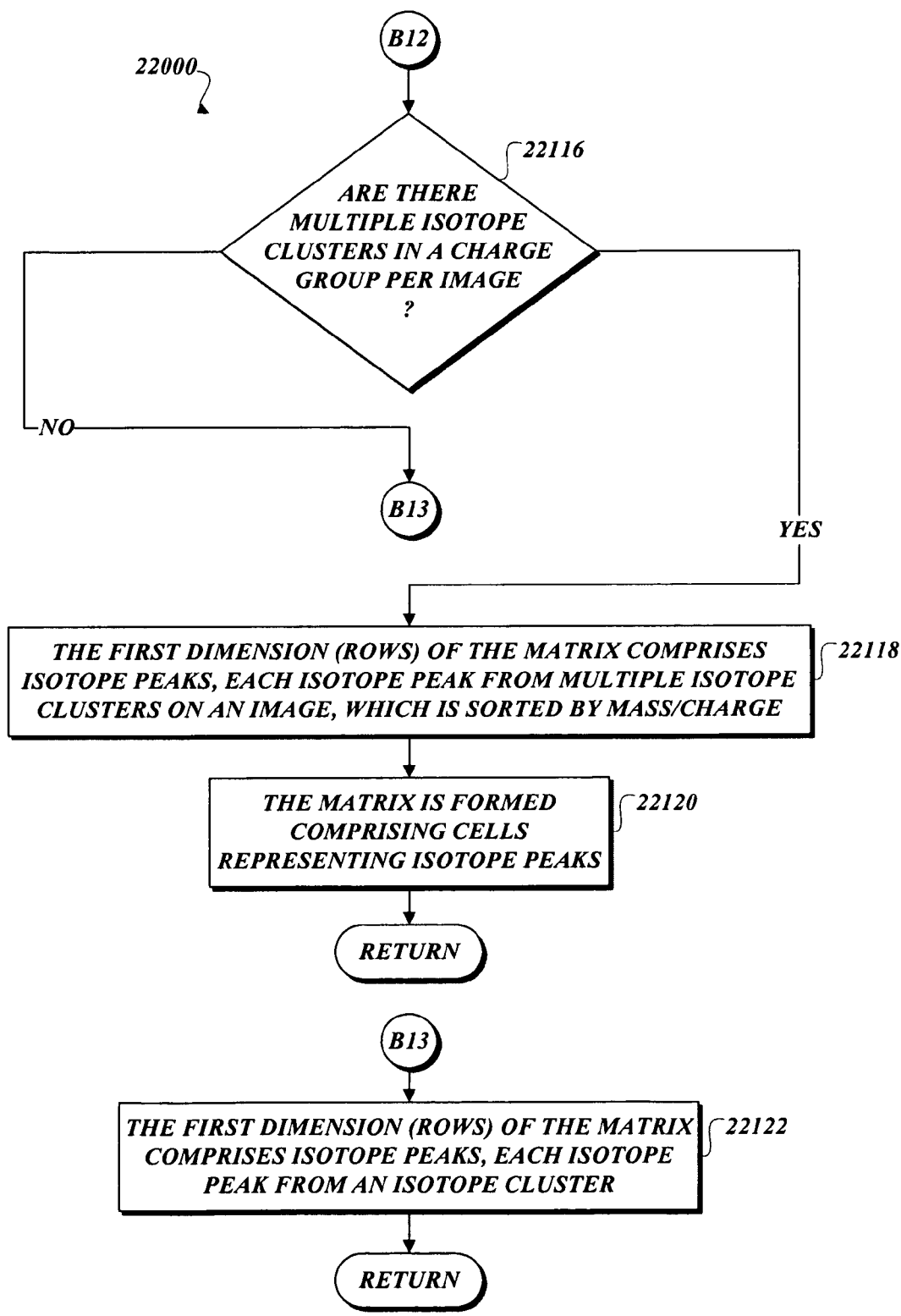
Figure 22R:
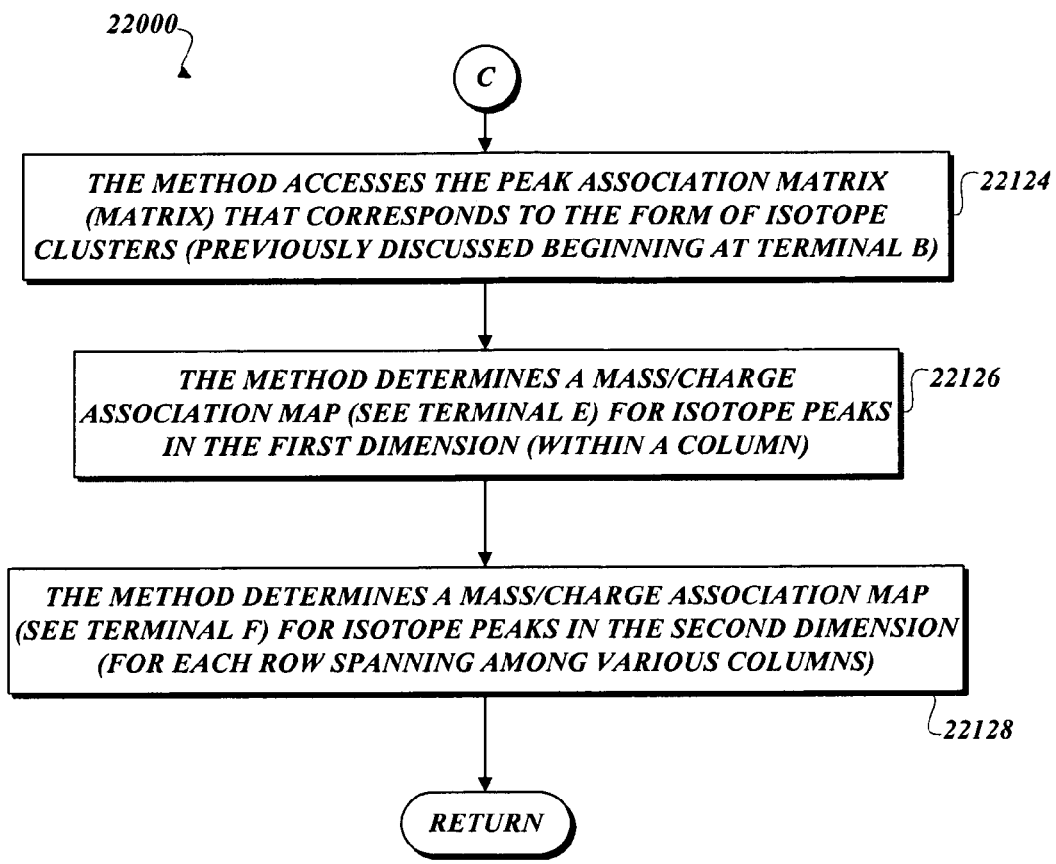
Figure 22S:
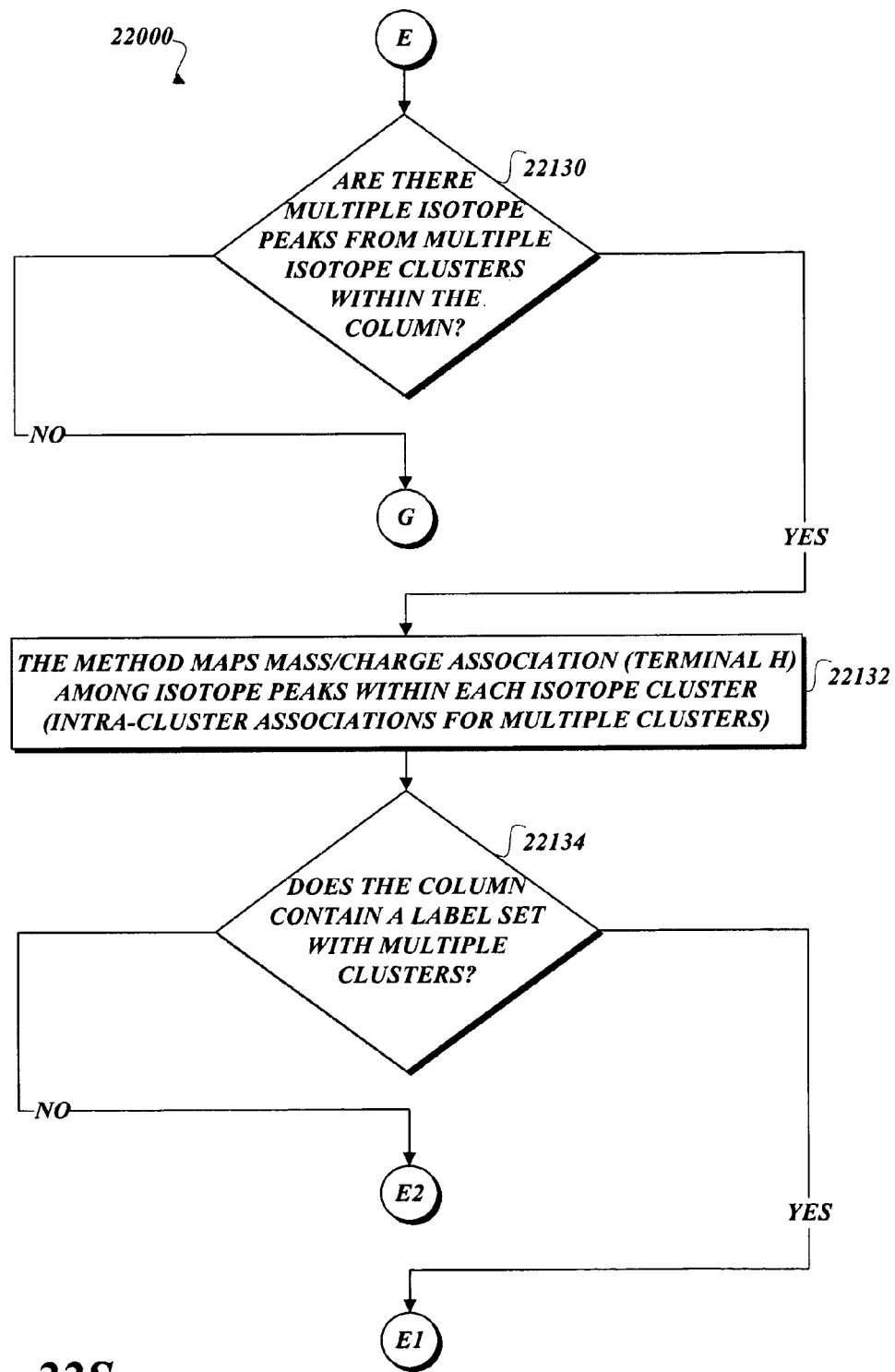
Figure 22T:
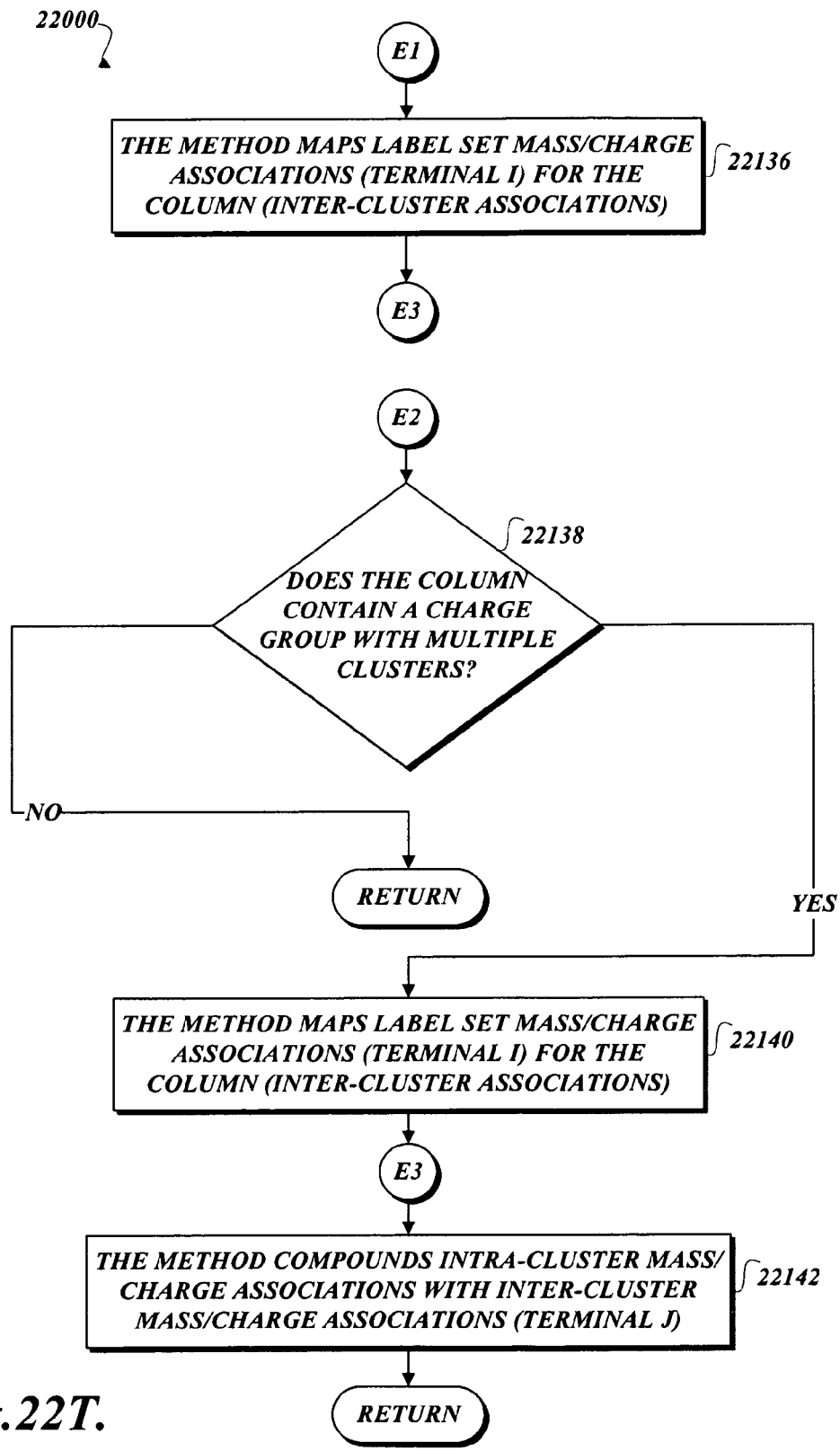
Figure 22U:
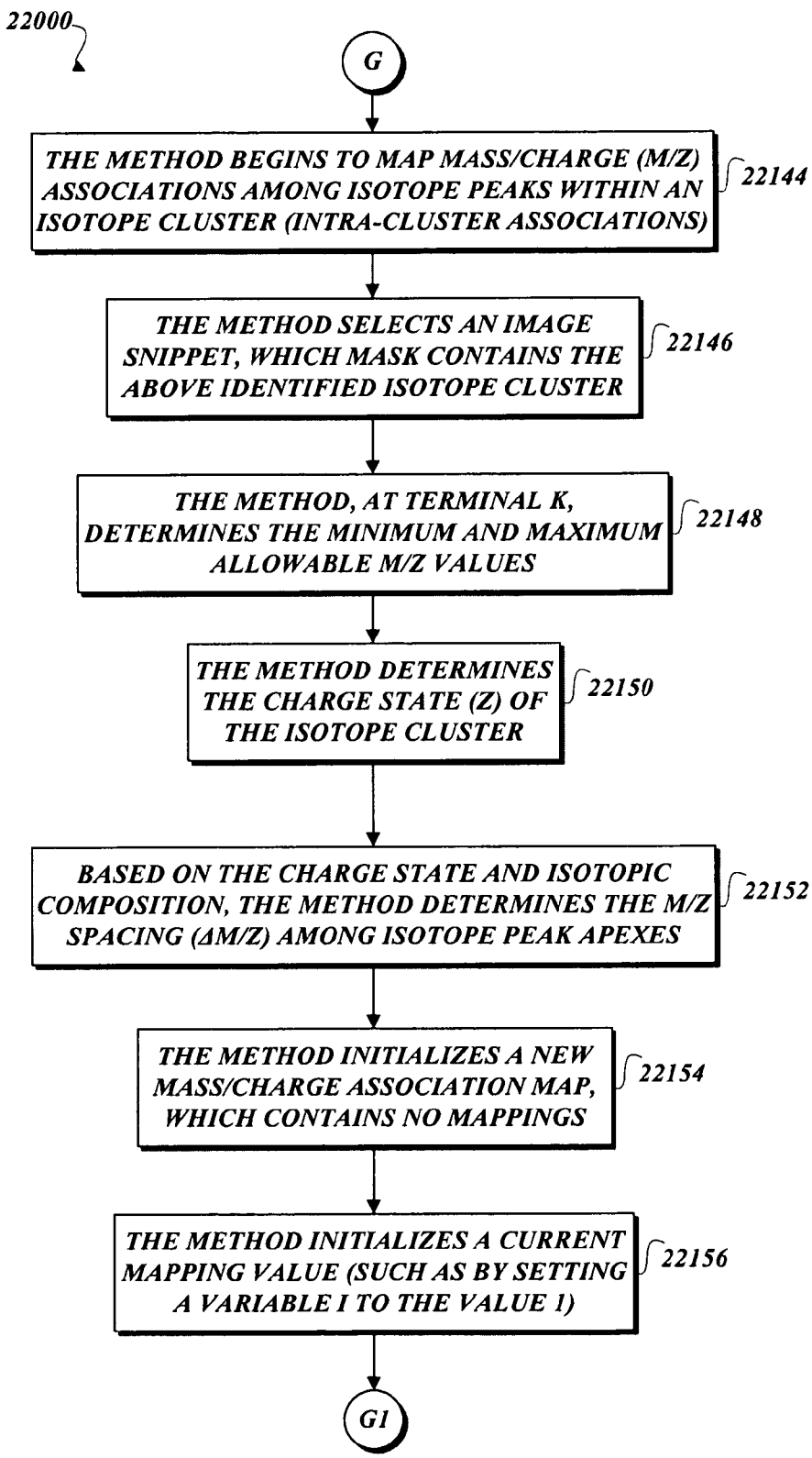
Figure 22V:
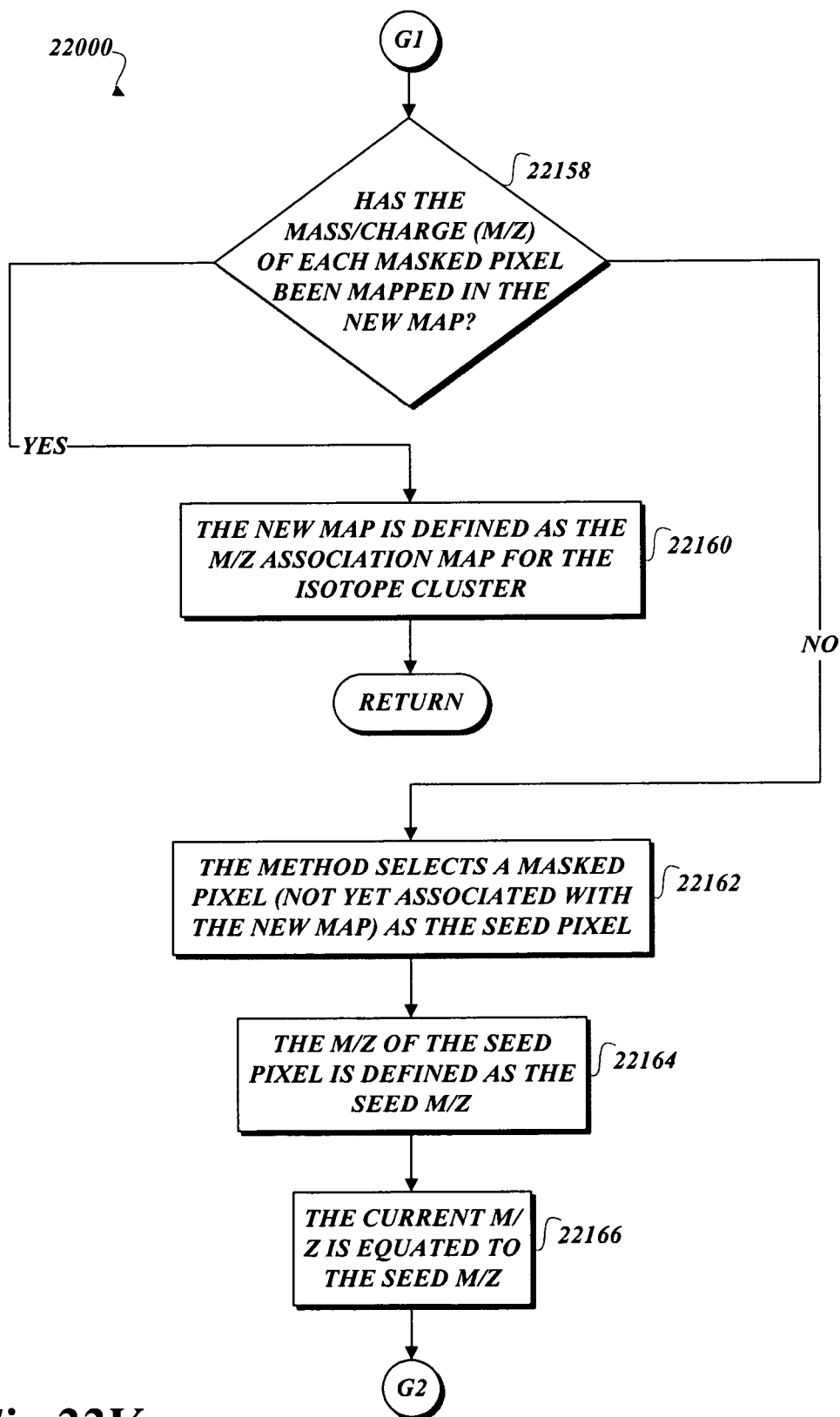
Figure 22W:
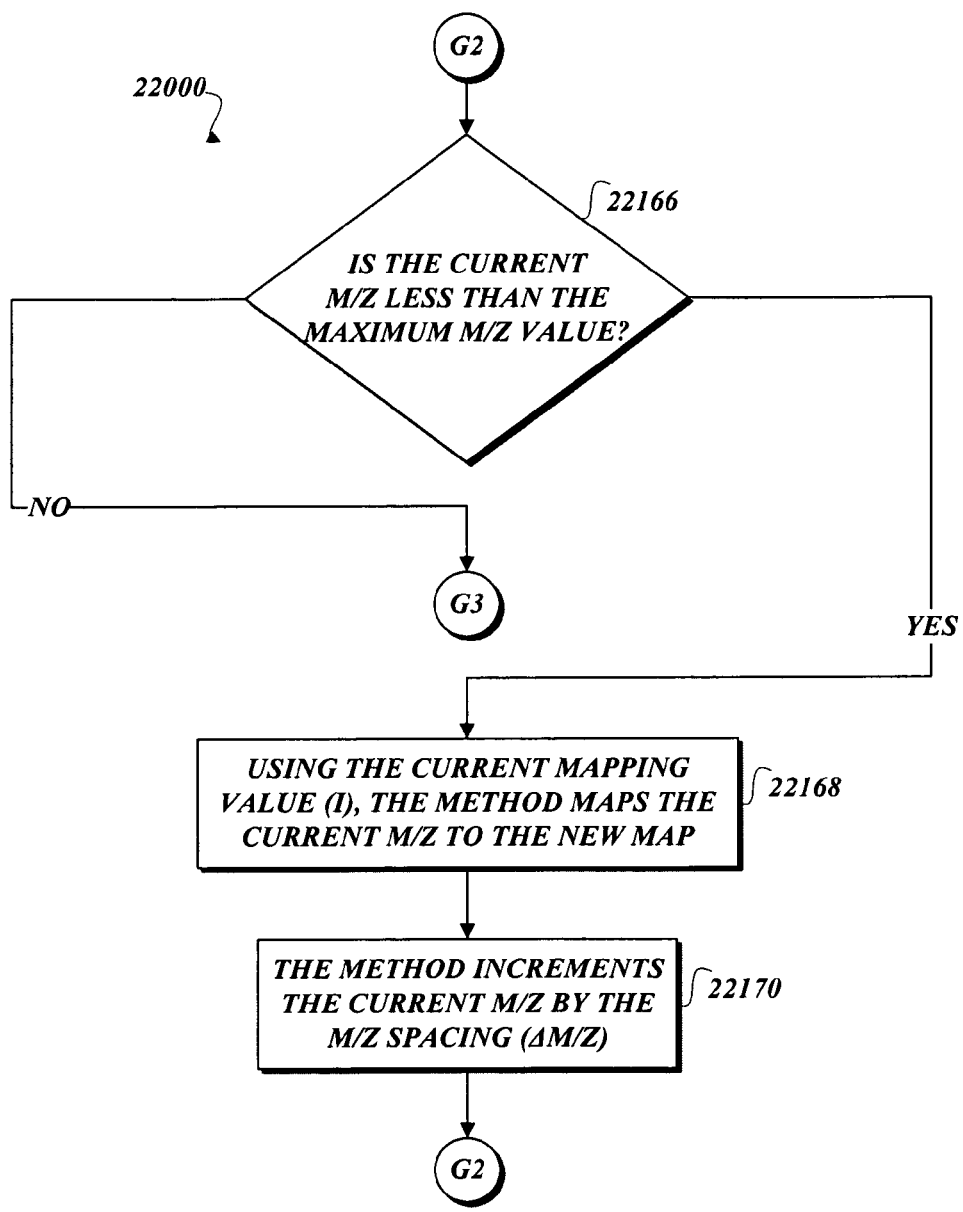
Figure 22X:
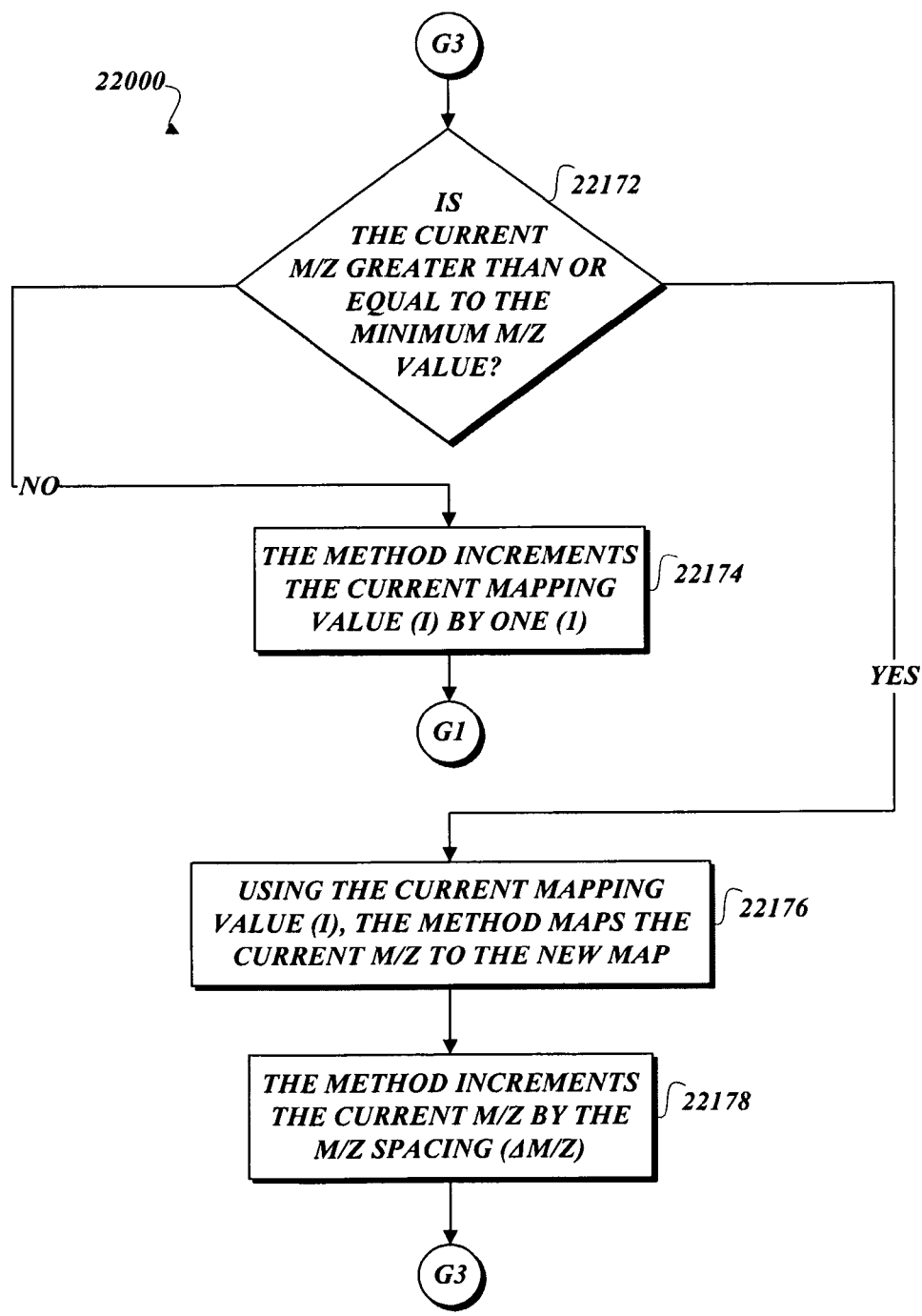
Figure 22Z:
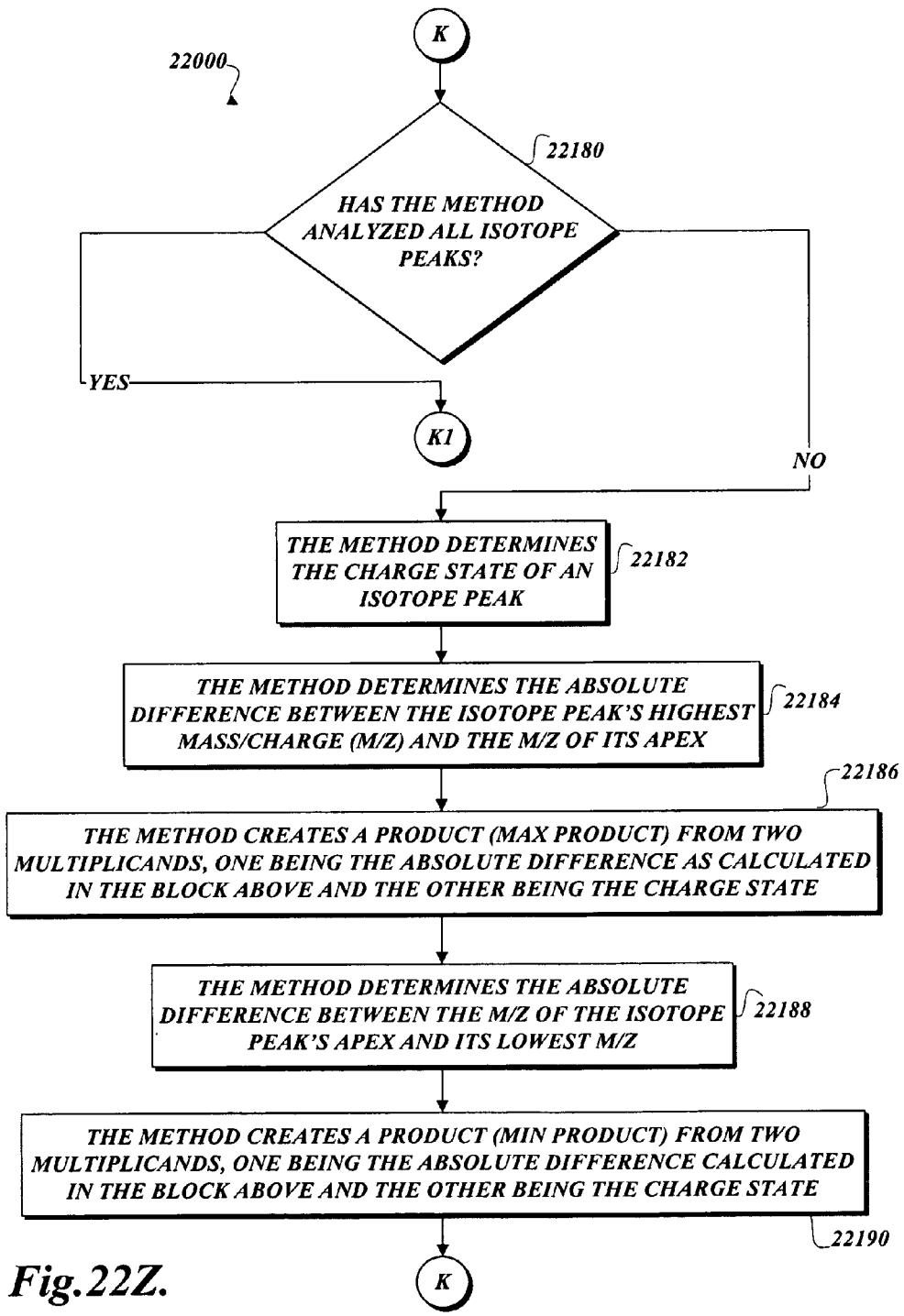
Figure 22A:
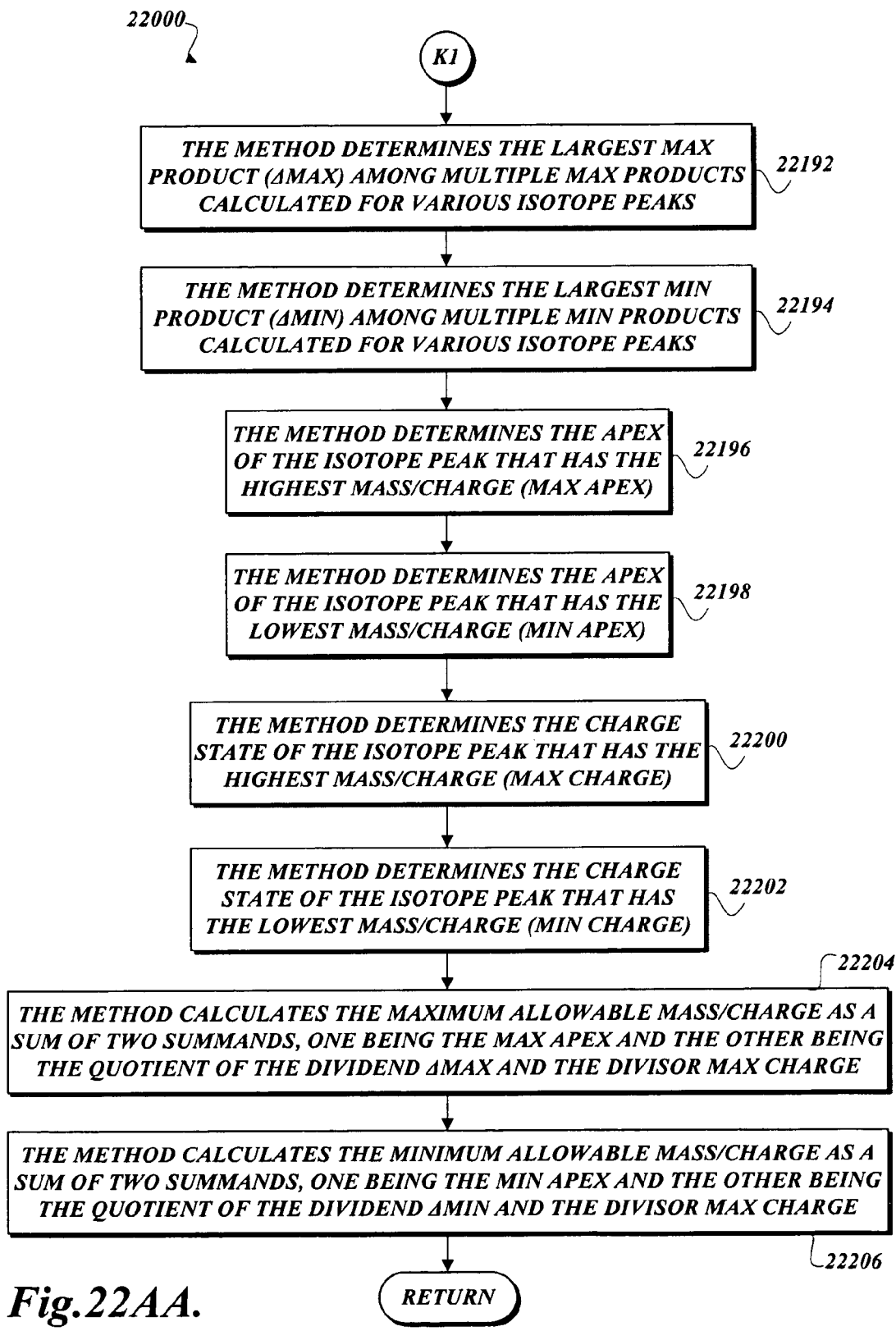
Figure 22A:
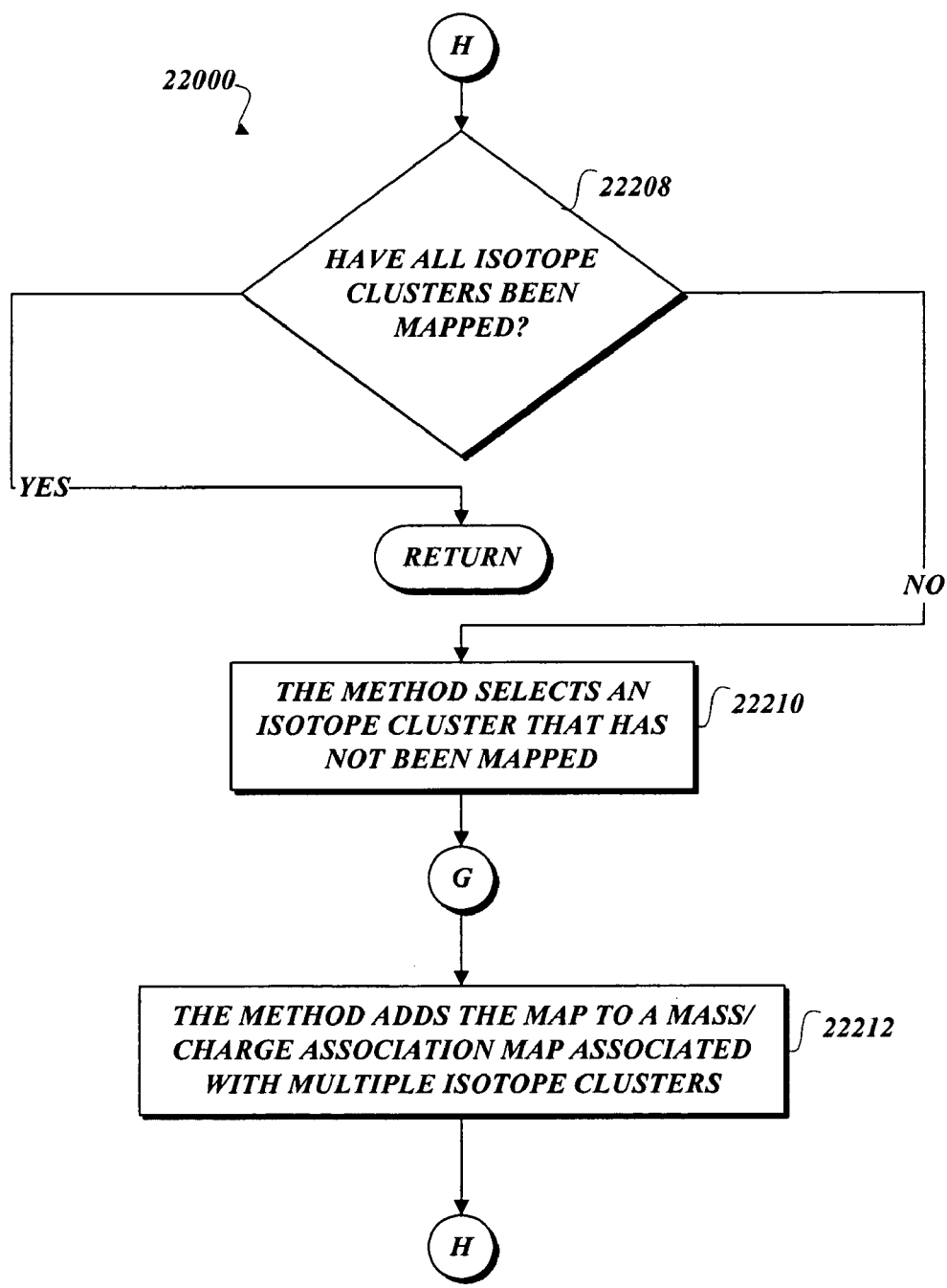
Figure 22A:
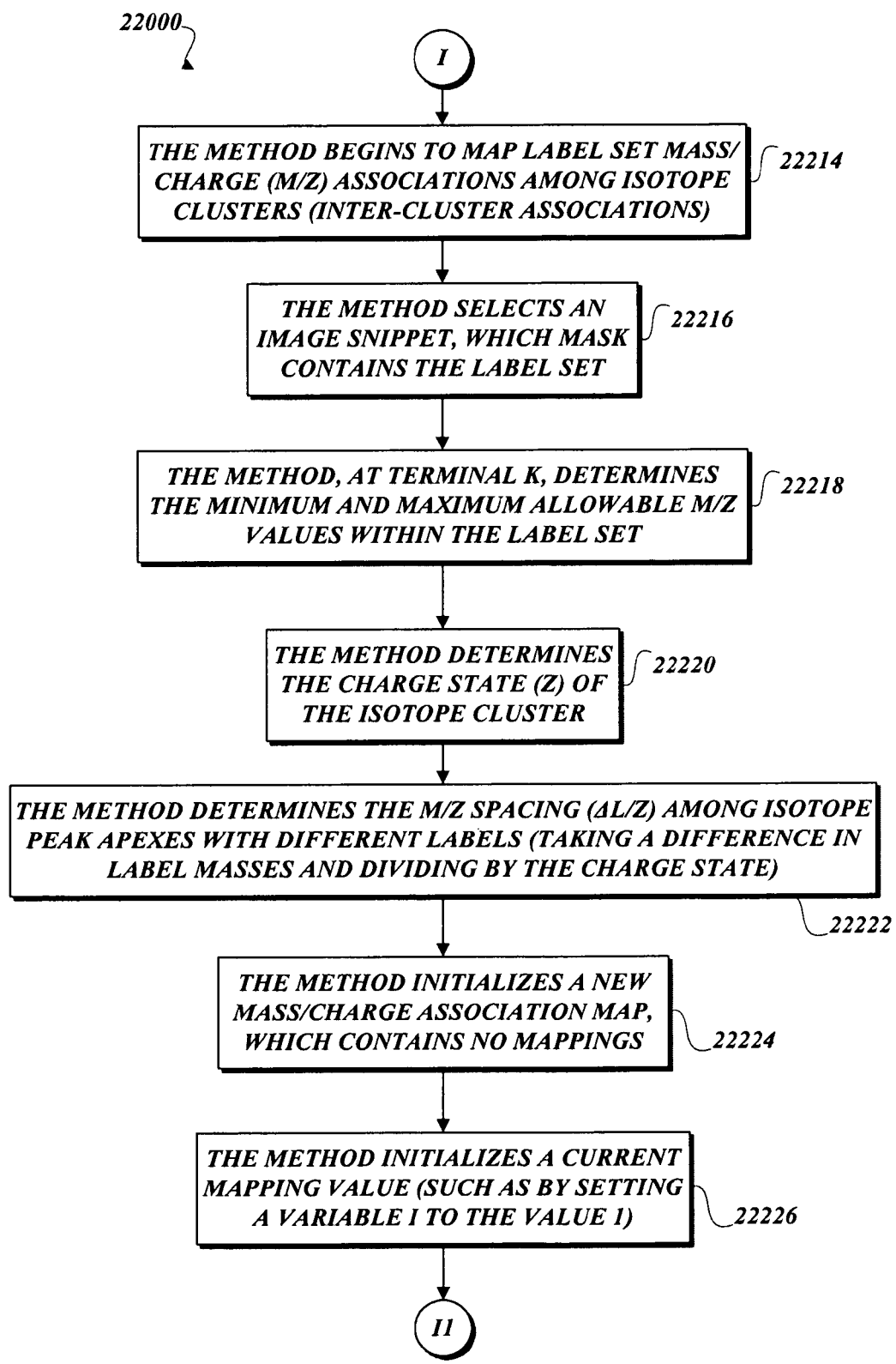
Figure 22A:
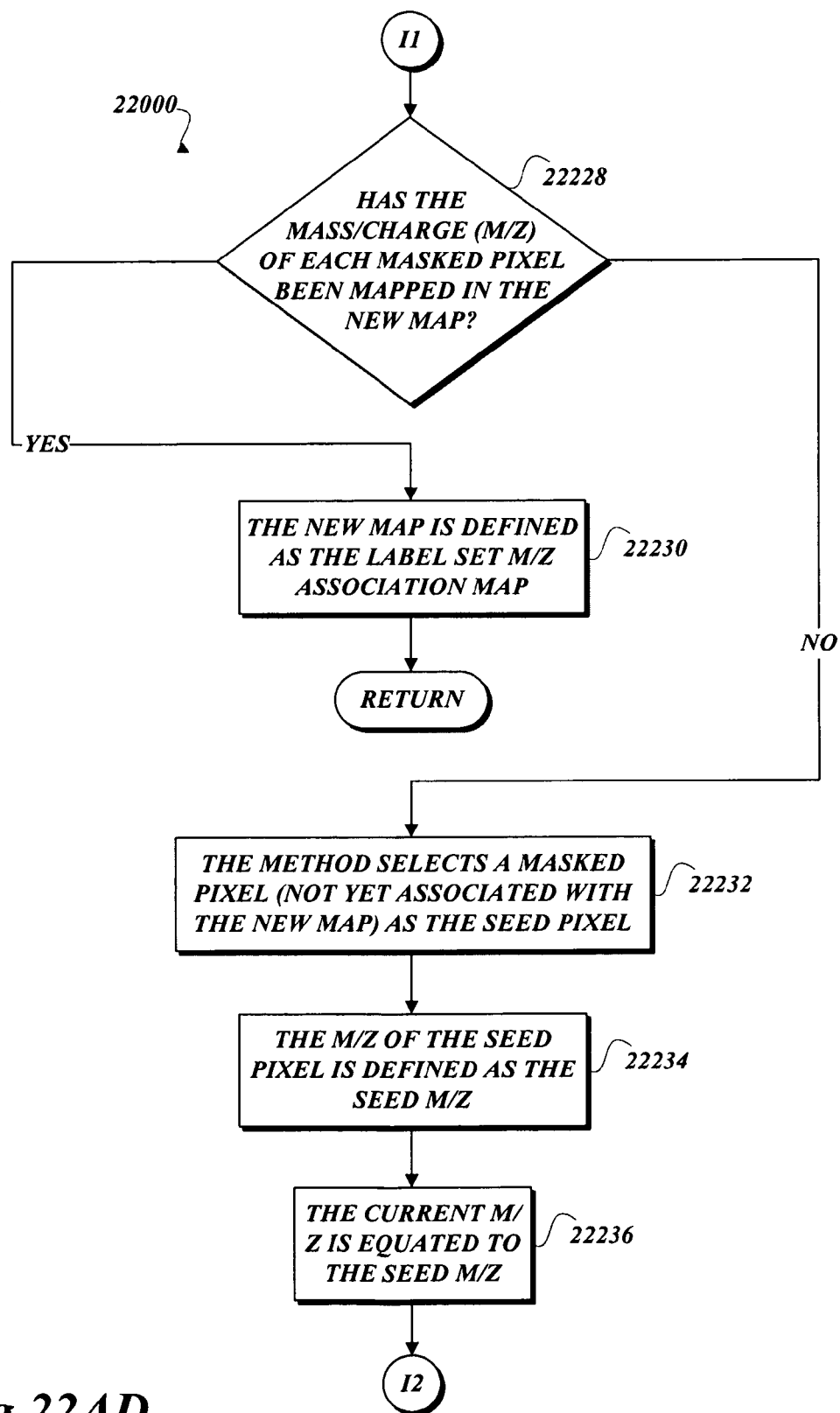
Figure 22A:
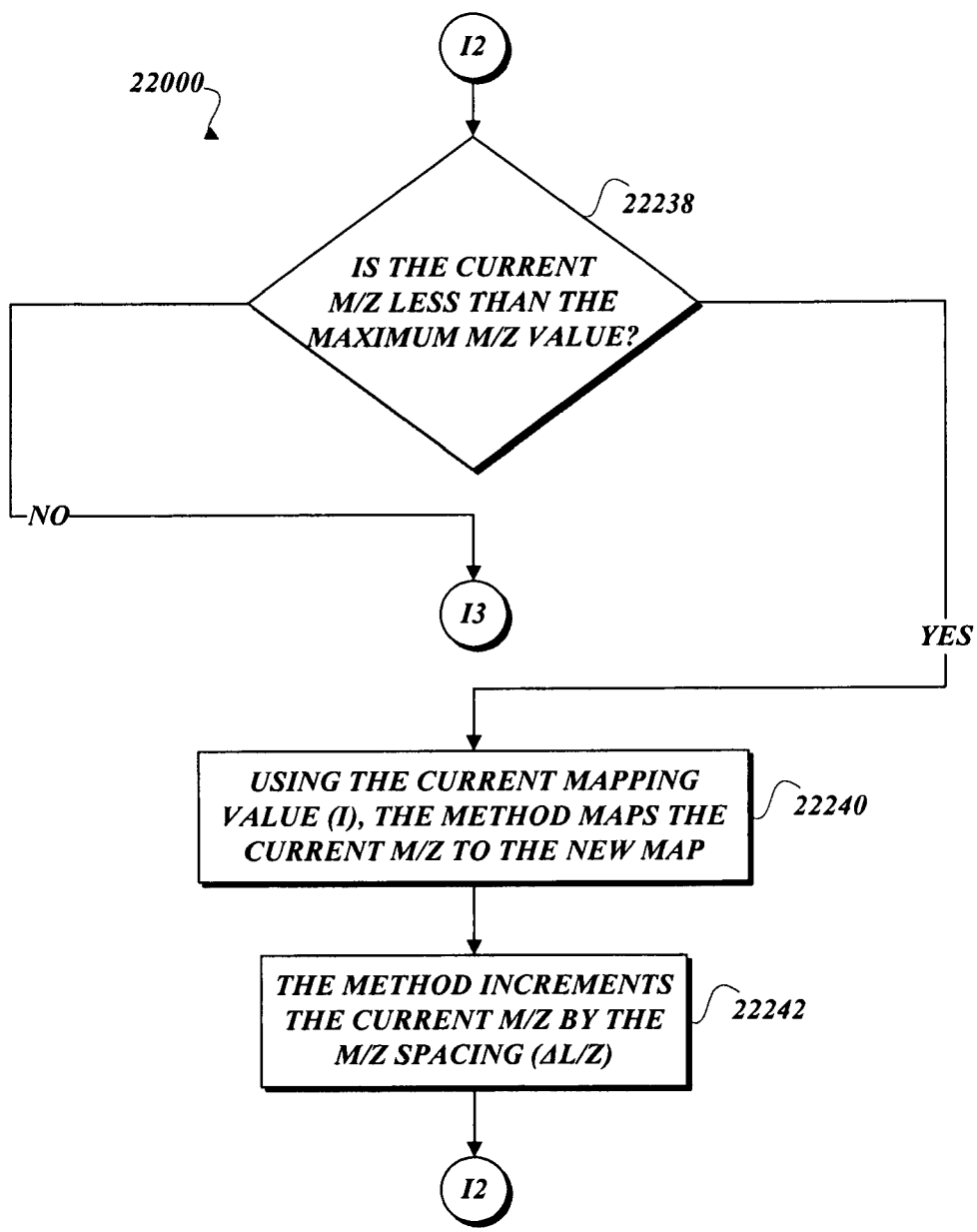
Figure 22A:
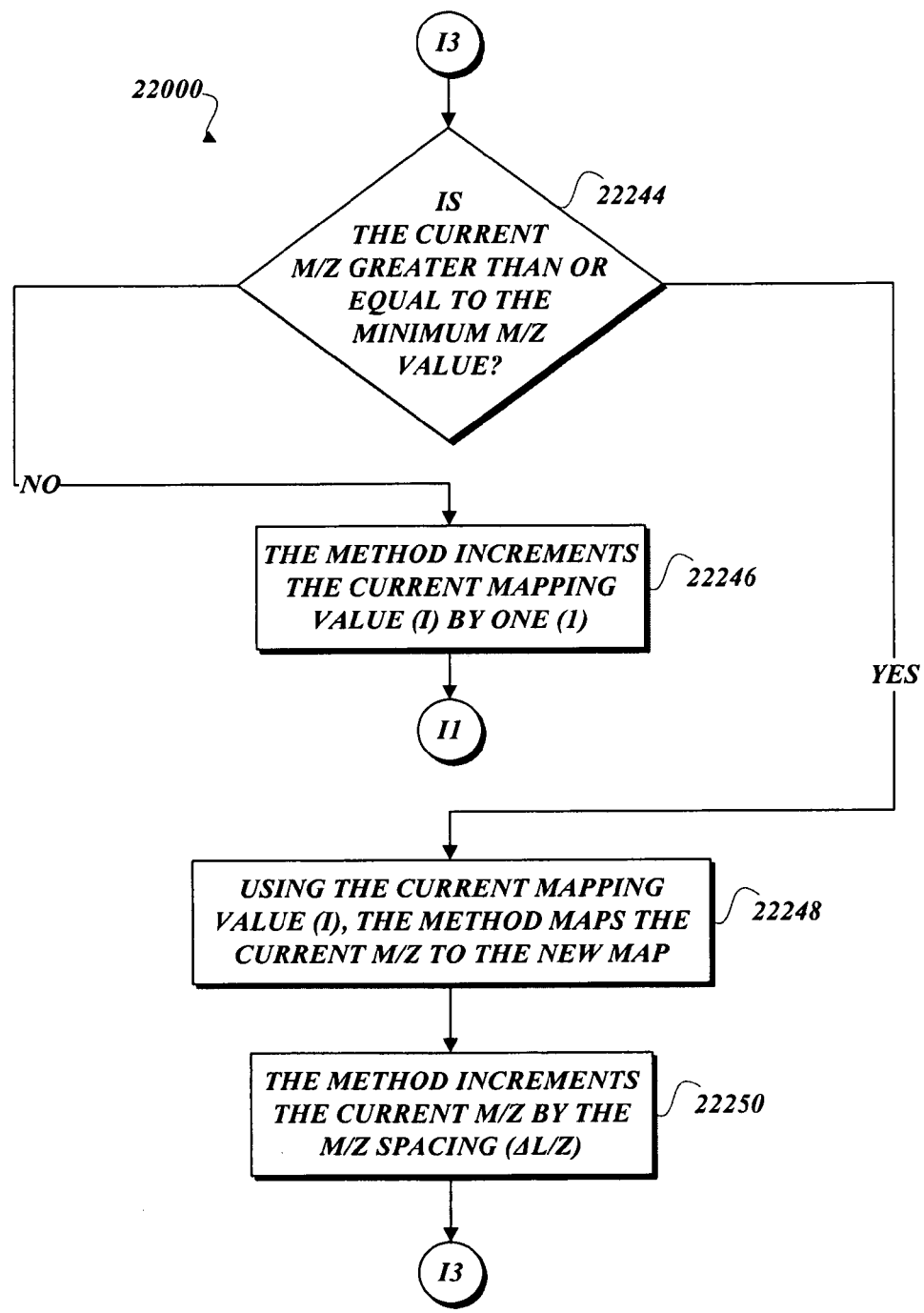
Figure 22A:
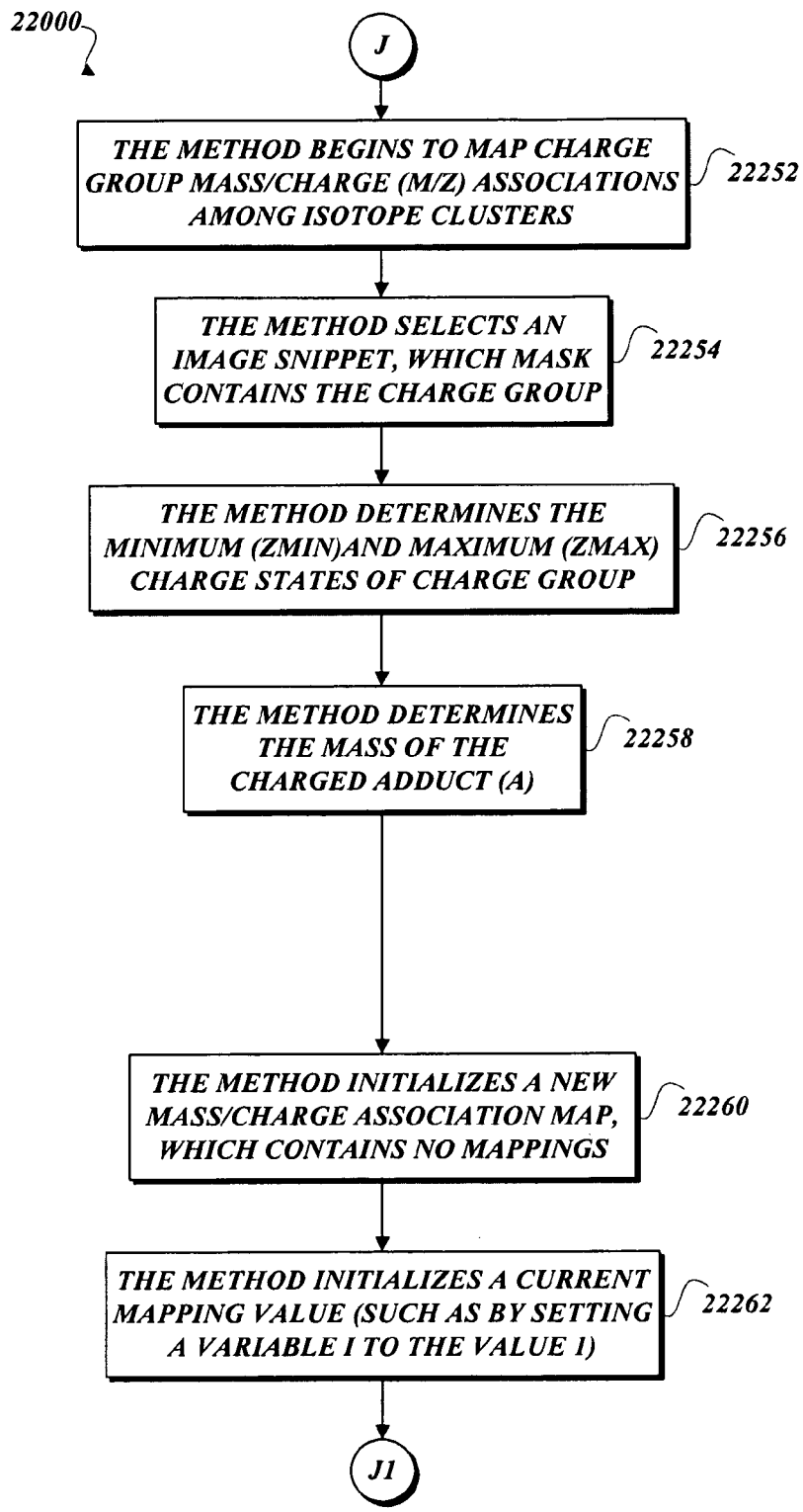
Figure 22A:
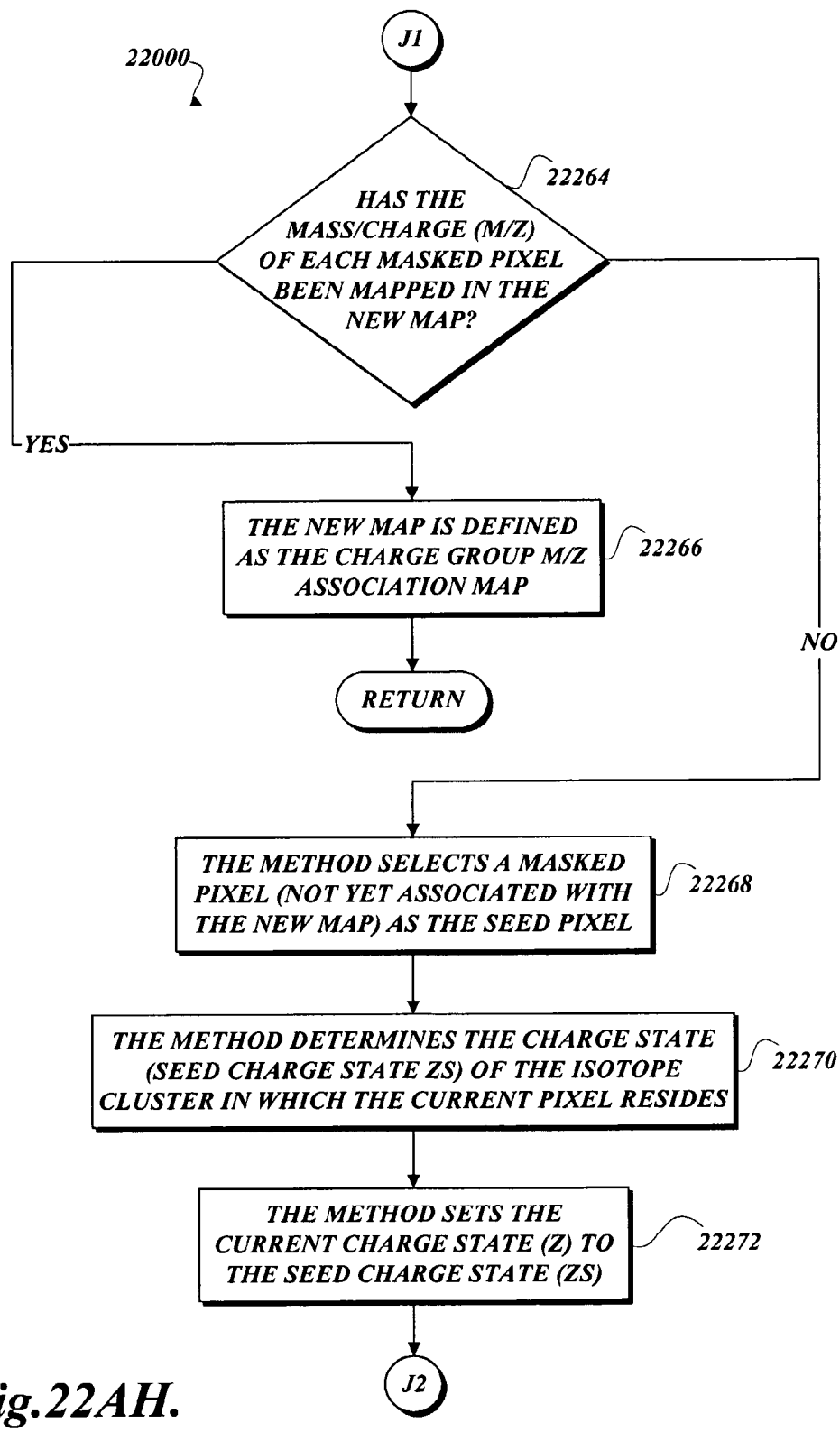
Figure 22A:
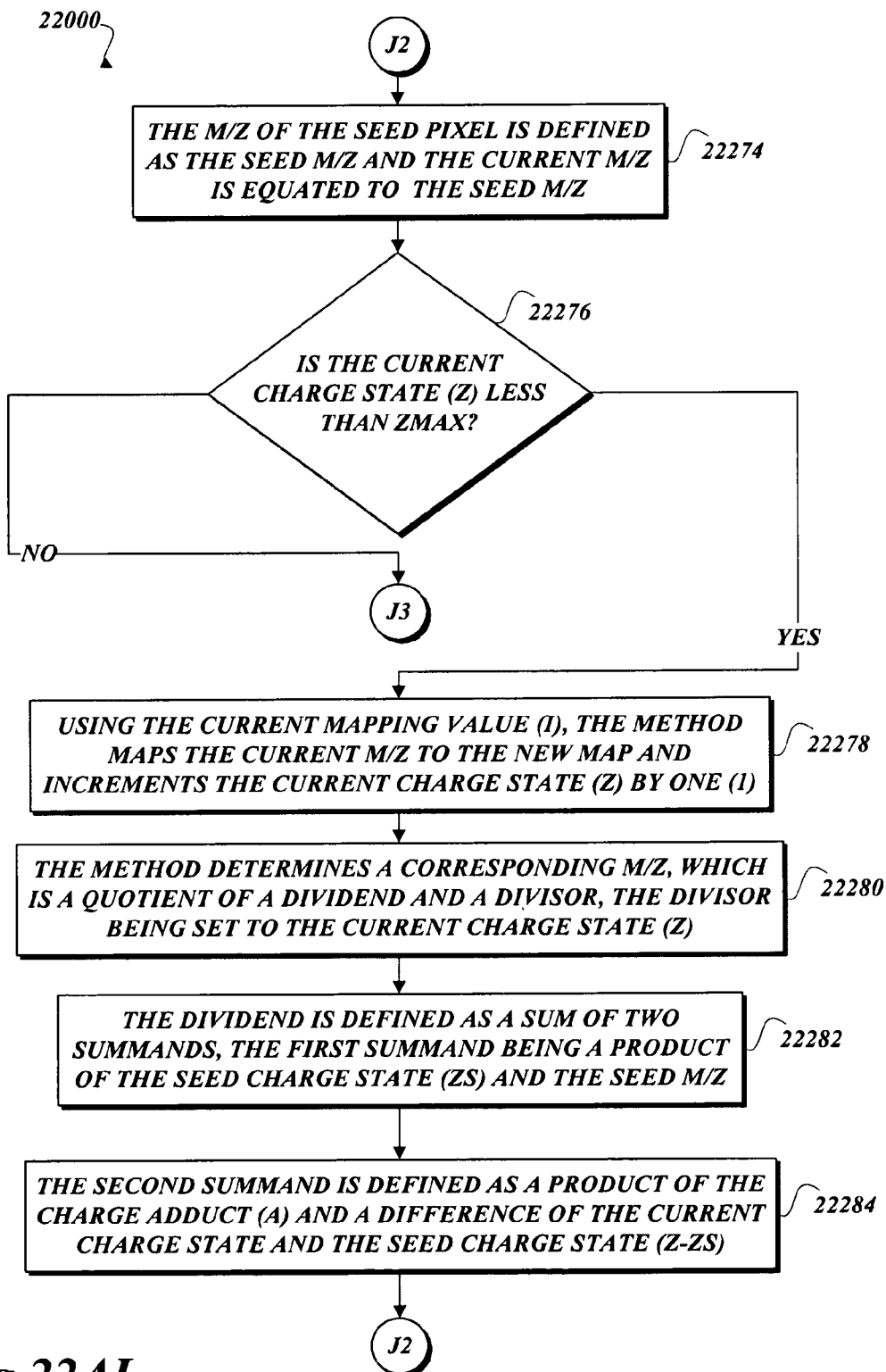
Figure 22A:
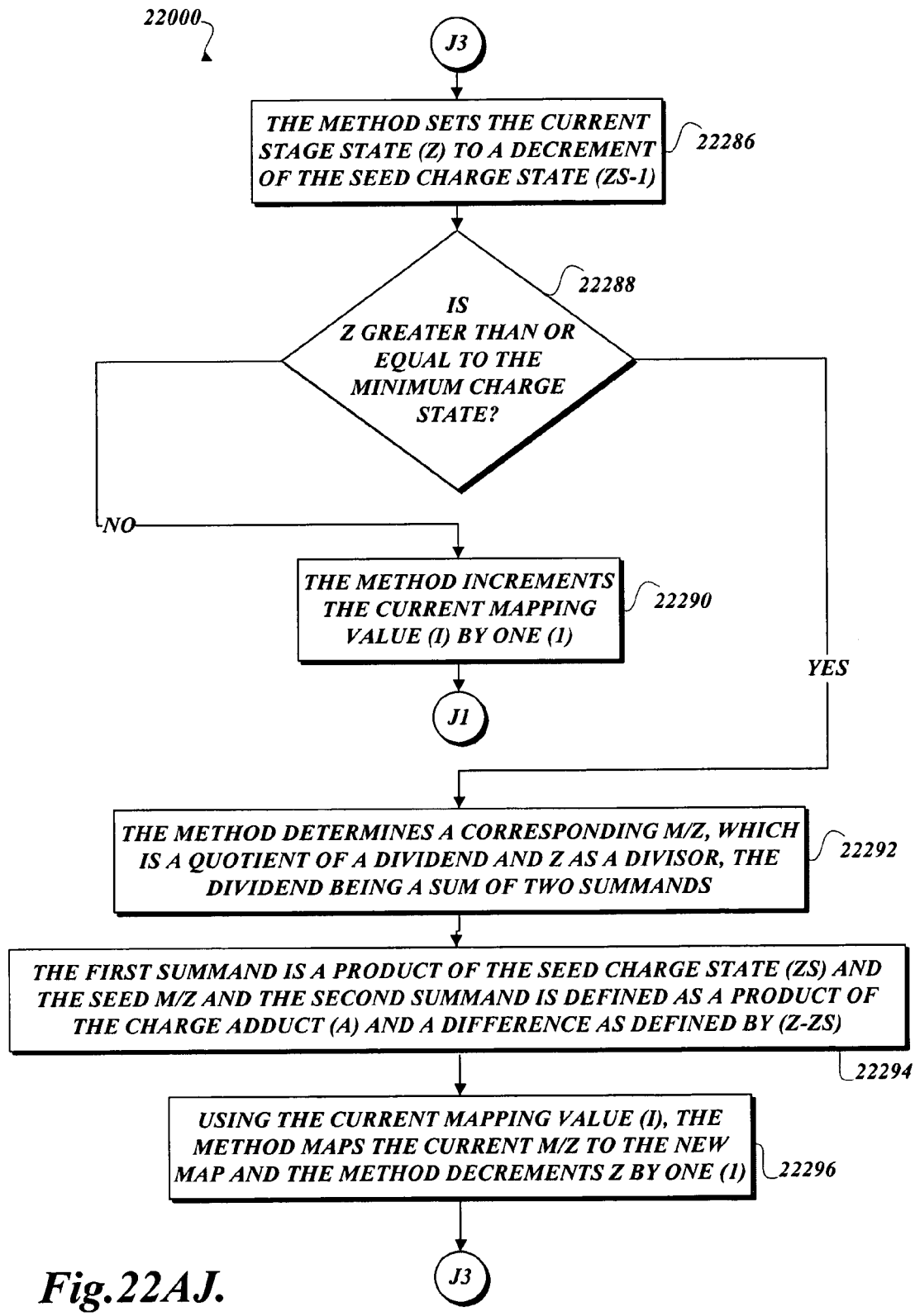
Figure 22A:
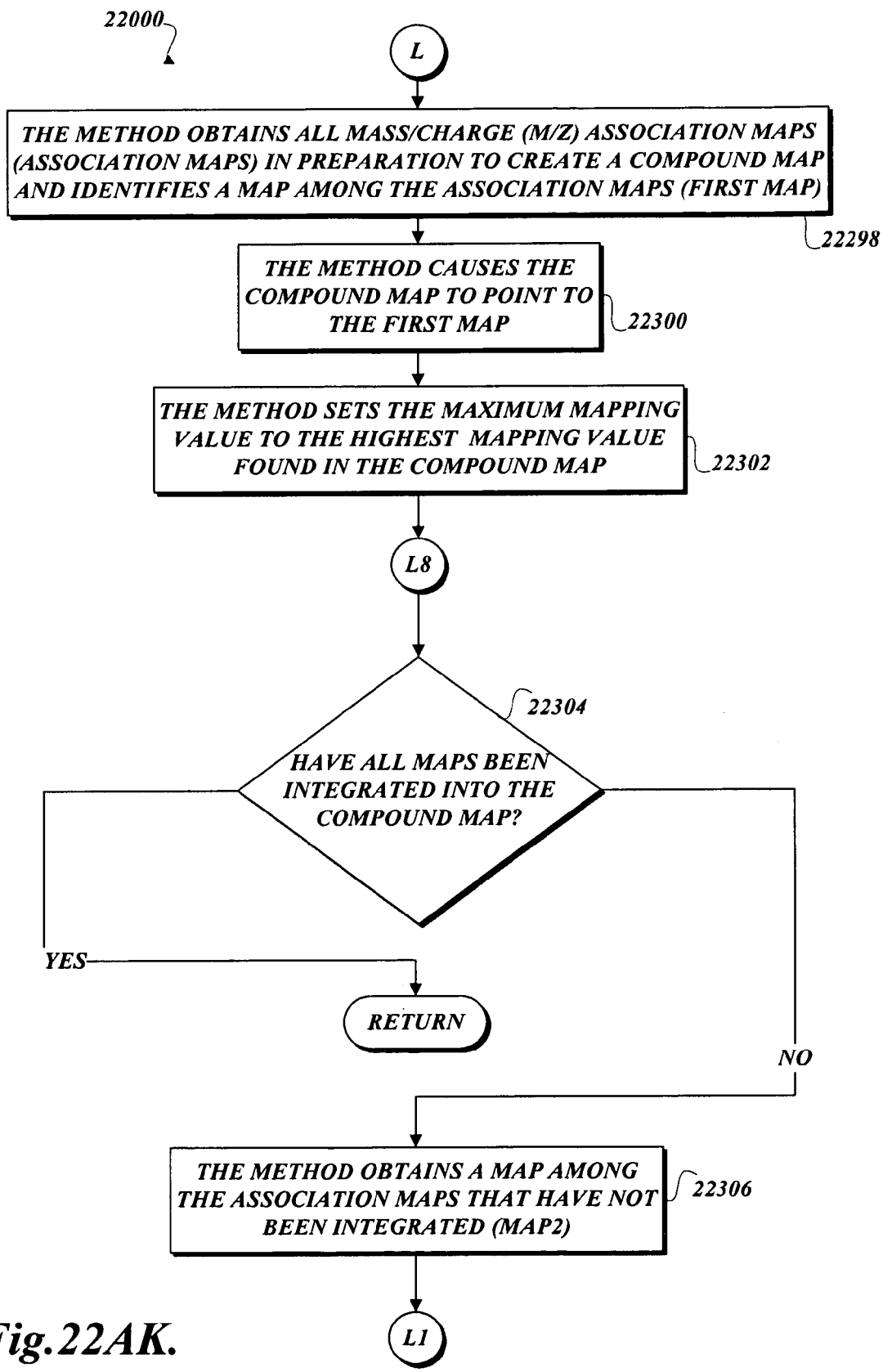
Figure 22A:
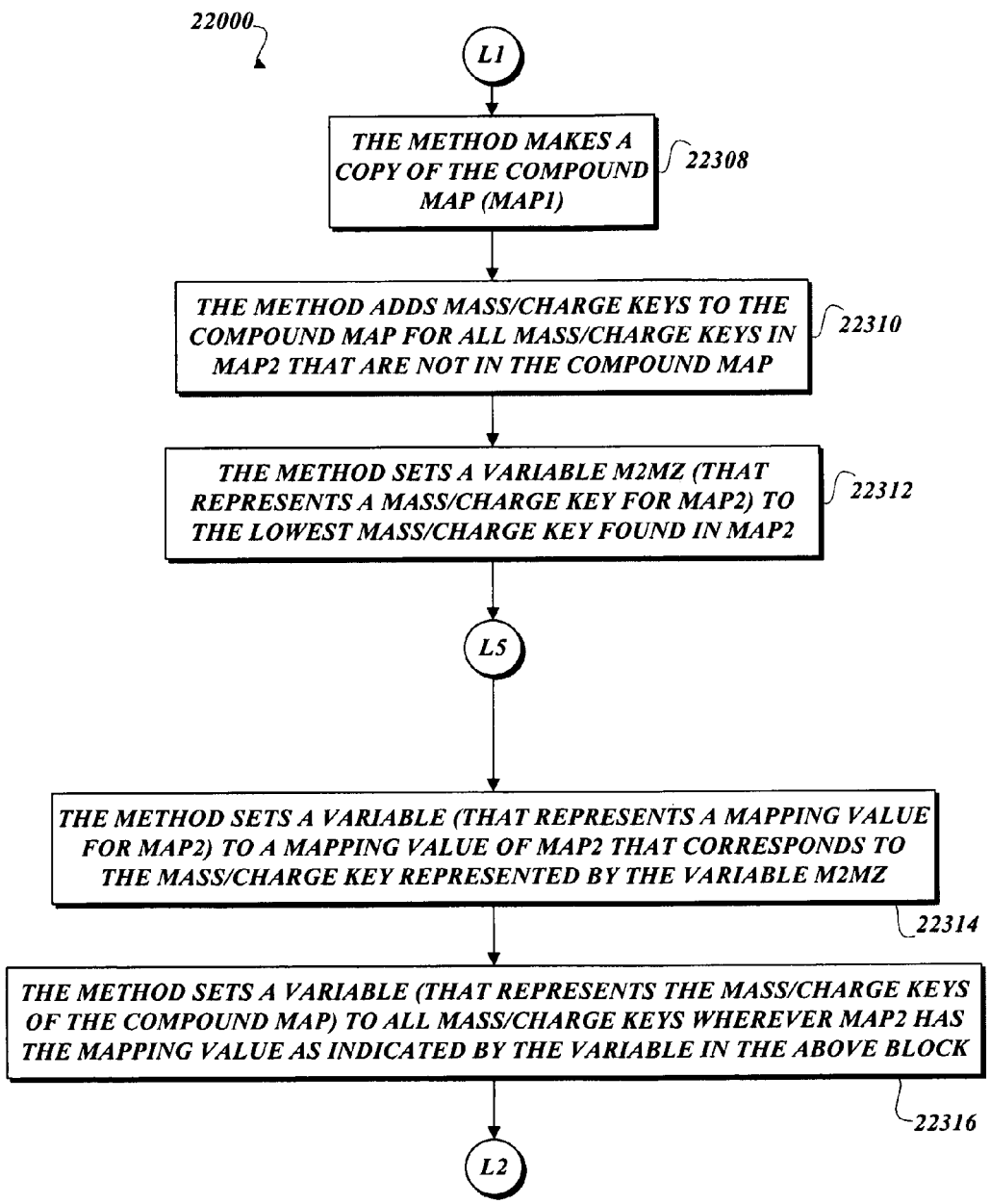
Figure 22A:
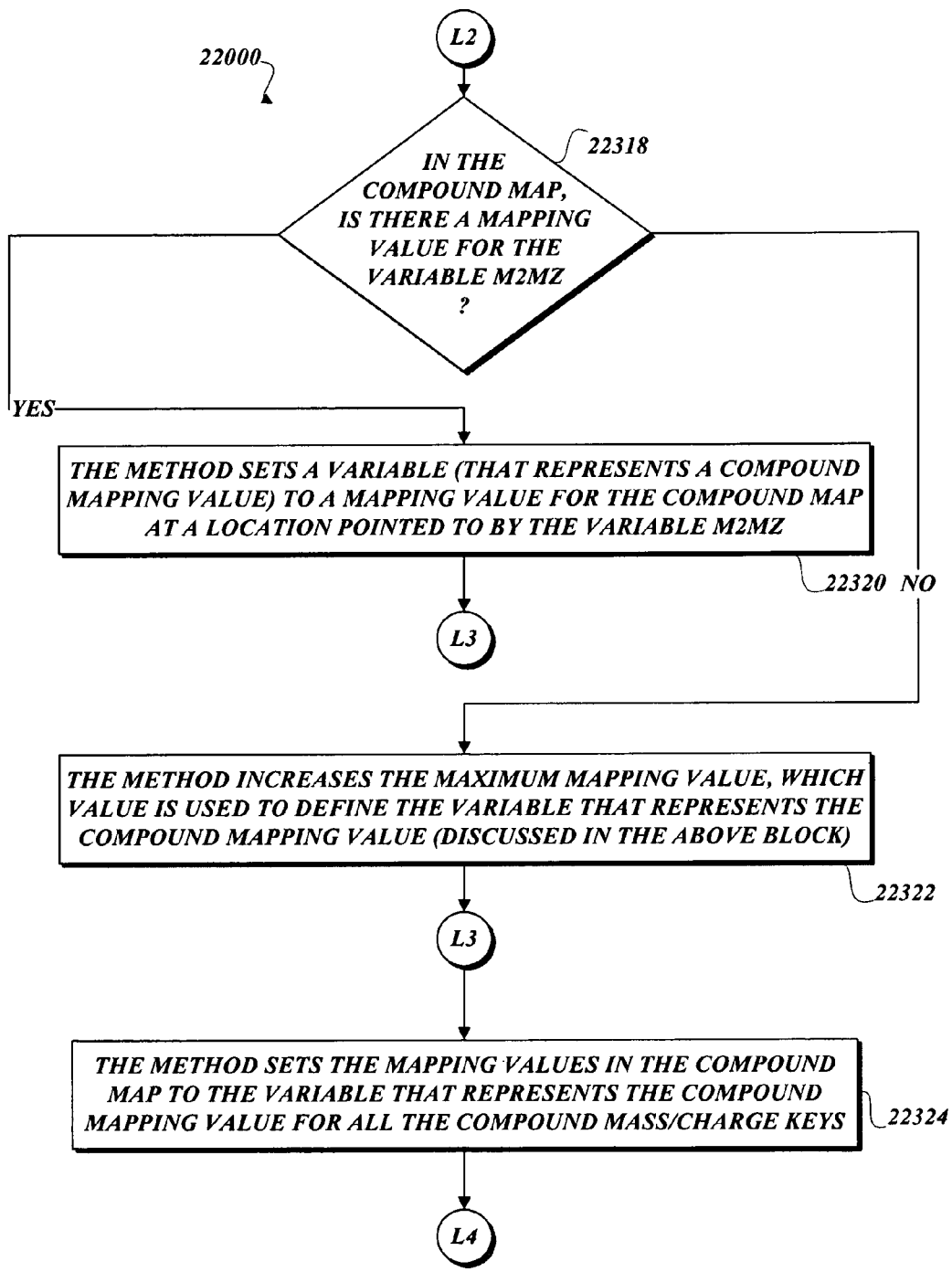
Figure 22A:
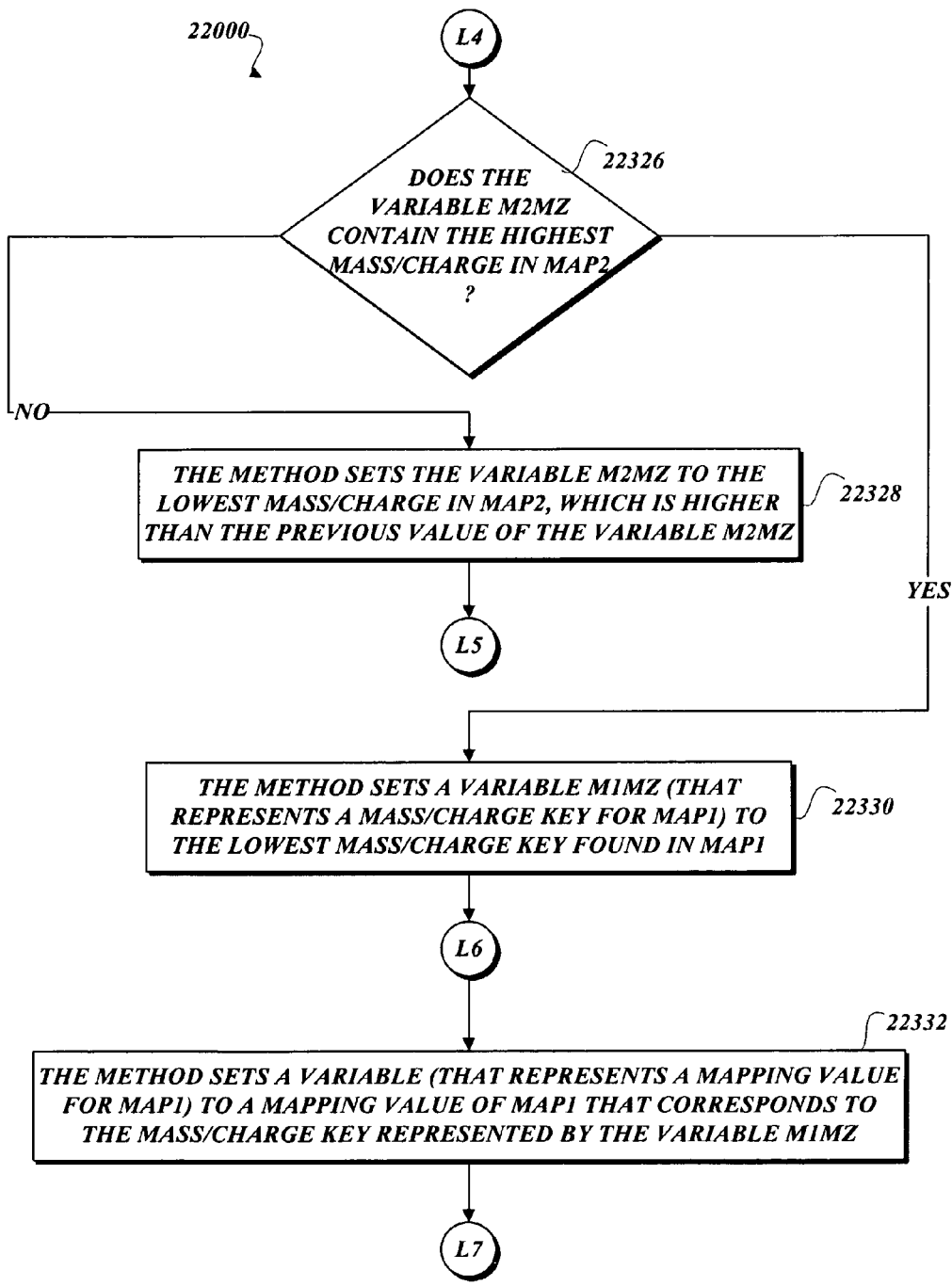
Figure 22A:
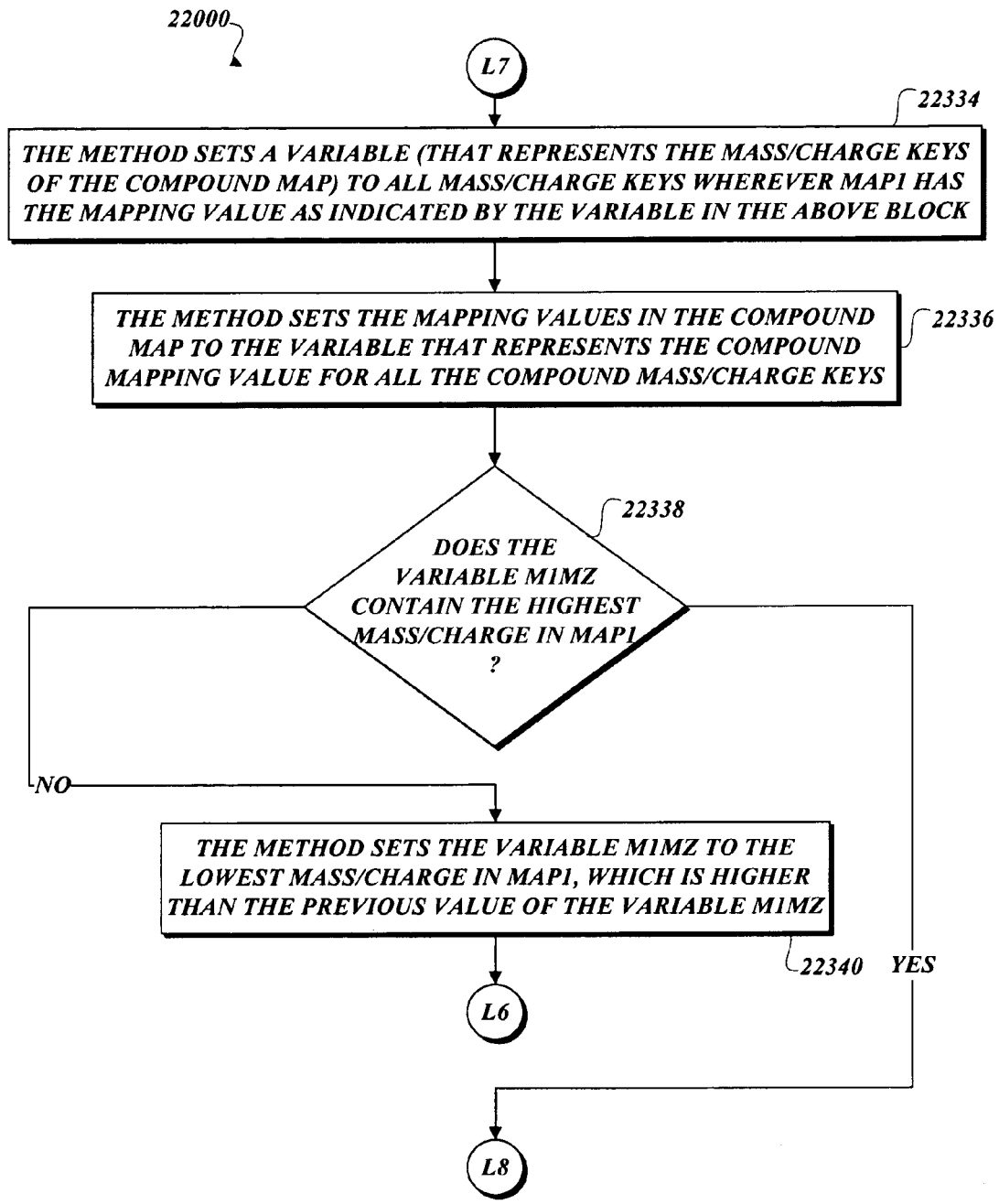
Figure 22A:
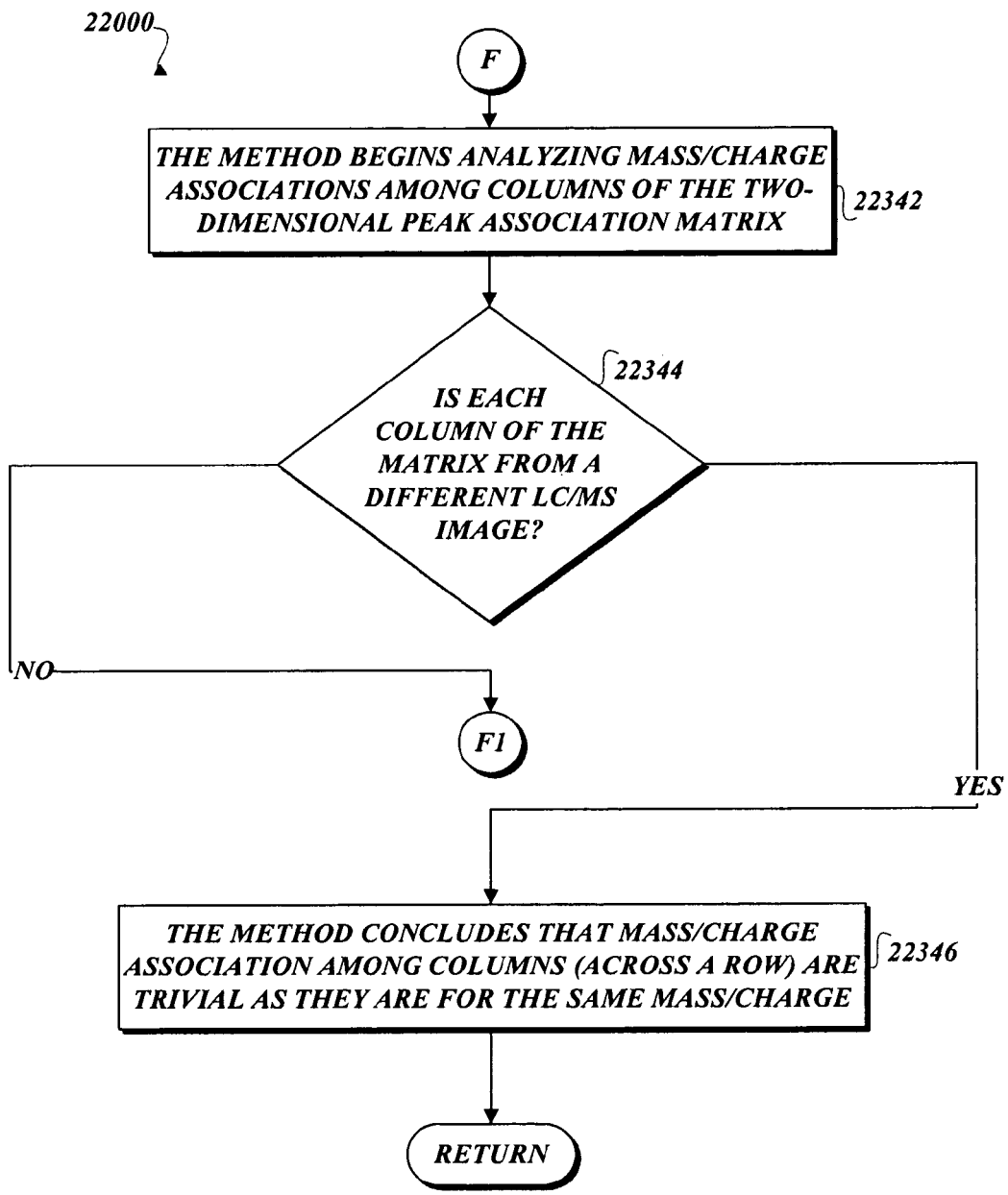
Figure 22A:
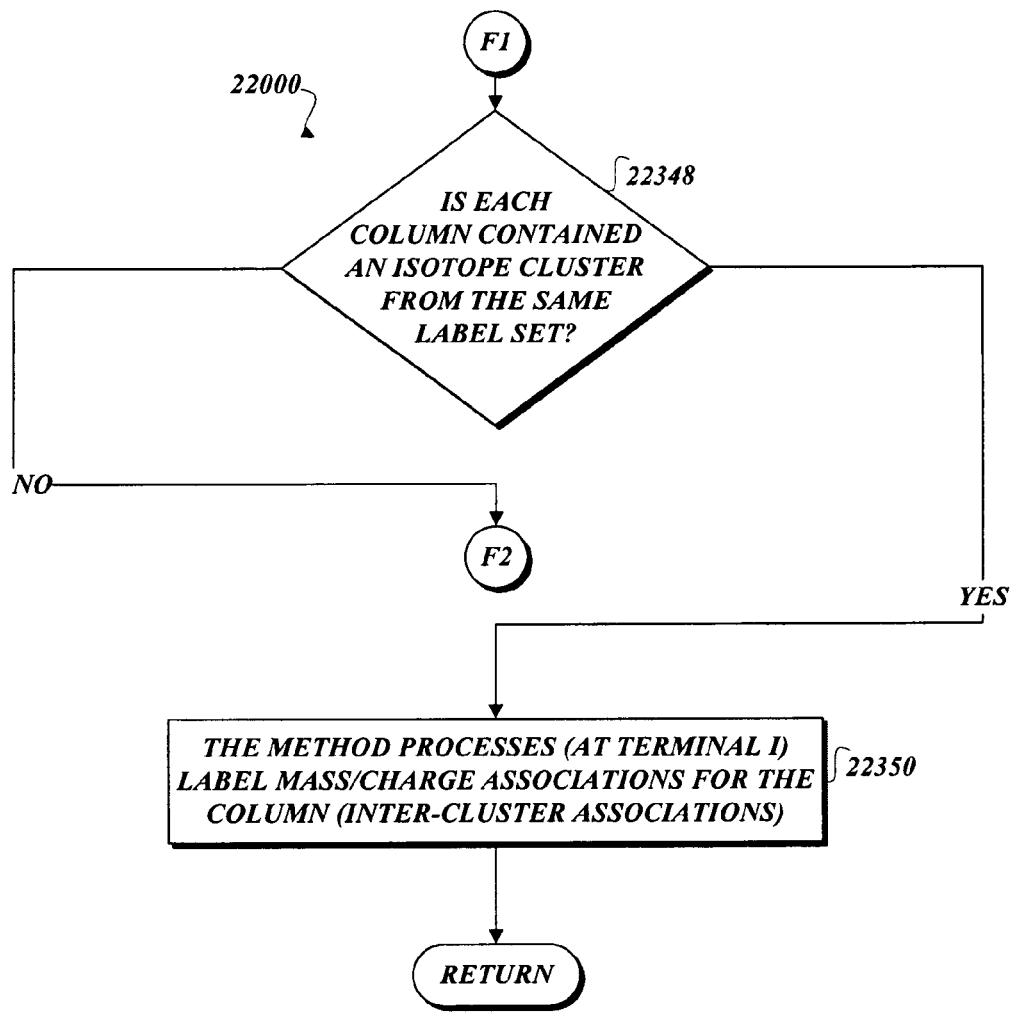
Figure 22A:
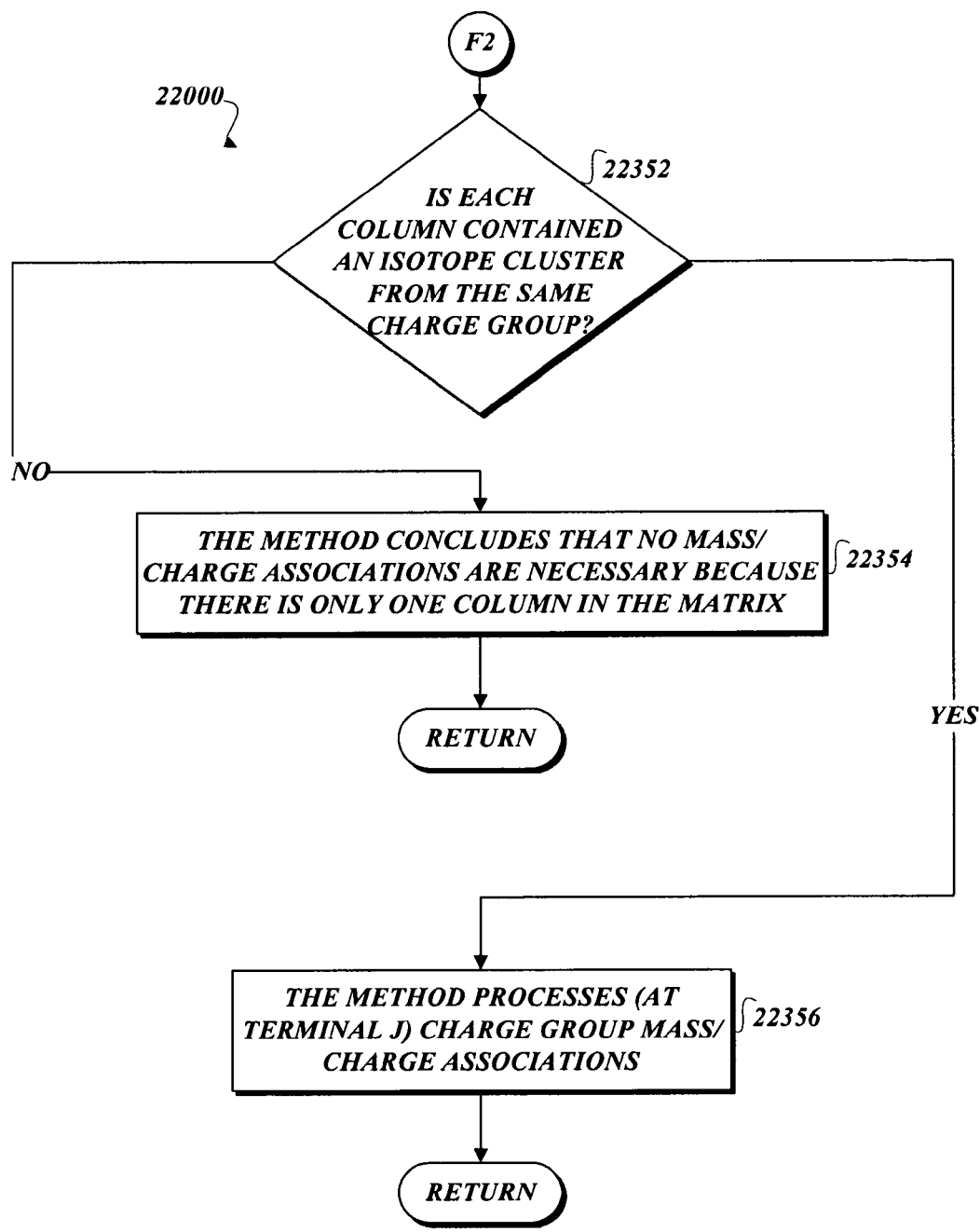
Figure 22A:
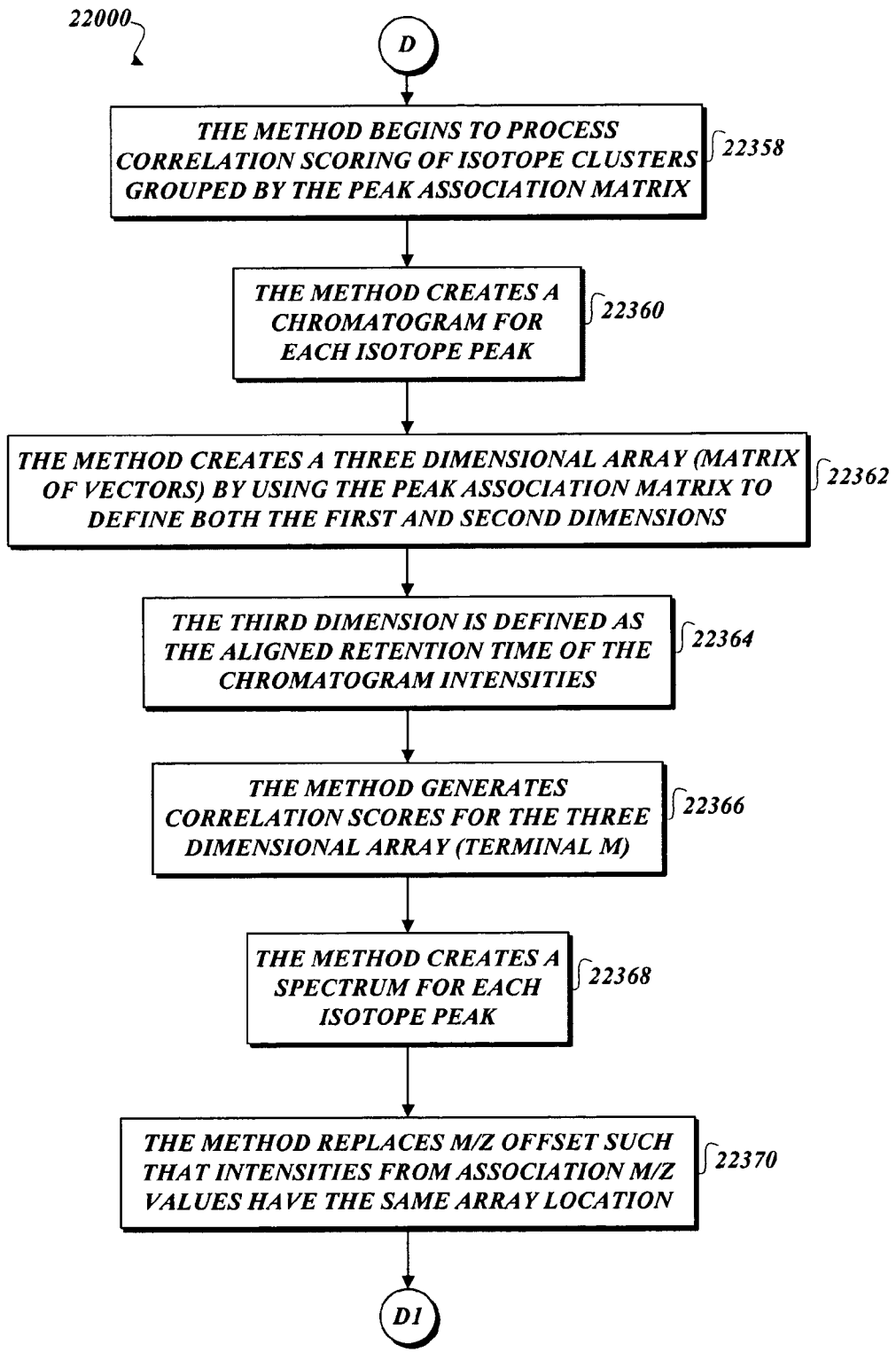
Figure 22A:
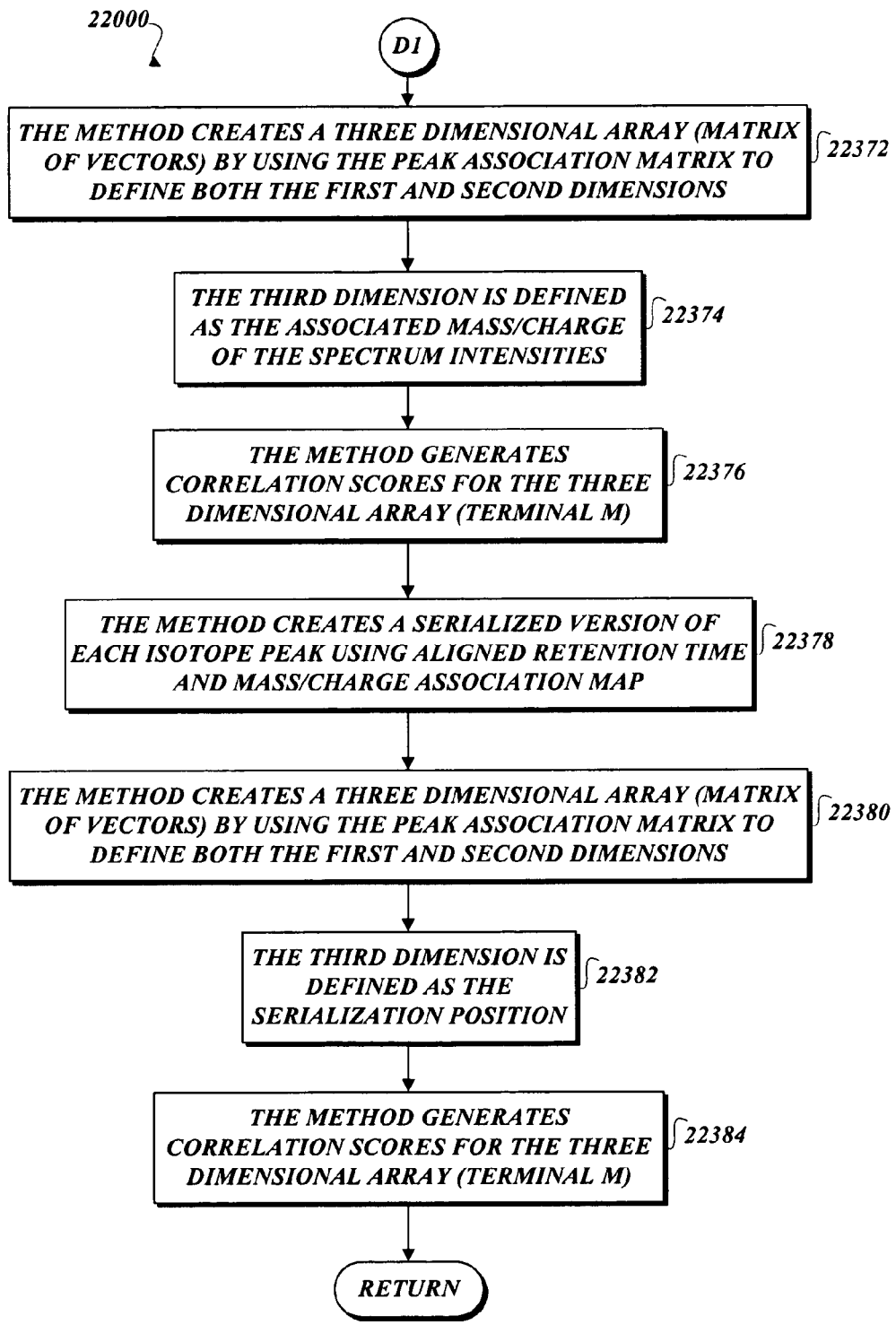
Figure 22A:
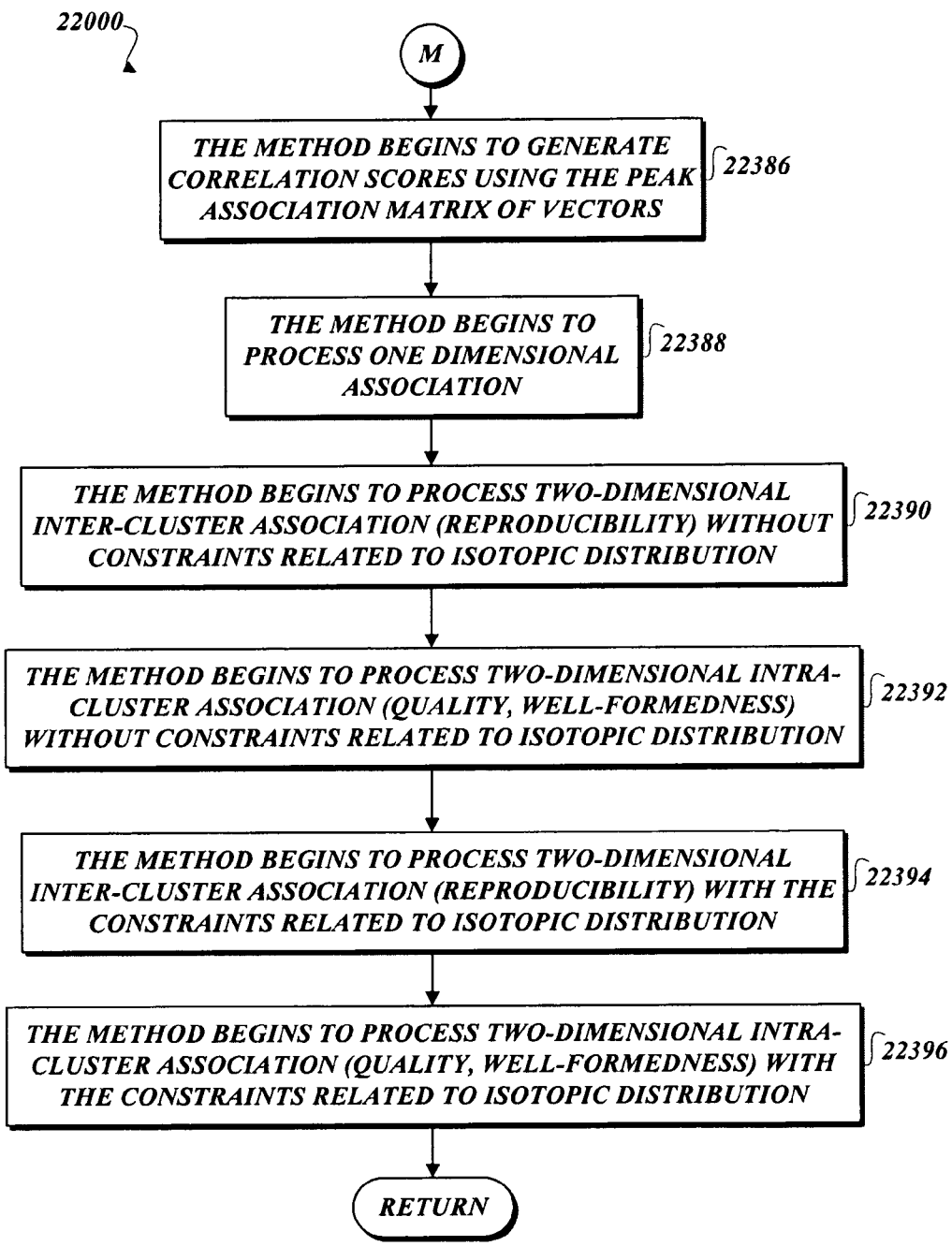

FIGS. 22A-22AU illustrate a process 22000 for processing noncontiguous regions of interest to discover biological features. From a start block, the method 22000 proceeds to block 22006 where the method performs macro-alignment if there were multiple LC/MS images to process, and from there, the method further proceeds to a continuation terminal ("terminal A"). From terminal A (FIG. 22A), the method identifies regions of interest on an LC/MS image such as by detecting isotope peaks. See block 22002. Next, a decision block 22004 executes a test to determine whether there are more LC/MS images to process. If the answer to the test at decision block 22004 is YES, the method enters terminal A to skip back to block 22002, and the above-identified processing step is repeated. Otherwise, if the answer to the test at decision block 22004 is NO, then the method proceeds to block 22008, the method groups isotope peaks into isotope clusters. The method then continues to another continuation terminal ("terminal A1").

From terminal A1 (FIG. 22B), the method 22000 proceeds to block 22010, where the method groups isotope clusters into charge groups, if any. Next, at decision block 22012, a test is performed to determine whether isotopic labeling was used to mark experiments. If the answer to the test at decision block 22012 is YES, the method continues to block 22014 where the method groups isotope clusters into label sets. The method then continues to another continuation terminal ("terminal A2"). If the answer to the test at decision block 22012 is NO, the method continues to terminal A2 (FIG. 22B) and further proceeds to block 22016 where the method identifies forms of isotope clusters to prepare them for scoring. The method then continues to another continuation terminal ("terminal A3").

From terminal A3 (FIG. 22C), the method proceeds to decision block 22018 where a test is performed to determine whether all forms of isotope clusters have been scored. If the answer is YES to the test at decision block 22018, the method proceeds to another continuation terminal ("terminal A5"). Otherwise, if the answer to the test at decision block 22018 is NO, then the method proceeds to another decision block 22020 where a test is performed to determine whether there is more than one LC/MS image. If the answer is YES to the test at decision block 22020, the method proceeds to block 22022 where the method performs micro-alignment and regional redefinition on various forms of the isotope clusters. The method then continues to another continuation terminal ("terminal A4"). If the answer is NO to the test at decision block 22020, the method also proceeds to terminal A4.

From terminal A4 (FIG. 22D), the method 22000 proceeds to block 22024 where the method selects one form of isotope cluster to analyze. As discussed hereinbefore, portion associations form a basis for isotope peak associations. Isotope peak associations occur if portions within an isotope peak can be associated with a portion belonging to another isotope peak. Among many reasons for portion associations include portions from different images that are associated with each other if the regions have a similar (aligned) retention time and mass/charge; portions at different mass/charge values within an isotope cluster are associated with each other if the portions have the same retention time and are separated by isotopic mass differences; portions at different mass/charge values within a label set are associated with each other if the portions have the same retention time and are separated by mass differences of the isotopic labels; portions at different mass/charge values within a charge group are associated with each other if the portions have the same retention time and are separated by charge state; and so on.

At block 22026, the method creates a peak association matrix (matrix) that corresponds to the form of isotope clusters (see terminal B). If the matrix is two-dimensional, the method determines mass/charge association maps (see terminal C). See block 22028. At block 22030, the method generates correlation scores (see terminal D) using the matrix and mass/charge association maps. At block 22032, the method 22000 combines the scores for the particular form of the isotope clusters. The method then proceeds to terminal A3 and skips back to decision block 22018 where the above-identified processing steps are repeated.

From terminal A5 (FIG. 22E), the method 22000 proceeds to block 22034 where the method evaluates the combined scores to aid researchers to discover biological features. The method then terminates execution.

From terminal B (FIG. 22E), the method 22000 proceeds to decision block 22036 where a test is performed to determine whether the method is processing multiple LC/MS images. If the answer to the test at decision block 22036 is YES, the method continues to another continuation terminal ("terminal B4"). Otherwise, the method continues to another continuation terminal ("terminal B1").

From terminal B1 (FIG. 22F), the method 22000 proceeds to decision block 22038 where a test is performed to determine whether there are multiple isotope clusters in a charge group on one image. If the answer to the test at decision block 22038 is NO, the method continues to another continuation terminal ("terminal B2").

If, on the other hand, the answer to the test at decision block 22038 is YES, the method continues to block 22040 where the first dimension (rows) of the peak association matrix (matrix) comprises isotope peaks, each isotope peak from multiple isotope clusters. At block 22042, the second dimension (columns) of the matrix comprises isotope clusters, each isotope cluster being from the same charge state. The method then continues to block 22044 where the method sorts each column by peak apexes using mass/charge values. The method then returns to a location within the method 22000 where the steps connected with terminal B were invoked.

From terminal B2 (FIG. 22G), the method 22000 proceeds to decision block 22046 where a test is performed to determine whether there are multiple isotope clusters in a label set on one image. If the answer to the test at decision block 22046 is NO, the method continues to another continuation terminal ("terminal B3"). Otherwise, the method 22000 proceeds to block 22048 because the answer to the test at decision block 22046 is YES. At block 22048, the first dimension (rows) of the peak association matrix (matrix) comprises isotope peaks, each isotope peak from multiple isotope clusters. At block 22050, the second dimension (columns) of the matrix comprises isotope clusters, each isotope cluster being from the same label. At block 22052, the method sorts each column by peak apexes using mass/charge values. The method 22000 then returns to the location from which the steps of terminal B were invoked.

From terminal B3 (FIG. 22H), the method 22000 proceeds to decision block 22054 where a test is performed to determine whether there is one or more isotope cluster on one image. If the answer is NO to the test at decision block 22054, the method continues to another continuation terminal ("terminal B7"). Otherwise, if the answer to the test at decision block 22054 is YES, then the method 22000 proceeds to block 22056 where the peak association matrix (matrix) comprises a single column, each cell of the column indicating an isotope peak, each isotope peak from one or more isotope clusters. The method 22000 then proceeds to block 22058 where the method sorts peak apexes by their mass/charge values. The method 22000 then returns to the location from which the steps of the method 22000 were invoked.

From terminal B4 (FIG. 22I), the method 22000 proceeds to decision block 22060 where a test is performed to determine whether there are multiple isotope clusters in a charge group on one image. If the answer to the test at decision block 22060 is NO, the method proceeds to another continuation terminal ("terminal B5"). Otherwise, if the answer to the test at decision block 22060 is YES, then the method proceeds to block 22062 where the first dimension (rows) of the peak association matrix (matrix) comprises isotope peaks, each isotope peak from multiple isotope clusters. At block 22064, the second dimension (columns) of the matrix comprises the identity of the LC/MS image (image number or replicate number). At block 22066, the method sorts each column by peak apexes using mass/charge values. The method 22000 then returns to the location from which the steps of the method 22000 were invoked.

From terminal B5 (FIG. 22J), the method 22000 proceeds to decision block 22068 where the test is performed to determine whether there are multiple isotope clusters in a label set on one image. If the answer is NO to the test at decision block 22068, the method 22000 proceeds to another continuation terminal ("terminal B6"). Otherwise, if the answer to the test at decision block 22068 is YES, then the method proceeds to block 22070 where the first dimension (rows) of the peak association matrix (matrix) comprises isotope peaks, each isotope peak from multiple isotope clusters. At block 22072, the second dimension (columns) of the matrix comprises the identity of the LC/MS image (image number or replicate number). At block 22074, the method sorts each column by peak apexes using mass/charge values. The method 22000 then returns to the location from which the steps of the method 22000 were invoked.

From terminal B6 (FIG. 22K), the method 22000 proceeds to decision block 22076 where a test is performed to determine whether there are more than one isotope clusters on one image. If the answer to the test at decision block 22076 is NO, the method proceeds to another continuation terminal ("terminal B7"). Otherwise, the answer is YES to the test at decision block 22076, and the method proceeds to block 22078 where the peak association matrix (matrix) comprises a single column, each cell of the column indicating an isotope peak, each isotope peak from one or more isotope clusters. At block 22080, the second dimension (columns) of the matrix comprises the identity of the LC/MS image (image number or replicate number). At block 22082, the method sorts peak apexes by their mass/charge values. The method then returns to the location from which the steps of the method 22000 were invoked.

From terminal B7 (FIG. 22L), the method 22000 proceeds to block 22084. Given that the isotope clusters do not conform to a recognized form, the method 22000 proceeds to create a non-conforming peak association matrix (matrix). At decision block 22086, a test is performed to determine whether the method is processing multiple LC/MS images. If the answer is YES to the test at decision block 22086, the second dimension (columns) of the matrix comprises the identity of the LC/MS image (image number or replicate number). See block 22088. The method then continues to another continuation terminal ("terminal B 11"). Otherwise, the answer to the test at decision block 22086 is NO, and the method proceeds to another continuation terminal ("terminal B8").

From terminal B8 (FIG. 22M), the method 22000 proceeds to decision block 22090 where a test is performed to determine whether there are multiple isotope clusters in a label set on one image. If the answer is NO to the test at decision block 22090, the method proceeds to another continuation terminal ("terminal B9").

Otherwise, the answer to the test at decision block 22090 is YES, and the method proceeds to block 22092, where the second dimension (columns) of the matrix comprises isotope clusters, each isotope cluster being from the same label of the one image. At block 22094, the first dimension (rows) of the matrix comprises isotope peaks, each isotope peak from multiple isotope clusters. At block 22096, each cell of the matrix represents an isotope peak. The method 22000 returns to the location from which the steps of terminal B were invoked.

From terminal B9 (FIG. 22N), the method 22000 proceeds to decision block 22098 where a test is performed to determine whether there are multiple isotope clusters in a charge group on one image. If the answer to the test at decision block 22098 is NO, the method proceeds to another continuation terminal ("terminal B10"). Otherwise, the answer to the test at decision block 22098 is YES, and the method proceeds to block 22100 where the second dimension (columns) of the matrix comprises isotope clusters, each isotope cluster being from the same label of the one image. At block 22102, the first dimension (rows) of the matrix comprises isotope peaks, each isotope peak from multiple isotope clusters. At block 22104, each cell of the matrix represents an isotope peak. The method 22000 then returns to the location from which the steps of terminal B were invoked.

From terminal B10 (FIG. 22O), the peak association matrix (matrix) comprises a single column, each cell of the column indicating an isotope peak, each isotope peak from one or more isotope clusters. See block 22106. At block 22108, each cell of the matrix represents an isotope peak. The method 22000 then returns to a location from which the steps of terminal B were invoked.

From terminal B11 (FIG. 22P), the method 22000 proceeds to decision block 22110 where a test is performed to determine whether there are multiple isotope clusters in a label set per image. If the answer to the test at decision block 22110 is NO, the method proceeds to another continuation terminal ("terminal B12"). Otherwise, the answer to the test at decision block 22110 is YES, and the method proceeds to block 22112, where the first dimension (rows) of the matrix comprises isotope peaks, each isotope peak from multiple isotope clusters on an image, which is sorted by mass/charge. At block 22114, the matrix is formed comprising cells representing isotope peaks. The method 22000 then returns to a location from which the steps of the terminal B were invoked.

From terminal B12 (FIG. 22Q), the method 22000 proceeds to decision block 22116 where a test is performed to determine whether there are multiple isotope clusters in a charge group per image. If the answer to the test at decision block 22116 is NO, the method continues to another continuation terminal ("terminal B13"). Otherwise, if the answer to the test at decision block 22116 is YES, then the method proceeds to block 22118 where the first dimension (rows) of the matrix comprises isotope peaks, each isotope peak from multiple isotope clusters on an image, which is sorted by mass/charge dimension. The method proceeds to block 22120 where the matrix is formed comprising cells representing isotope peaks. The method 22000 then returns to a location from which the steps of the terminal B were invoked.

From terminal B13 (FIG. 22Q), the method 22000 proceeds to block 22122 where the first dimension (rows) of the matrix comprises isotope peaks, each isotope peak from an isotope cluster. The method then returns to a location from which the steps of the terminal B were invoked.

From terminal C (FIG. 22R), the method 22000 accesses the peak association matrix (matrix) that corresponds to the form of isotope clusters (previously discussed beginning at terminal B). See block 22124. At block 22126, the method determines a mass/charge association map (see terminal E) for isotope peaks in the first dimension (within a column). At block 22128, the method determines a mass/charge association map (see terminal F) for isotope peaks in the second dimension (for each row spanning among various columns). The method then returns to a location from which the steps of the terminal C were invoked.

From terminal E (FIG. 22S), the method 22000 proceeds to decision block 22130 where a test is performed to determine whether there are multiple isotope peaks from multiple isotope clusters within the column. If the answer to the test at decision block 22130 is NO, the method continues to another continuation terminal ("terminal G"). Otherwise, the answer to the test at decision block 22130 is YES, and the method proceeds to block 22132 where the method maps mass/charge association (terminal H) among isotope peaks within each isotope cluster (intra-cluster associations for multiple clusters). At decision block 22134, a test is performed to determine whether the column contains a label set with multiple clusters. If the answer to the test at decision block 22134 is NO, the method proceeds to another continuation terminal ("terminal E2"). Otherwise, the answer to the test at decision block 22134 is YES, and the method proceeds to another continuation terminal ("terminal E1").

From terminal E1 (FIG. 22T), the method 22000 proceeds to block 22136 where the method maps label set mass/charge associations (terminal I) for the column (inter-cluster associations). The method then continues to another continuation terminal ("terminal E3").

From terminal E2 (FIG. 22T), the method 22000 proceeds to decision block 22138 where a test is performed to determine whether the column contains a charge group with multiple clusters. If the answer to the test at decision block 22138 is NO, the method 22000 returns to a location from which the steps of the terminal E were invoked. Otherwise, the answer to the test at decision block 22138 is YES, and the method proceeds to block 22140 where the method maps label set mass/charge associations (terminal I) for the column (inter-cluster associations). The method then continues to terminal E3 and further continues on to block 22142 where the method compounds intra-cluster mass/charge associations with inter-cluster mass/charge associations (terminal J). The method then returns to a location from which the steps of the terminal E were invoked.

From terminal G (FIG. 22U), the method proceeds to block 22144 where the method begins to map mass/charge (mass/charge) associations among isotope peaks within an isotope cluster (intra-cluster associations). At block 22146, the method selects an image snippet, whose mask contains the above-identified isotope cluster. At block 22148, the method, at terminal K, determines the minimum and maximum allowable mass/charge values. At block 22150, the method determines the charge state (Z) of the isotope cluster. At block 22152, based on the charge state and isotopic composition, the method determines the mass/charge spacing (Δmass/charge) among isotope peak apexes. At block 22154, the method initializes a new mass/charge association map, which contains no mappings. At block 22156, the method initializes a current mapping value (such as by setting a variable I to the value 1). The method then continues to another continuation terminal ("terminal G1").

From terminal G1 (FIG. 22V), the method 22000 proceeds to decision block 22158 where a test is performed to determine whether the mass/charge (mass/charge) of each masked pixel has been mapped in the new map. If the answer to the test at decision block 22158 is YES, the method proceeds to block 22160 where the new map is defined as the mass/charge association map for the isotope cluster. The method 22000 then returns to a location from which the steps of terminal G were invoked. Otherwise, the answer to the test at decision block 22158 is NO, and the method proceeds to block 22162 where the method selects a masked pixel (not yet associated with the new map) as the seed pixel. At block 22164, the mass/charge of the seed pixel is defined as the seed mass/charge. The current mass/charge is equated to the seed mass/charge. See block 22166. The method then continues to another continuation terminal ("terminal G2").

From terminal G2 (FIG. 22W), the method 22000 proceeds to decision block 22166 where a test is performed to determine whether the current mass/charge is less than the maximum mass/charge value. If the answer to the test at decision block 22166 is NO, the method continues to another continuation terminal ("terminal G3"). Otherwise, the answer to the test at decision block 22166 is YES, and the method proceeds to block 22168. Using the current mapping value (I), the method maps the current mass/charge to the new map. See block 22168. At block 22170, the method increments the current mass/charge by the mass/charge spacing (Δmass/charge). The method then continues to terminal G and skips back to decision block 22166 where the above-identified processing steps are repeated.

From terminal G3 (FIG. 22X), the method 22000 proceeds to decision block 22172 where a test is performed to determine whether the current mass/charge is greater than or equal to the minimum mass/charge valued. If the answer to the test at decision block 22172 is NO, the method increments the current mapping value (I) by one (1). See block 22174. The method then continues to terminal G1 and skips back to decision block 22158 where the above-identified processing steps are repeated. If the answer to the test at decision block 22172 is YES, the method proceeds to block 22176. Using the current mapping value (I), the method maps the current mass/charge to the new map. See block 22176. At block 22178, the method increments the current mass/charge by the mass/charge spacing (Δmass/charge). The method then continues to terminal G3 and skips back to decision block 22172 where the above-identified processing steps are repeated.

From terminal K (FIG. 22Z), the method 22000 proceeds to decision block 22180 where a test is performed to determine whether the method has analyzed all isotope peaks. If the answer to the test at decision block 22180 is YES, the method continues to another continuation terminal ("terminal K1"). Otherwise, the answer to the test at decision block 22180 is NO, and the method proceeds to block 22182 where the method determines the charge state of an isotope peak. At block 22184, the method determines the absolute difference between the isotope peak's highest mass/charge and the mass/charge of its apex. At block 22186, the method creates a product (MAX product) from two multiplicands, one being the absolute difference as calculated in the block above, and the other being the charge state. At block 22188, the method determines the absolute difference between the mass/charge of the isotope peak's apex and its lowest mass/charge value. At block 22190, the method creates a product (MIN product) from two multiplicands, one being the absolute difference calculated in the block above and the other being the charge state. The above steps are repeated for all isotope peaks to create multiple MAX products and multiple MIN products. The method continues to terminal K and skips back to decision block 22180 where the above-identified processing steps are repeated to create multiple MAX products and multiple MIN products for all isotope peaks.

From terminal K1 (FIG. 22AA), the method determines the largest MAX product (ΔMAX) among multiple MAX products calculated for various isotope peaks. At block 22194, the method determines the largest MIN product (ΔMIN) among multiple MIN products calculated for various isotope peaks. At block 22196, the method determines the apex of the isotope peak that has the highest mass/charge (MAX apex). At block 22198, the method determines the apex of the isotope peak that has the lowest mass/charge value (MIN apex). At block 22200, the method determines the charge state of the isotope peak that has the highest mass/charge value (MAX charge). At block 22202, the method determines the charge state of the isotope peak that has the lowest mass/charge value (MIN charge). At block 22204, the method calculates the maximum allowable mass/charge as the sum of the two summands, one being the MAX apex and the other being the quotient of the dividend ΔMAX and the divisor MAX charge. The method calculates the minimum allowable mass/charge as a sum of two summands, one being the MIN apex and the other being the quotient of the dividend ΔMIN and the divisor MAX charge. See block 22206. The method then returns to a location from which the steps of the terminal K were invoked.

From terminal H (FIG. 22AB), the method 22000 proceeds to decision block 22208 where a test is performed to determine whether all isotope clusters have been mapped. If the answer to the test at decision block 22208 is YES, the method returns to a location from which the steps of the terminal H were invoked. Otherwise, the answer to the test at decision block 22208 is NO, and the method proceeds to block 22210 where the method selects an isotope cluster that has not been mapped. The method continues to terminal G and skips back to block 22144 where the above-identified processing steps are repeated. The method 22000, returning from its execution of the steps of terminal G, proceeds to block 22212 where the method adds the map to a mass/charge association map associated with multiple isotope clusters. The method then continues to terminal H and skips back to decision block 22208 and repeats the above-identified processing steps.

From terminal I (FIG. 22AC), the method 22000 proceeds to block 22214 where the method begins to map label set mass/charge associations among isotope clusters (inter-cluster associations). At block 22216, the method selects an image snippet, whose mask contains the label set. At block 22218, the method, at terminal K, determines the minimum and maximum allowable mass/charge values within the label set. At block 22220, the method determines the charge state (Z) of the isotope cluster. At block 22222, the method determines the mass/charge spacing (ΔL/Z) among isotope peak apexes with different labels (taking a difference in label masses and dividing by the charge state). At block 22224, the method initializes a new mass/charge association map, which contains no mappings. At block 22226, the method initializes a current mapping value (such as by setting a variable I to the value 1). The method then continues to another continuation terminal ("terminal I1").

From terminal I1 (FIG. 22AD), the method 22000 proceeds to decision block 22228 where a test is performed to determine whether the mass/charge value of each masked pixel has been mapped in the new map. If the answer to the test at decision block 22228 is YES, the new map is defined as the label set mass/charge association map at block 22230. The method then returns to a location from which the steps of the terminal I were invoked. Otherwise, the answer to the test at decision block 22228 is NO, and the method proceeds to block 22232 where the method selects a masked pixel (not yet associated with the new map) as the seed pixel. At block 22234, the mass/charge of the seed pixel is defined as the seed mass/charge. At block 22236, the current mass/charge is equated to the seed mass/charge. The method then proceeds to another continuation terminal ("terminal I2").

From terminal I2 (FIG. 22AE), the method 22000 proceeds to decision block 22238 where a test is performed to determine whether the current mass/charge is less than the maximum mass/charge value. If the answer to the test at decision block 22238 is NO, the method proceeds to another continuation terminal ("terminal I3"). Otherwise, the answer to the test at decision block 22238 is YES, and the method proceeds to block 22240. Using the current mapping value (I), the method maps the current mass/charge to the new map. At block 22242, the method increments the current mass/charge by the mass/charge spacing (ΔL/Z). The method then continues to terminal I2 and skips back to decision block 22238 where the above-identified processing steps are repeated.

From terminal I3 (FIG. 22AF), the method 22000 proceeds to decision block 22244 where a test is performed to determine whether the current mass/charge is greater than or equal to the minimum mass/charge value. If the answer to the test at decision block 22244 is NO, the method proceeds to block 22246 where the method increments the current mapping value (I) by one (1). The method then continues to terminal I1 and skips back to decision block 22228 and the above-identified processing steps are repeated. Otherwise, the answer to the test at decision block 22244 is YES, and the method proceeds to block 22248. Using the current mapping value (I), the method maps the current mass/charge to the new map. At block 22250, the method increments the current mass/charge by the mass/charge spacing (ΔL/Z). The method then continues to terminal I3 and skips back to block 22244 where the above-identified processing steps are repeated.

From terminal J (FIG. 22AG), the method 22000 proceeds to block 22252 where the method begins to map charge group mass/charge associations among isotope clusters. At block 22254, the method selects an image snippet, which mask contains the charge group. At block 22256, the method determines the minimum (ZMIN) and maximum (ZMAX) charge states of charge group. At bock 22258, the method determines the mass of the charge adduct (A). At block 22260, the method initializes a new mass/charge association map, which contains no mappings. At block 22262, the method initializes a current mapping value (such as by setting a variable I to the value 1). The method then continues to another continuation terminal ("terminal J1").

From terminal J1 (FIG. 22AH), the method proceeds to decision block 22264 where a test is performed to determine whether the mass/charge of each masked pixel has been mapped in the new map. If the answer to the test at decision block 22264 is YES, the method continues to block 22266 where the new map is defined as the charge group mass/charge association map. The method 22000 then returns to a location from which the steps of the terminal J were invoked. Otherwise, the answer to the test at decision block 22264 is NO, and the method proceeds to block 22268 where the method selects a masked pixel (not yet associated with the new map) as the seed pixel. At block 22270, the method determines the charge state (seed charge state ZS) of the isotope cluster in which the current pixel resides. At block 22272, the method sets the current charge state (Z) to the seed charge state (ZS). The method then continues to another continuation terminal ("terminal J2").

From terminal J2 (FIG. 22AI), the method proceeds to block 22274 where the mass/charge of the seed pixel is defined as the seed mass/charge, and the current mass/charge is equated to the seed mass/charge. The method then continues to decision block 22276 where a test is performed to determine whether the current charge state (Z) is less than ZMAX. If the answer to the test at decision block 22276 is NO, the method continues to another continuation terminal ("terminal J3"). Otherwise, the answer to the test at decision block 22276 is YES, and the method proceeds to block 22278. Using the current mapping value (I), the method maps the current mass/charge to the new map and increments the current charge state (Z) by one (1). At block 22280, the method determines a corresponding mass/charge, which is a quotient of a dividend and a divisor, the divisor being set to the current charge state (Z). At block 22282, the dividend is defined as a sum of two summands, the first summand being a product of the seed charge state (ZS) and the seed mass/charge. At block 22284, the second summand is defined as a product of the charge adduct (A) and a difference of the current charge state and the seed charge state (Z-ZS). The method then continues to terminal J2 and skips back to block 22274 where the above-identified processing steps are repeated.

From terminal J3 (FIG. 22AJ), the method sets the current charge state (Z) to a decrement of the seed charge state (ZS-1). Next, at decision block 22288, a test is performed to determine whether Z is greater than or equal to the minimum charge state. If the answer to the test at decision block 22288 is NO, the method proceeds to block 22290 where the method increments the current mapping value (I) by one (1). The method then continues to terminal J1 and skips back to decision block 22264 where the above-identified processing steps are repeated. Otherwise, the answer to the test at decision block 22288 is YES, and the method proceeds to block 22292 where the method determines a corresponding mass/charge, which is a quotient of a dividend and Z as a divisor, the dividend being a sum of two summands. At block 22294, the first summand is a product of the seed charge state (ZS) and the seed mass/charge and the second summand is defined as a product of the charge adduct (A) and a difference as defined by (Z-ZS). At block 22296, using the current mapping value (I), the method maps the current mass/charge to the new map and the method decrements Z by one (1). The method then continues to terminal J3 where it skips back to block 22286 and the above-identified processing steps are repeated.

From terminal L (FIG. 22AK), the method obtains all mass/charge association maps (association maps) in preparation to create a compound map and identifies a map among the association maps (first map). At block 22300, the method causes the compound map to point to the first map. At block 22302, the method sets the maximum mapping value to the highest mapping value found in the compound map. The method then continues to another continuation terminal ("terminal L8"). From terminal L8 (FIG. 22AK), the method proceeds to decision block 22304 where a test is performed to determine whether all maps have been integrated into the compound map. If the answer to the test at decision block 22304 is YES, the method 22000 returns to a location from which the steps of the terminal L were invoked. Otherwise, the answer to the test at decision block 22304 is NO, and the method continues to block 22306 where the method obtains a map among the association maps that have not been integrated (MAP2). The method then continues to another continuation terminal ("terminal L1").

From terminal L1 (FIG. 22AK), the method makes a copy of the compound map (MAP1) at block 22308. At block 22310, the method adds mass/charge keys to the compound map for all mass/charge keys in MAP2 that are not in the compound map. At block 22312, the method sets a variable M2MZ (that represents a mass/charge key for MAP2) to the lowest mass/charge key found in MAP2. The method then continues to another continuation terminal ("terminal L5"). From terminal L5 (FIG. 22AK), the method 22000 proceeds to block 22314 where the method sets a variable (that represents a mapping value for MAP2) to a mapping value of MAP2 that corresponds to the mass/charge key represented by the variable M2MZ. At block 22316, the method sets a variable (that represents the mass/charge keys of the compound map) to all mass/charge keys wherever MAP2 has the mapping value as indicated by the variable in the above block. The method then continues to another continuation terminal ("terminal L2").

From terminal L2 (FIG. 22AM), the method 22000 proceeds to decision block 22318 where a test is performed to determine whether, in the compound map, there is a mapping value for the variable M2MZ. If the answer to the test at decision block 22318 is YES, the method sets a variable (that represents a compound mapping value) to a mapping value for the compound map at a location pointed to by the variable M2MZ. See block 22320. The method then continues to another continuation terminal ("terminal L3"). Otherwise, the answer to the test at decision block 22318 is NO, and the method proceeds to block 22322 where the method increases the maximum mapping value, which is used to define the variable that represents the compound mapping value (discussed in the above block). The method then enters terminal L3 to proceed to block 22324 where the method sets the mapping values in the compound map to the variable that represents the compound mapping value for all the compound mass/charge keys. The method then continues to another continuation terminal ("terminal L4").

From terminal L4 (FIG. 22AN), the method 22000 proceeds to decision block 22326 where a test is performed to determine whether the variable M2MZ contains the highest mass/charge value in MAP2. If the answer to the test at decision block 22326 is NO, the method sets the variable M2MZ to the lowest mass/charge value in MAP2, which is higher than the previous value of the variable M2MZ. See block 22328. The method then continues to terminal L5 and skips back to block 22314 where the above-identified processing steps are repeated. Otherwise, the answer to the test at decision block 22326 is YES, and the method proceeds to block 22330 where the method sets a variable M1MZ (that represents a mass/charge key for MAP1) to the lowest mass/charge key found in MAP1. The method then continues to another continuation terminal ("terminal L6"). From terminal L6, the method proceeds to block 22332 where the method sets a variable (that represents a mapping value for MAP1) to a mapping value of MAP1 that corresponds to the mass/charge key represented by the variable M1MZ. The method then continues to another continuation terminal ("terminal L7").

From terminal L7 (FIG. 22AO), the method 22000 sets a variable (that represents the mass/charge keys of the compound map) to all mass/charge keys wherever MAP1 has the mapping value as indicated by the variable in the above block. See block 22334. At block 22336, the method sets the mapping values in the compound map to the variable that represents the compound mapping value for all the compound mass/charge key$_s$. The method then continues to decision block 22338 where a test is performed to determine whether the variable M1MZ contains the highest mass/charge value in MAP1. If the answer is NO to the test at decision block 22338, the method continues to block 22340 where the method sets the variable M1MZ to the lowest mass/charge in MAP1, which is higher than the previous value of the variable M1MZ. The method then continues to terminal L6 and skips back to block 22332 where the above-identified processing steps are repeated. Otherwise, the answer to the test at decision block 22338 is YES, and the method proceeds to terminal L8 and skips back to decision block 22304 where the above-identified processing steps are repeated.

From terminal F (FIG. 22AP), the method begins analyzing mass/charge associations among columns of the two-dimensional peak association matrix. See block 22342. At decision block 22344, a test is performed to determine whether each column of the matrix is from a different LC/MS image. If the answer to the test at decision block 22344 is NO, the method proceeds to another continuation terminal ("terminal F1"). Otherwise, the answer to the test at decision block 22344 is YES, and the method proceeds to block 22346 where the method concludes that the mass/charge associations among columns (across a row) are as trivial as they are for the same mass/charge value. The method then returns to a location from which the steps of the terminal F were invoked.

From terminal F1 (FIG. 22AQ), the method 22000 proceeds to decision block 22348, where a test is performed to determine whether each column contains an isotope cluster from the same label set. If the answer to the test at decision block 22348 is NO, the method continues to another continuation terminal ("terminal F2"). Otherwise, the answer to the test at decision block 22348 is YES, and the method 22000 proceeds to block 22350, where the method processes (at terminal I) label mass/charge associations for the column (inter-cluster associations). The method 22000 then returns to a location from which the steps of the terminal F were invoked.

From terminal F2 (FIG. 22AR), the method proceeds to decision block 22352, where a test is performed to determine whether each column contains an isotope cluster from the same charge group. If the answer to the test at decision block 22352 is NO, the method proceeds to block 22354 where the method concludes that no mass/charge associations are necessary because there is only one column in the matrix. The method then returns to a location from which the steps of terminal F were invoked. Otherwise, the answer to the test at decision block 22352 is YES, and the method proceeds to block 22356 where the method processes (at terminal J) charge group mass/charge associations. The method then returns to a location from which the steps of the terminal F were invoked.

From terminal D (FIG. 22AS), the method begins to process correlation scoring of isotope clusters grouped by the peak association matrix. See block 22358. At block 22360, the method creates a chromatogram for each isotope peak. At block 22362, the method creates a three-dimensional array (matrix of vectors) by using the peak association matrix to define both the first and second dimensions. At block 22364, the third dimension is defined as the aligned retention time of the chromatogram intensities.

Each cell ($\vec{c_{jk}}$) in the peak association matrix C represents an isotope peak and as such is represented as a vector with m intensities. These intensities constitute a peak chromatogram, peak spectrum, or a serialized version of the peak's pixel intensities. See FIG. 22R. The retention times and mass/charge values of these vectors are based on the aligned retention times and mapped mass/charge values. The techniques for creating the peak spectrum, peak chromatogram, or a serialized version of the peak's pixel intensities were described hereinbefore.

Because each cell ($\vec{c_{jk}}$) in the peak association matrix C represents a peak with m intensities, C is a three-dimensional matrix or array $C = c_{ijk}$, where $c_{ijk}$ is the $i^{th}$ intensity value of the $j^{th}$ isotope peak in isotope cluster k; $i = 1, \ldots, m$; $j = 1, \ldots, n$; $k = 1, \ldots, p$; m is the number of intensity values in a peak vector that represents a single isotope peak; n is the number of isotope peaks per isotope cluster collection; and p is the number of isotope cluster collections. The order of the intensity values in each vector suitably corresponds to the other vectors. The order is determined by aligned retention time and the mass/charge association maps.

At block 22366, the method generates correlation scores for the three-dimensional array (terminal M). At block 22368, the method creates a spectrum for each isotope peak. At block 22370, the method replaces mass/charge offset such that intensities from association mass/charge values have the same array location. The method then continues to another continuation terminal ("terminal D1").

From terminal D1 (FIG. 22AT), the method creates a three-dimensional array (matrix of vectors) by using the peak association matrix to define both the first and second dimensions. At block 22374, the third dimension is defined as the associated mass/charge of the spectrum intensities. At block 22376, the method generates correlation scores for the three-dimensional array (terminal M). At block 22378, the method creates a serialized version of each isotope peak using aligned retention time and the mass/charge association map. At block 22380, the method creates a three-dimensional array (matrix of vectors) by using the peak association matrix to define both the first and second dimensions. At block 22382, the third dimension is defined as the serialization position. At block 22384, the method generates correlation scores for the three dimensional array (terminal M). The method then returns to a location from which the steps of the terminal D were invoked.

From terminal M (FIG. 22AU), the method begins to generate correlation scores using the peak association matrix of vectors at block 22386.

The method uses the correlation scorer 116 to score a group of isotope clusters that are associated to each other by a peak association matrix and by mass/charge association maps. As discussed hereinbefore, prior to scoring, isotope clusters and gatherings of isotope clusters have been identified. A peak association matrix has been determined, and LC/MS image portions (pixel locations) have been associated with each other in the mass/charge and retention time dimensions. The associations in the retention time dimension occurred via retention time alignment and the associations in the mass/charge dimension occurred by a mass/charge association map.

This correlation scorer 116 processes matrix C in three general ways leading to a number of scores (FIG. 22AU). One-dimensional association leads to scores symbolically referenced as $R_{1,1}$, $R_{1,2}$, and $R_{1,3}$. Two-dimensional association without constraints on the intensity distributions leads to scores symbolically referenced as $R_{2,1}$, $R_{2,2}$, $R_{2,3}$, $R_{2,4}$, $R_{2,5}$, and $R_{2,6}$. Two-dimensional association with constraints on the intensity distributions leads to scores symbolically represented as $R_{3,1}$, $R_{3,2}$, $R_{3,3}$, $R_{3,4}$, $R_{3,5}$, and $R_{3,6}$.

At block 22388, the method begins to process one-dimensional association. The method begins with the matrix of vectors C as was defined hereinbefore: $C = \vec{c_{jk}} = c_{ijk}$, where $c_{ijk}$ is the $i^{th}$ intensity value of the $j^{th}$ isotope peak in isotope cluster k. Each vector ($\vec{c_{jk}}$) that represents an isotope peak suitably has corresponding mass/charge mappings to the other vectors. For these one-dimensional associations, the configuration of the peak association matrix can be in any suitable form.

The method next progresses to isotope peak assimilations. Each isotope peak is assimilated to an average isotope peak. The following is determined: the mean or median peak b of isotope peaks $j = 1, \ldots, n$ in all isotope clusters $k = 1, \ldots, p$:

$$b_i = \frac{\sum_{j}^{n} \sum_{k}^{p} c_{ijk}}{np}$$

$$b_i = \text{median}(c_{ijk}, j = 1, \ldots, n; k = 1, \ldots, p)$$

The method assimilates vectors $\vec{c_{jk}}$ to b as explained previously and produces a set of assimilated vectors $\vec{x_{jk}}$. The assimilated vectors form a new matrix (X) of assimilated vectors: $X = \vec{x_{jk}} = x_{ijk}$, where $x_{ijk}$ is the $i^{th}$ intensity value of vector $\vec{x_{jk}}$. The assimilation is a scaling plus an offset: $x_{ijk} = s_{jk} c_{ijk} + d_{jk}$, where $s_{jk}$ and $d_{jk}$ are linear fitting parameters that may be determined in a variety of ways. For instance, if an assimilation is only a scaling without an offset, then the method could use these scaling parameters:

$$s_{jk} = \frac{\sum_{i} b_i^2}{\sum_{i} c_{ijk} b_i}$$

$$d_{jk} = 0$$

However, the method may consider that interfering signals may raise the signal background. In this case, the method would suitably determine $s_{jk}$ and $d_{jk}$ as follows:

$$d_{jk} = \frac{\sum_{i}^{m} c_{ijk}^2 \sum_{i}^{m} b_i - \sum_{i}^{m} c_{ijk} \sum_{i}^{m} c_{ijk} b_i}{m \sum_{i}^{m} c_{ijk}^2 - \left(\sum_{i}^{m} c_{ijk}\right)^2};$$

$$s_{jk} = \frac{m\sum_i^m c_{ijk} b_i - \sum_i^m c_{ijk} \sum_i^m b_i}{m\sum_i^m c_{ijk}^2 - \left(\sum_i^m c_{ijk}\right)^2};$$

Proceeding next to peak weighting, based on the method's image selection and signal processing, the method may weight differentially the assimilated vectors and even the individual intensities. The method can weight each assimilated vector for intra-condition correlation: $w_{ijk}=1$. The method further can weight each assimilated vector for constituent-weighted correlation:

$$w_{ijk} = \frac{1}{s_{jk}}$$

Noise removal, like signal thresholding, may have been applied such that a low signal falls below detectable or threshold levels. Also, the method may determine to exclude non-masked regions. In these cases, the method excludes such data from consideration by setting the weighting to zero for all intensity values that are zero or that are not masked: $w_{ijk}=0$ for $\{x_{ijk}=0\}$.

Proceeding now to determine correlation scores for one dimensional association, the correlation scores $R_{1,1}$, $R_{1,2}$, $R_{1,3}$ for this method are:

$$R_{1,1}(s>0) = \frac{t\sum_i\sum_j\sum_k w_{ijk}x_{ijk}b_i - \sum_i\sum_j\sum_k w_{ijk}x_{ijk}\sum_i\sum_j\sum_k w_{ijk}b_i}{\left(\sqrt{\left(t\sum_i\sum_j\sum_k w_{ijk}x_{ijk}^2 - \left(\sum_i\sum_j\sum_k w_{ijk}x_{ijk}\right)^2\right)\left(t\sum_i\sum_j\sum_k w_{ijk}b_i^2 - \left(\sum_i\sum_j\sum_k w_{ijk}b_i\right)^2\right)}\right)};$$

$$R_{1,1}(s \leq 0) = 0$$

$$R_{1,2}(s > 0) = \exp(-|\ln(s)|)$$

$$R_{1,2}(s \leq 0) = 0$$

$$R_{1,3} = \exp\left(\frac{-d^2}{2\sigma^2}\right)$$

where $$t = \sum_i\sum_j\sum_k w_{ijk}$$

$$s = \frac{t\sum_i\sum_j\sum_k w_{ijk}x_{ijk}b_i - \sum_i\sum_j\sum_k w_{ijk}x_{ijk}\sum_i\sum_j\sum_k w_{ijk}b_i}{t\sum_i\sum_j\sum_k w_{ijk}x_{ijk}^2 - \left(\sum_i\sum_j\sum_k w_{ijk}x_{ijk}\right)^2};$$

$$d = \frac{\sum_i\sum_j\sum_k w_{ijk}x_{ijk}^2\sum_i\sum_j\sum_k w_{ijk}b_i - \sum_i\sum_j\sum_k w_{ijk}x_{ijk}\sum_i\sum_j\sum_k w_{ijk}x_{ijk}b_i}{t\sum_i\sum_j\sum_k w_{ijk}x_{ijk}^2 - \left(\sum_i\sum_j\sum_k w_{ijk}x_{ijk}\right)^2};$$

$$\sigma_b^2 = \frac{mnp\sum_i^m\sum_j^n\sum_k^p w_{ijk}b_i^2}{(mnp-1)t}$$

The rationale for $R_{1,1}$, $R_{1,2}$, $R_{1,3}$ includes the following: $R_{1,1}$ reflects the least-square correlation coefficient (modified Pearson's r) for the correlation of the assimilated vectors to the consensus vectors. Given that the assimilation normalized the intensities, it can be expected that the correlation is to be normalized (slope of 1) and that an extrapolation would intercept the origin. $R_{1,2}$ is a measure of how close the slope is to one. $R_{1,3}$ is a measure of how close the intercept is to zero.

At block 22390, the method begins to process two-dimensional inter-cluster association (reproducibility) without constraints related to isotopic distribution. In other words, the method tests whether isotope peak shape is similar among corresponding isotope peaks from all isotope clusters. In testing whether the isotope peak shape is similar among the isotope clusters, the method recognizes that the isotope peak shape may vary within an isotope cluster. The method scores the inter-isotope cluster reproducibility of isotope peak shapes. The method starts with the matrix of vectors C as was discussed hereinbefore $C=\vec{c}_{jk}=c_{ijk}$, where $c_{ijk}$ is the $i^{th}$ intensity value of the $j^{th}$ isotope peak in isotope cluster k.

The method proceeds to process peak assimilations by calculating a matrix G where each column is the average vector (chromatogram, peak spectrum, or serialized intensities) from the $j^{th}$ row of C. This average may be the mean or the median:

$$G = g_{ij}$$

$$g_{ij} = \frac{\sum_k^p c_{ijk}}{p}$$

$$g_{ij} = \text{median}(c_{ijk}, k = 1, \ldots, p)$$

The matrix X of assimilated vectors is then determined by $x_{ijk}=s_j c_{ijk}+d_j$, where $s_{jk}$ and $d_{jk}$ are linear fitting parameters that may be determined in a variety of ways. For instance, if assimilation is only a scaling without an offset, then the method could use these scaling parameters:

$$s_j = \frac{\sum_i g_{ij}^2}{\sum_i c_{ij} g_{ij}}$$

$$d_j = 0$$

However, the method may consider that interfering signals may raise the signal background. In this case, the method would determine $s_j$ and $d_j$ as follows:

$$d_j = \frac{\sum_i^m \sum_k^p c_{ijk}^2 \sum_i^m \sum_k^p g_{ij} - \sum_i^m \sum_k^p c_{ijk} \sum_i^m \sum_k^p c_{ijk} g_{ij}}{mn \sum_i^m \sum_k^p c_{ijk}^2 - \left(\sum_i^m \sum_k^p c_{ijk}\right)^2}$$

$$s_j = \frac{mn \sum_i^m \sum_k^p c_{ijk} g_{ij} - \sum_i^m \sum_k^p c_{ijk} \sum_i^m \sum_k^p g_{ij}}{mn \sum_i^m \sum_k^p c_{ijk}^2 - \left(\sum_i^m \sum_k^p c_{ijk}\right)^2}$$

Alternately, $s_j$ and $d_j$ may be determined by other means. For instance, expected isotopic distributions or expression differences may be used to set $s_j$ and $d_j$ a priori.

Proceeding to isotope peak weighting, based on the method's image selection and signal processing, the method may weight differentially the assimilated vectors and even the individual intensities. The method can weight each assimilated vector for intra-condition correlation: $w_{ijk}=1$. The method can weight each assimilated vector for constituent-weighted correlation:

$$w_{ijk} = \frac{1}{s_j}$$

Noise removal, like signal thresholding, may have been applied such that a low signal falls below detectable or threshold levels. Also, the method may wish to exclude non-masked regions. In these cases, the method excludes such data from consideration by setting the weighting to zero for all intensity values that are zero or that are not masked: $w_{ijk}=0$ for $\{x_{ijk}=0\}$.

Proceeding now to determine correlation scores, the correlation scores $R_1$, $R_2$, and $R_3$ for these methods are:

$$R_1(s>0) = \frac{t\sum_i \sum_j \sum_k w_{ijk} x_{ijk} g_{ij} - \sum_i \sum_j \sum_k w_{ijk} x_{ijk} \sum_i \sum_j \sum_k w_{ijk} g_{ij}}{\sqrt{\left(t\sum_i \sum_j \sum_k w_{ijk} x_{ijk}^2 - \left(\sum_i \sum_j \sum_k w_{ijk} x_{ijk}\right)^2\right)\left(t\sum_i \sum_j \sum_k w_{ijk} g_{ij}^2 - \left(\sum_i \sum_j \sum_k w_{ijk} g_{ij}\right)^2\right)}};$$

$$R_1(s \leq 0) = 0$$

$$R_2(s > 0) = \exp(-|\ln(s)|)$$

$$R_2(s \leq 0) = 0$$

$$R_{1,3} = \exp\left(\frac{-d^2}{2\sigma^2}\right)$$

where $$t = \sum_i \sum_j \sum_k w_{ijk}$$

$$d = \frac{\sum_i \sum_j \sum_k w_{ijk} x_{ijk}^2 \sum_i \sum_j \sum_k w_{ijk} g_{ij} - \sum_i \sum_j \sum_k w_{ijk} x_{ijk} \sum_i \sum_j \sum_k w_{ijk} x_{ijk} g_{ij}}{t\sum_i \sum_j \sum_k w_{ijk} x_{ijk}^2 - \left(\sum_i \sum_j \sum_k w_{ijk} x_{ijk}\right)^2};$$

$$s = \frac{t\sum_i \sum_j \sum_k w_{ijk} x_{ijk} g_{ij} - \sum_i \sum_j \sum_k w_{ijk} x_{ijk} \sum_i \sum_j \sum_k w_{ijk} g_{ij}}{t\sum_i \sum_j \sum_k w_{ijk} x_{ijk}^2 - \left(\sum_i \sum_j \sum_k w_{ijk} x_{ijk}\right)^2};$$

$$\sigma^2 = \frac{mnp \sum_i^m \sum_j^n \sum_k^p w_{ijk} g_{ij}^2}{(mnp-1)t}$$

The rationale for $R_1$, $R_2$, and $R_3$ is as follows: $R_1$ reflects the least-square correlation coefficient (modified Pearson's r) for the correlation of the assimilated vectors to the consensus vectors. Given that the assimilation normalized the intensities, the correlation ought to be normalized (slope of 1) and an extrapolation would intercept the origin. $R_2$ is a measure of how close the slope is to 1. $R_3$ is a measure of how close the intercept is to 0. The scores $R_1$, $R_2$, and $R_3$ produced by block 22390 are renamed $R_{2,1}$, $R_{2,2}$, $R_{2,3}$.

At block 22392, the method begins to process two-dimensional intra-cluster association (quality, well-formedness) without constraints related to isotopic distribution. At this block, the method expects the isotope peak shape to be similar among isotope peaks within a given isotope cluster but an allowance is made that the isotope peak shape may vary among isotope clusters. The method scores the intra-isotope cluster reproducibility of isotope peak shapes. In other words, this method tests whether the isotope clusters are well formed. The input matrix of vectors C as discussed hereinbefore in connection with block 22390 is transposed such that $c_{ijk}$ is the $i^{th}$ intensity value of the $j^{th}$ isotope cluster collection in isotope peak k where: j=1, . . . , n; k=1, . . . , p; p is the number of isotope peaks per isotope cluster collection; and n is the number of isotope cluster collections. The above steps to process peak assimilations are repeated for an additional set ($R_1$, $R_2$, and $R_3$) of correlation scores. The scores $R_1$, $R_2$, and $R_3$ produced by block 22392 are renamed $R_{2,4}$, $R_{2,5}$, $R_{2,6}$.

At block 22394, the method begins to process two-dimensional inter-cluster association (reproducibility) with the constraints related to isotopic distribution. The method at this block surmises that the relative expression levels among isotope peaks within an isotope cluster should be consistent but allows the isotope clusters to have varying amounts of expression. In this block, the method expects that the isotope peak shape is similar among the isotope clusters but an allowance is made that the isotope peak shape may vary within an isotope cluster. The method scores the inter-isotope cluster reproducibility of isotope peak shapes. In other words this method tests whether the isotope clusters are reproducible. The method starts with the matrix of vectors C as was discussed hereinbefore: $C=\vec{c}_{jk}=c_{ijk}$, where $c_{ijk}$ is the $i^{th}$ intensity value of the $j^{th}$ isotope peak in isotope cluster k.

Proceeding to peak assimilations, the method determines the mean peak b of isotope peaks j=1, . . . , n in all isotope clusters k=1, . . . , p:

$$b_i = \frac{\sum_j^n \sum_k^p c_{ijk}}{np}$$

The method determines the matrix F, whose columns (k=1, . . . , p) represents the mean intensity values of the intensity vectors in the $k^{th}$ column in matrix C:

$$F = f_{ik}$$

$$f_{ik} = \frac{\sum_j^n c_{ijk}}{n}$$

F and b are used for assimilations. The assimilation is a scaling plus offset: $x_{ijk}=s_k c_{ijk}+d_k$, where $s_{jk}$ and $d_{jk}$ are linear fitting parameters that are determined by the scaling and offset of the $k^{th}$ column of F to b. For instance, if the assimilation is only a scaling and without an offset, then the method could use these scaling parameters:

$$s_k = \frac{\sum_i b_i^2}{\sum_i f_{ik} b_i}$$

$$d_k = 0$$

However, the method may consider that interfering signals may raise the signal background. In this case, the method would determine $s_k$ and $d_k$ as follows:

$$d_k = \frac{\sum_i^m f_{ik}^2 \sum_i^m b_i - \sum_i^m f_{ik} \sum_i^m f_{ik} b_i}{m \sum_i^m f_{ik}^2 - \left(\sum_i^m f_{ik}\right)^2};$$

$$s_k = \frac{m \sum_i^m f_{ik} b_i - \sum_i^m f_{ik} \sum_i^m b_i}{m \sum_i^m f_{ik}^2 - \left(\sum_i^m f_{ik}\right)^2};$$

Proceeding to peak weighting, based on the method's image selection and signal processing, the method may weight differentially the assimilated vectors and even the individual intensities. The method can weight each assimilated vector for intra-condition correlation: $w_{ijk}=1$. The method can weight each assimilated vector for constituent-weighted correlation:

$$w_{ijk} = \frac{1}{s_k}$$

Noise removal, like signal thresholding, may have been applied such that a low signal falls below detectable or threshold levels. Also, the method may wish to exclude non-masked regions. In these cases, the method excludes such data from consideration by setting the weighting to zero for all intensity values that are zero or that are not masked: $w_{ijk}=0$ for $\{x_{ijk}=0\}$.

Proceeding now to the determination of correlation scores, the method pairs the intensity values of the scaled the vectors $\vec{x}_{jk}$ with the intensity values of the mean vector of each row of C. To this end, the method calculates a matrix G where each column contains the mean intensity values from the $j^{th}$ row of C:

$$G = g_{ij}$$

$$g_{ij} = \frac{\sum_k^p c_{ijk}}{p}$$

The correlation scores $R_1$, $R_2$, and $R_3$ for these methods are:

$$R_1(s>0) = \frac{t\sum_i\sum_j\sum_k w_{ijk}x_{ijk}g_{ij} - \sum_i\sum_j\sum_k w_{ijk}x_{ijk}\sum_i\sum_j\sum_k w_{ijk}g_{ij}}{\sqrt{\left(t\sum_i\sum_j\sum_k w_{ijk}x_{ijk}^2 - \left(\sum_i\sum_j\sum_k w_{ijk}x_{ijk}\right)^2\right)\left(t\sum_i\sum_j\sum_k w_{ijk}g_{ij}^2 - \left(\sum_i\sum_j\sum_k w_{ijk}g_{ij}\right)^2\right)}};$$

$$R_1(s \leq 0) = 0$$

$$R_2(s > 0) = \exp(-|\ln(s)|)$$

$$R_2(s \leq 0) = 0$$

$$R_{1,3} = \exp\left(\frac{-d^2}{2\sigma^2}\right)$$

where $$t = \sum_i\sum_j\sum_k w_{ijk}$$

$$d = \frac{\sum_i\sum_j\sum_k w_{ijk}x_{ijk}^2 \sum_i\sum_j\sum_k w_{ijk}g_{ij} - \sum_i\sum_j\sum_k w_{ijk}x_{ijk}\sum_i\sum_j\sum_k w_{ijk}x_{ijk}g_{ij}}{t\sum_i\sum_j\sum_k w_{ijk}x_{ijk}^2 - \left(\sum_i\sum_j\sum_k w_{ijk}x_{ijk}\right)^2};$$

$$s = \frac{t\sum_i\sum_j\sum_k w_{ijk}x_{ijk}g_{ij} - \sum_i\sum_j\sum_k w_{ijk}x_{ijk}\sum_i\sum_j\sum_k w_{ijk}g_{ij}}{t\sum_i\sum_j\sum_k w_{ijk}x_{ijk}^2 - \left(\sum_i\sum_j\sum_k w_{ijk}x_{ijk}\right)^2};$$

$$\sigma^2 = \frac{mnp\sum_i^m\sum_j^n\sum_k^p w_{ijk}g_{ij}^2}{(mnp-1)t}$$

The rationale for $R_1$, $R_2$, and $R_3$ is as follows: $R_1$ reflects the least-square correlation coefficient (modified Pearson's r) for the correlation of the assimilated vectors to the consensus vectors. Given that the assimilation normalized the intensities, the method would expect the correlation to be normalized (slope of 1) and that an extrapolation would intercept the origin. $R_2$ is a measure of how close the slope is to 1. $R_3$ is a measure of how close the intercept is to 0. The scores $R_1$, $R_2$, and $R_3$ from block 22394 are renamed $R_{3,1}$; $R_{3,2}$; and $R_{3,3}$.

At block 22396, the method begins to process two-dimensional intra-cluster association (quality, well-formedness) with the constraints related to isotopic distribution. Processing at block 22396, the method expects the isotope peak shape to be similar among isotope peaks within a given isotope cluster but that the isotope peak shape may vary among isotope clusters. The method scores the intra-isotope cluster reproducibility of isotope peak shapes. In other words, the method tests whether the isotope clusters are well formed. The input matrix C as discussed hereinabove at block 22394 is transposed such that $c_{ijk}$ is the $i^{th}$ intensity value of p the $j^{th}$ isotope cluster collection in isotope peak k where: j=1, . . . , n; k=1, . . . , p; is the number of isotope peaks per isotope cluster collection; and n is the number of isotope cluster collections. The above steps are repeated for an additional set ($R_1$, $R_2$, and $R_3$) of correlation scores. The scores $R_1$, $R_2$, and $R_3$ from block 22396 are renamed $R_{3,4}$; $R_{3,5}$; $R_{3,6}$. The method then returns to a location from which the steps of the terminal M were invoked.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method comprising:
   in a computer, computing a reproducibility score based on a peak association matrix and a mass/charge association map to test whether an isotope cluster, a label set, or a charge group is reproducible, wherein the computing of the reproducibility score comprises generating a three-dimensional array from the peak association matrix and the mass/charge association map, averaging rows of the peak association matrix to generate a first matrix of average vectors, calculating a first matrix of assimilated vectors from intensity values of the peak association matrix, and computing a first correlation coefficient using at least the first matrix of average vectors and the first matrix of assimilated vectors; and
   computing a quality score by scoring a transposed peak association matrix together with the mass/charge association map to test whether the isotope cluster, the label set, or the charge group is well formed, wherein the computing of the quality score comprises transposing the peak association matrix to generate the transposed peak association matrix, averaging rows of the transposed peak association matrix to generate a second matrix of average vectors, calculating a second matrix of assimilated vectors from the transposed peak association matrix, and computing a second correlation coefficient using at least the second matrix of average vectors and the second matrix of assimilated vectors.

2. The method of claim 1, further comprising evaluating whether the reproducibility score indicates that the isotope cluster, the label set, or the charge group is reproducible, and if not reproducible, to caution scientific conclusion based on the isotope cluster, the label set, or the charge group.

3. The method of claim 2, further comprising reorganizing member isotope peaks of the isotope cluster, the label set, or the charge group to form a different isotope cluster, label set, or charge group, so that the reproducibility score is improved.

4. The method of claim 1, further comprising evaluating whether the quality score indicates that the isotope cluster, the label set, or the charge group is well formed, and if not well formed, to caution scientific conclusion based on the isotope cluster, the label set, or the charge group.

5. The method of claim 4, further comprising reorganizing member isotope peaks of the isotope cluster, the label set, or the charge group to form a different isotope cluster, label set, or charge group, so that the quality score is improved.

6. The method of claim 1, further comprising creating a peak association matrix, each column of the peak association matrix containing one isotope cluster from the label set or charge group if isotope clusters are from a single label set or a single charge group on one LC/MS image.

7. The method of claim 1, further comprising creating a peak association matrix, each cell of the peak association matrix containing an isotope peak, each column of the peak association matrix containing isotope peaks from one LC/MS image if isotope clusters are from more than one LC/MS image.

8. The method of claim 1, further comprising creating a mass/charge association map based on the peak association matrix, isotope peaks that have different mass/charge values being associated with each other if the different mass/charge values share the same mapping number.

9. A computer-readable medium not consisting of a signal having computer-executable instructions stored thereon for performing a method, comprising:
computing a reproducibility score based on a peak association matrix and a mass/charge association map to test whether an isotope cluster, a label set, or a charge group is reproducible, wherein the computing of the reproducibility score comprises generating a three-dimensional array from the peak association matrix and the mass/charge association map, averaging rows of the peak association matrix to generate a first matrix of average vectors, calculating a first matrix of assimilated vectors from intensity values of the peak association matrix, and computing a first correlation coefficient using at least the first matrix of average vectors and the first matrix of assimilated vectors; and computing a quality score by scoring a transposed peak association matrix together with the mass/charge association map to test whether the isotope cluster, the label set, or the charge group is well formed, wherein the computing of the quality score comprises transposing the peak association matrix to generate the transposed peak association matrix, averaging rows of the transposed peak association matrix to generate a second matrix of average vectors, calculating a second matrix of assimilated vectors from the transposed peak association matrix, and computing a second correlation coefficient using at least the second matrix of average vectors and the second matrix of assimilated vectors.

10. The computer-readable medium of claim 9, further comprising evaluating whether the reproducibility score indicates that the isotope cluster, the label set, or the charge group is reproducible, and if not reproducible, to caution scientific conclusion based on the isotope cluster, the label set, or the charge group.

11. The computer-readable medium of claim 10, further comprising reorganizing member isotope peaks of the isotope cluster, the label set, or the charge group to form a different isotope cluster, label set, or charge group, so that the reproducibility score is improved.

12. The computer-readable medium of claim 9, further comprising evaluating whether the quality score indicates that the isotope cluster, the label set, or the charge group is well formed, and if not well formed, to caution scientific conclusion based on the isotope cluster, the label set, or the charge group.

13. The computer-readable medium of claim 12, further comprising reorganizing member isotope peaks of the isotope cluster, the label set, or the charge group to form a different isotope cluster, label set, or charge group, so that the quality score is improved.

14. The computer-readable medium of claim 9, further comprising creating a peak association matrix, each column of the peak association matrix containing one isotope cluster from the label set or charge group if isotope clusters are from a single label set or a single charge group on one LC/MS image.

15. The computer-readable medium of claim 9, further comprising creating a peak association matrix, each cell of the peak association matrix containing an isotope peak, each column of the peak association matrix containing isotope peaks from one LC/MS image if isotope clusters are from more than one LC/MS image.

16. The computer-readable medium of claim 9, further comprising creating the peak association matrix.

17. The method of claim 1, further comprising creating the peak association matrix.

* * * * *